(12) United States Patent
Fuste Vilella et al.

(10) Patent No.: US 9,191,303 B2
(45) Date of Patent: *Nov. 17, 2015

(54) SYSTEMS AND METHODS FOR CREATING, MANAGING AND COMMUNICATING USERS AND APPLICATIONS ON SPONTANEOUS AREA NETWORKS

(71) Applicant: Miraveo, Inc., San Jose, CA (US)

(72) Inventors: David Fuste Vilella, Barcelona (ES); Jorge Garcia Vidal, Barcelona (ES); Daniel Nemirovsky, San Francisco, CA (US); Mario Nemirovsky, San Francisco, CA (US)

(73) Assignee: Miraveo, Inc., San Jose, CA (US)

( * ) Notice: Subject to any disclaimer, the term of this patent is extended or adjusted under 35 U.S.C. 154(b) by 256 days.

This patent is subject to a terminal disclaimer.

(21) Appl. No.: 13/930,806

(22) Filed: Jun. 28, 2013

(65) Prior Publication Data

US 2013/0286892 A1  Oct. 31, 2013

Related U.S. Application Data

(63) Continuation of application No. 12/704,904, filed on Feb. 12, 2010, now Pat. No. 8,493,849.

(60) Provisional application No. 61/152,566, filed on Feb. 13, 2009, provisional application No. 61/264,939, filed on Nov. 30, 2009.

(51) Int. Cl.
*H04W 4/00* (2009.01)
*H04L 12/751* (2013.01)
(Continued)

(52) U.S. Cl.
CPC ............. *H04L 45/02* (2013.01); *H04W 40/00* (2013.01); *H04W 84/18* (2013.01); *H04W 84/12* (2013.01)

(58) Field of Classification Search
USPC ......................................................... 370/254
See application file for complete search history.

(56) References Cited

U.S. PATENT DOCUMENTS 7,769,848 B2  8/2010  Choy et al.
7,930,379 B2  4/2011  Yarvis et al.
(Continued)

OTHER PUBLICATIONS

C. Perkins, E. Belding-Royer, and S. Das, "Ad hoc on-demand distance vector (AODV) routing," RFC 3561, 2003.
(Continued)

*Primary Examiner* — Farah Faroul
(74) *Attorney, Agent, or Firm* — Stuart T. Auvinen; g Patent LLC

(57) ABSTRACT

A Spontaneous Area Network (SPAN) is formed by mobile and fixed nodes using wireless transmission links between nodes, usually in a nearby geographical area. Applications allow users to create, join, leave, and manage SPANs and groups in a SPAN. Automatic procedures allow nodes to join other SPANs. Transmission power of the wireless network interface is dynamic, varying depending on battery level, type of information to transmit, state and topology of the network. A delay tolerant object layer abstraction creates, modifies, deletes, publishes, and handles Delay Tolerant Distributed Objects (DTDOs). A Patient Transport Protocol (PTP) ensures a reliable transport of information through the network while avoiding congestion conditions. An aggressive and explosive network protocol (AGENET) has routing and forwarding capacities and uses datagrams to establish communication between different nodes of the SPAN. Cooperation and diversity are exploited to react to node mobility that causes frequent changes in network topology and disconnections.

11 Claims, 50 Drawing Sheets

(51) Int. Cl.
*H04W 40/00* (2009.01)
*H04W 84/18* (2009.01)
*H04W 84/12* (2009.01)

(56) References Cited

U.S. PATENT DOCUMENTS

| | | |
|---|---|---|
| 7,941,188 B2 | 5/2011 | Jung et al. |
| 8,085,686 B2 | 12/2011 | Thubert et al. |
| 8,483,669 B2 | 7/2013 | Manolescu et al. |
| 2002/0090949 A1 | 7/2002 | Stanforth |
| 2005/0157698 A1 | 7/2005 | Park et al. |
| 2005/0226201 A1 | 10/2005 | McMillin |
| 2006/0101452 A1* | 5/2006 | Mak ............... 717/168 |
| 2006/0129627 A1* | 6/2006 | Phillips et al. ............... 709/200 |
| 2006/0133363 A1 | 6/2006 | Dumet et al. |
| 2006/0218210 A1* | 9/2006 | Sarma et al. ............... 707/204 |
| 2007/0198675 A1 | 8/2007 | Amanuddin et al. |
| 2008/0104141 A1* | 5/2008 | McMahon ............... 707/203 |
| 2013/0227558 A1* | 8/2013 | Du et al. ............... 718/1 |

OTHER PUBLICATIONS

A. McMahon and S. Farrell, "Delay and Disruption Tolerant Networking," IEEE Internet Computing, vol. 13, No. 6, pp. 82-87, Nov. 2009.

I. F. Akyildiz, W. Su, Y. Sankarasubramaniam, and E. Cayirci, "A Survey on Sensor Networks," IEEE Communications Magazine, vol. 40, No. 8, pp. 102-114, Aug. 2002.

Y. Tian, K. Xu, and N. Ansari, "TCP in wireless environments: problems and solutions," IEEE Communications Magazine, vol. 43, No. 3, pp. 27-32, Mar. 2006.

* cited by examiner

You are here but you become locally connected there

SYSTEMS AND METHODS FOR CREATING, MANAGING AND COMMUNICATING USERS AND APPLICATIONS ON SPONTANEOUS AREA NETWORKS

RELATED APPLICATION

This application is a Continuation of Ser. No. 12/704,904, filed Feb. 12, 2010, now U.S. Pat. No. 8,493,849. This application claims the benefit of the co-pending provisional applications for "Systems and Methods for Creating, Managing and Communicating Users and Applications on Spontaneous Area Networks", U.S. Ser. No. 61/152,566, filed Feb. 13, 2009 and for "New Systems and Methods for Creating, Managing and Communicating Users and Applications on Spontaneous Area Networks", U.S. Ser. No. 61/264,939, filed Nov. 30, 2009, hereby incorporated by reference.

APPENDIX

An appendix containing a computer program listing is being electronically submitted using the electronic filing system (EFS). The file name is AppendixMV1e.pdf and its size is 3.18 MB (3,340,615 bytes) and was created on Feb. 11, 2010, and is hereby incorporated by reference.

FIELD OF THE INVENTION

This invention relates to mobile-device networks, and more particularly to spontaneous local-area-networks.

BACKGROUND OF THE INVENTION

Traditional networks such as Local Area Networks (LANs) have nodes that are fixed in position. Cellular telephone networks have mobile devices that roam or move from one location to another. While such mobile devices may be placed in networks having a large geographic area, it is difficult to join these mobile devices to local networks and to discover and communicate with other mobile devices in the same geographic area. Mobile device users may move frequently and quickly, causing disconnections and changes in network topology.

What is desired is a network system designed to integrate mobile devices that change location with fixed nodes in a particular geographic area. It is desired to allow users to locate other users in the same geographic area to for local networks spontaneously.

DETAILED DESCRIPTION

The present invention relates to an improvement in mobile networking. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

1. SPANs

Figure 1:
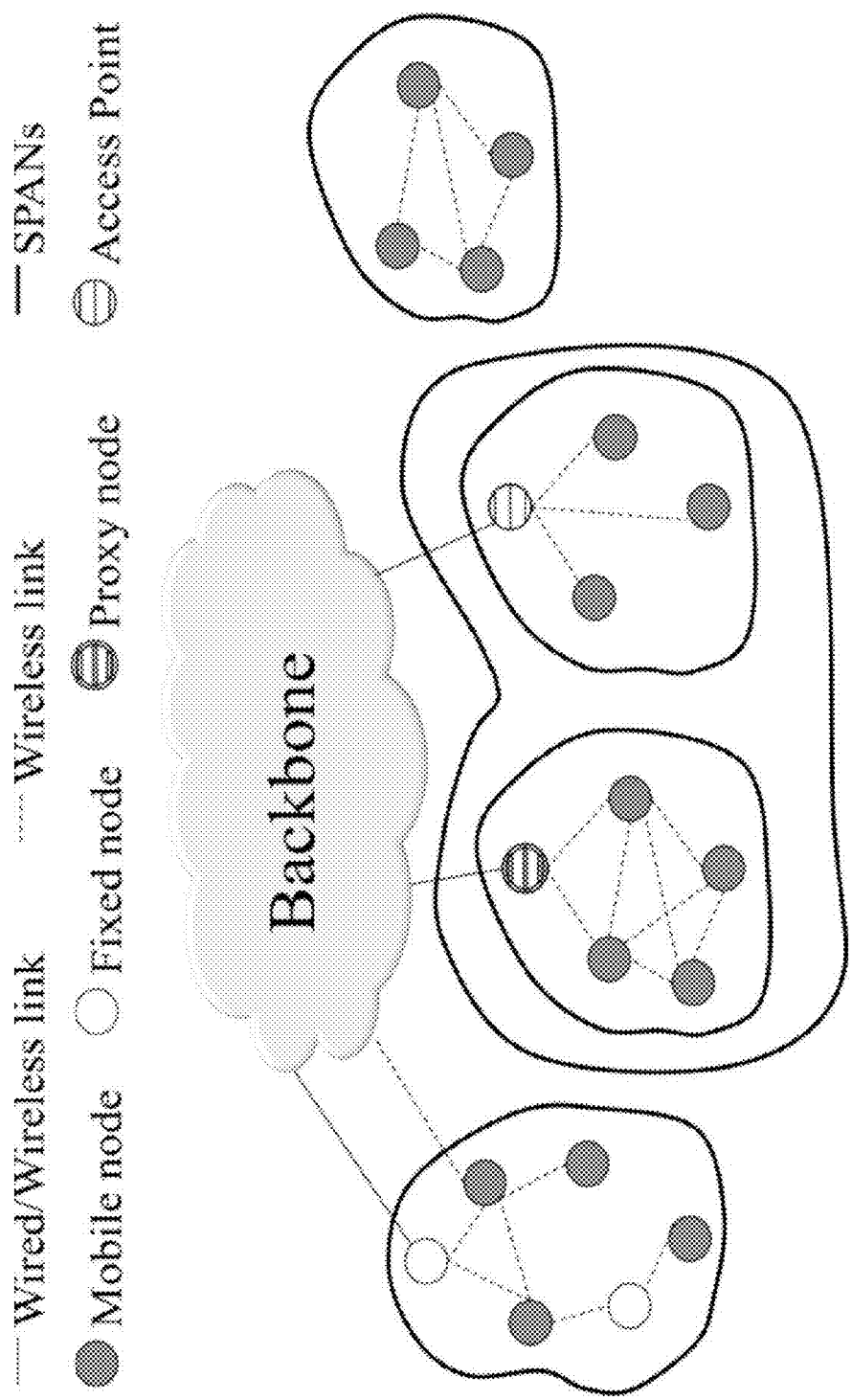
FIG. 1 shows an example of Spontaneous Area Networks (SPANs)

A Spontaneous Area Network (SPAN) is a network that may be formed by mobile or fixed nodes, which use wireless transmission links between nodes (although wired links could also be used). Nodes of a SPAN will usually be in a nearby geographical area, although this geographical proximity is not required as remote users can belong to a SPAN, for example through proxy nodes. See FIG. 1.

SPANs are well suited to communicate nearby devices, meaning that they can serve as proximity networks. The fact that two nodes are in the same SPAN will usually mean that they are in their proximity. This is especially interesting for Location Based Services (LBS) or Location Based Applications, as users can be approximately located inside a given geographical area without requiring any additional positioning system, such as a Global Positioning System (GPS) device (although GPS could also be used).

Note, however, that SPANs can be also connected to networks with a broad coverage (e.g. The Internet), by means of Proxy nodes (see section "3.12 Proxy Nodes and Remote SPAN Users"), thus meaning that they are not limited to be used as proximity networks.

SPANs can have an identifier, i.e., a name that identifies the SPAN among their users.

SPANs support both the "ad-hoc networking model" and the "access-point networking model":

1) The "ad-hoc networking model" corresponds to the case in which nodes that are in transmission range can communicate directly, without being forced to use an intermediate node as relay of packets. SPANs supporting "ad-hoc networking model" can also support multihop networking, meaning that two nodes can communicate even if they are not in mutual direct communication range. In this case, the communication is established by means of intermediate nodes, which act as relays or forwarders of information. A distinctive characteristic of SPANs using "ad-hoc networking model" is that they can be established by the end-users without requiring any pre-existing infrastructure nodes, although nodes from an infrastructure can also be present.

2) The "access-point networking model" corresponds to the case in which the networking technology used to communicate nodes in the SPAN forces them to use a central controller, usually called "access-point" or "base-station".

As an example, in the framework of the IEEE 802.11 standard, the "ad-hoc networking model" would correspond to a multihop extension of the so called "independent BSS/AdHoc mode", while the "access-point networking model" would correspond to the "Infrastructure BSS mode". As another example, in the framework of cellular network technology (e.g. GPRS, UMTS, LTE, etc) a SPAN would be formed using the "access-point networking model". Moreover, nodes are not required to neither use the same networking model (ad-hoc or access-point) nor use the same access technology (IEEE 802.11, GPRS, UMTS, etc) in order to belong to the same SPAN at the same time. Handovers between different networking models and different access technologies can be used in order to build SPANs as robust as possible and as independent from the access technology as possible.

It is also possible to consider SPANs using hybrid models, meaning that some of the nodes are connected using an "ad-hoc networking model", while other nodes are connected using the "access-point networking model". In this case a special node would serve as a gateway between the two parts of the SPAN.

Although it should be pointed out that the systems, mechanisms and procedures described in this document are general and are not limited to be used in a specific transmission technology, through this document we will often refer to the IEEE 802.11 technology. It should be understood that we are referring to a wireless communication technology designed following the rules set by the IEEE 802.11 standard. The equipment could include Network Interface Cards (NICs), Wireless Access Points (WAPs, or simply, APs), Mesh Points (MP), etc. We refer to the family of IEEE 802.11 Standards and Drafts (e.g. IEEE 802.11, IEEE 802.11b, IEEE 802.11g, IEEE 802.11a, IEEE 802.11n, IEEE 802.11s, IEEE 802.11i, etc) for definitions of terms related with IEEE 802.11 technology, like BSS, BSSID, SSID, etc, which are used in this document.

Several SPANs may co-exist in the same geographical area. This may occur, for instance, when different SPANs use different radio channels, or, in general, orthogonal transmissions. However, even if several SPANs use the same radio channel in the same geographical area, they may be disconnected.

For instance, in the specific case of using IEEE 802.11 as underlying communication technology, several mutually disconnected SPANs using the same radio channel in the same geographical area may exist provided that they use different BSSIDs. A mechanism managing these SPANs with different BSSIDs is described in more detail in section "3.1.2 SSID Management" for the specific case of using IEEE 802.11 technology.

As another example, it could happen that a SPAN formed around an AP (i.e. a SPAN corresponding to an Infrastructure BSS in IEEE 802.11 technology), could coexist with other SPANs (for instance, built around an independent BSS or around another Infrastructure BSS).

1.1 Connected and Disconnected Scenarios

Figure 2:
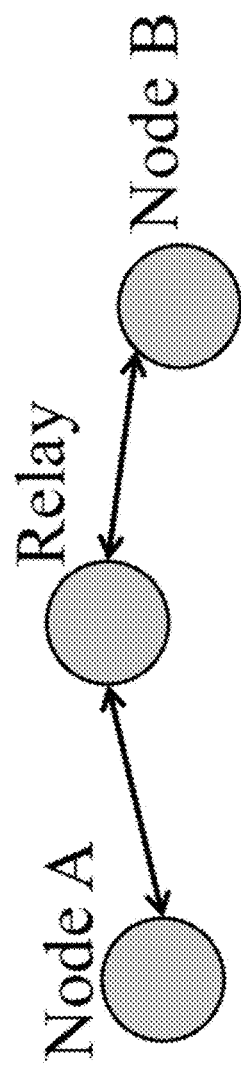
FIG. 2 shows an example of a connected scenario.

When a physical transmission path between the two nodes that wish to communicate exists, using either a single hop or a multiple-hop transmission path (and with an intermediate backbone or not), we will say that we are in a "connected scenario". See FIG. 2.

Figure 3:
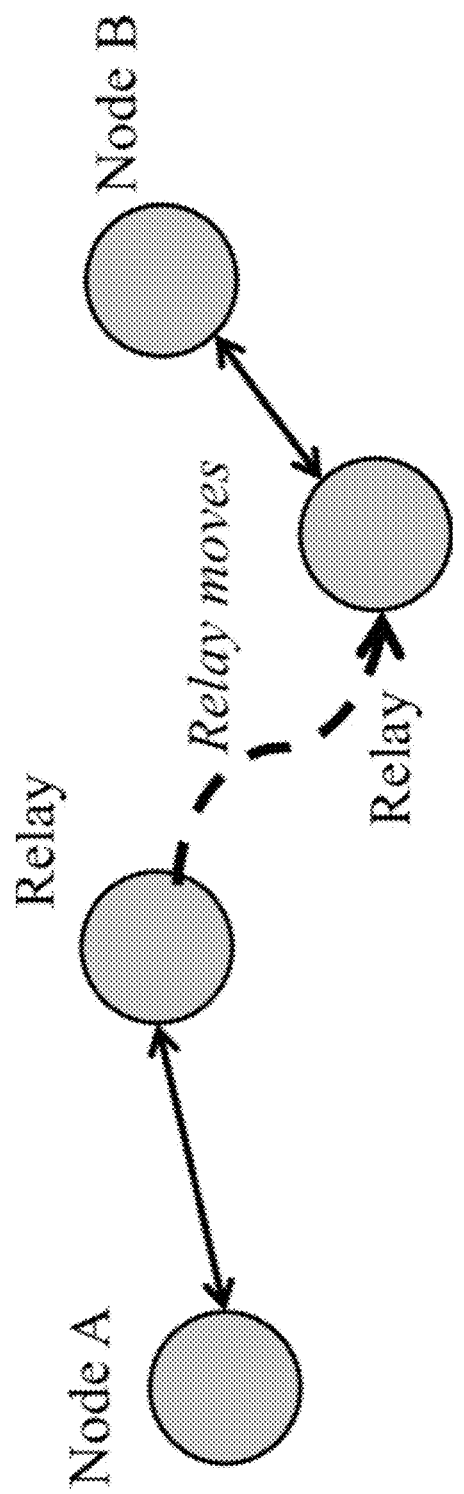
FIG. 3 shows an example of a disconnected scenario.

SPANs can also support communication in "disconnected scenarios". For example, a disconnected scenario corresponds to a situation in which a node A wishes to send some information to a node B, but there may be no possibility of establishing a physical transmission path between the two nodes, using either a single hop or a multiple-hop transmission path, due to an excessive distance between the nodes. This means that information has to be delivered (i.e., infected) from one node to the other in a delay tolerant manner. Following the example, the information that node A wishes to send to node B could reside for some time in node A or in other nodes of the network (e.g. in relay or information forwarder nodes). Due to the mobile nature of SPANs, it can happen in the future that node B will be in transmission range of some of the nodes that have stored the information addressed to B. In this case the information would be delivered to node B. See FIG. 3.

Note that the time elapsed from the generation of the message until its delivery to B can be large and in fact, orders of magnitude larger than the latencies encountered in normal connected scenarios.

Another example of a disconnected scenario corresponds to a situation in which a node A wishes to get some information from a node B, but there may be no possibility of establishing a physical transmission path between the two nodes, using either a single hop or a multiple-hop transmission path, due to an excessive distance between the nodes.

Figure 4:
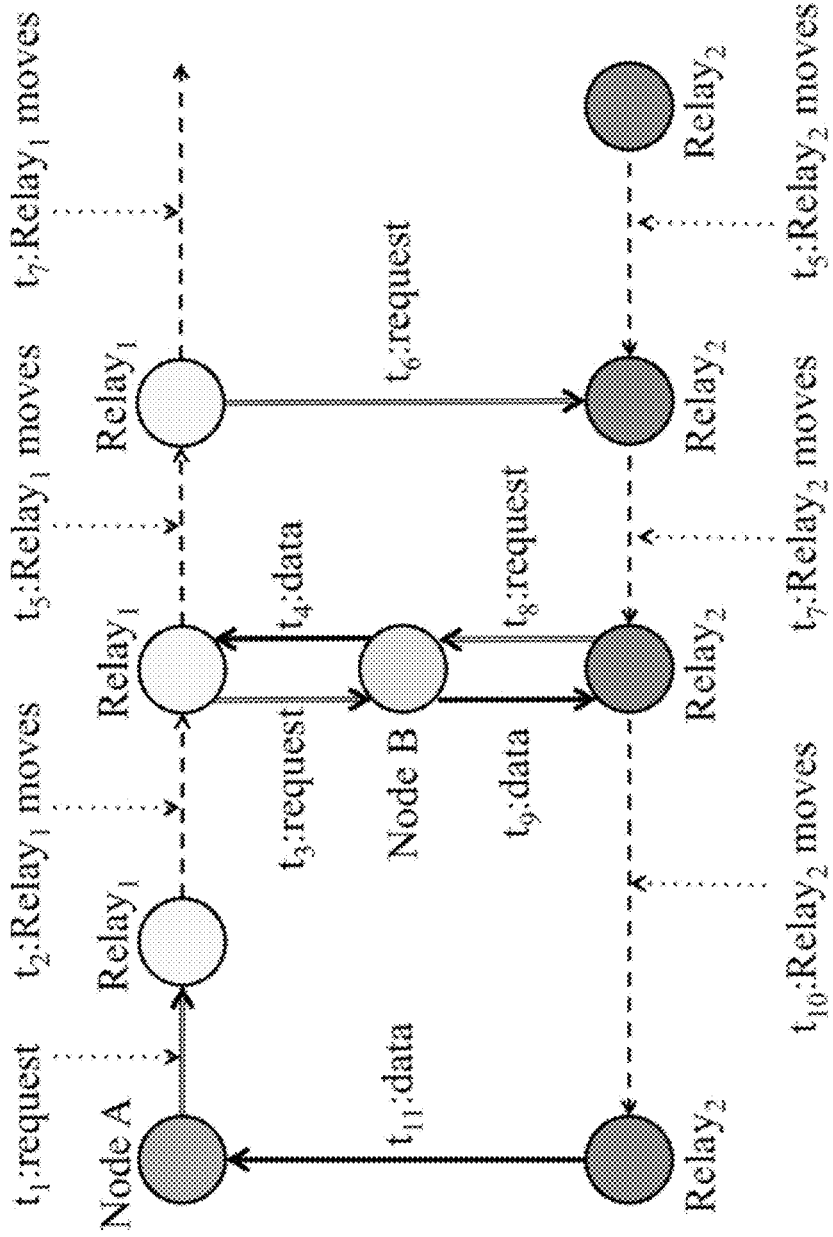
FIG. 4 shows another example of a disconnected scenario.

This means that the request of the information of the node A could be delivered (i.e., infected) to other nodes of the network (as a viral propagation), meaning that several nodes would be requesting the information and then, incrementing the probability that one of these nodes would get the information. Then, lastly, the information could be delivered from one of these nodes to node A in a delay tolerant manner. See an example in FIG. 4, where node A delivers the responsibility of requesting some data from node B to the $Relay_1$. After some time, $Relay_1$ is able to get the data from B, and moreover, is also able to deliver the responsibility of getting this data to the $Relay_2$. Then, $Relay_1$ disappears from the scenario and never gets in touch with node A, but $Relay_2$ is able to get the data from B and, after some time, able to get in touch with node A and so, able to finally deliver the data to node A.

1.2 Broadcast-Based and Server-Based SPANs

When the networking technology underlying the SPAN allows communication among nodes by means of broadcast or multicast messages, we say that the SPAN is a "broadcast-based SPAN". For instance, SPANs using IEEE 802.11 technology formed in a single BSS (either Independent BSS or Infrastructure BSS) can be "broadcast-based SPANs". In broadcast-based SPAN, several network procedures, such as broadcasting information to all the nodes in the network or discovering users or services, can be performed by means of flooding techniques. For instance, a node can broadcast a message to all their neighbours (for example, the nodes that are directly reachable using a wireless transmission, that is, the nodes inside the coverage area of the node broadcasting the message) by means of a broadcast message (although for instance, a node can also sent the message to all their neighbours by means of unicast messages to each neighour instead of using only one broadcast message for all the neigbours). These neighbours can repeat the same procedure, using some mechanisms to limit the number of messages broadcasted more than once in order to avoid an excessive traffic load. This procedure will be iteratively applied to the neighbours of neighbours, and so on, until all the nodes in the SPAN receive the message.

On the other hand, some network technologies may not provide an easy way of sending broadcast message to neighbouring nodes. In these cases, a special node (called "SPAN-server") can be used in the process of sending messages from one node to the rest of nodes of the SPAN, or to a subset of them. We will call these SPANs, "server-based SPANs". For example, a SPAN in which nodes use a cellular networking technology to establish communications can be a "server-based SPAN". For instance, if a node wants to send a message to the rest of nodes of the server-based SPAN, it can send the message to the "SPAN-server", which will relay the message to the rest of nodes of the SPAN. More than one SPAN-server can be used in order to increase reliability or perform load-balancing.

1.3 SPAN Servers

SPAN servers are nodes usually accessible through an external network (e.g. the Internet), which are used to build server-based SPANs.

SPAN servers have several functionalities:

1) Store information relative to the SPAN, such as SPAN identifier, SPAN type, geographical situation if applicable, etc.

2) Store important information relative to nodes in the SPAN, such as: Identifier, IP address, UDP or TCP port used to communicate with the Miraveo software, avatars, etc. In general this information can include the "User profile" together with other information required to direct the information to the right destination.

3) Act as "broadcast servers". This means that many of the message exchanges that are done by means of broadcast or flooding techniques in "broadcast-based SPANs" are performed by the SPAN server in "server-based SPANs". As an example, assume that a node wants to discover the other members of the SPAN. In a "broadcast-based SPAN" this can be made by means of broadcast messages. In a "server-based SPAN" this can be done by querying the SPAN Server. As another example, assume that a node wants to know the placement of a given piece of information. In a "broadcast-based SPAN" this can be done by means of broadcast or flood query messages, while in a "server-based SPAN" this query can be sent to the SPAN server which will address a copy of this query to the other members of the SPAN.

For simplicity, the description of the SPAN mechanisms in the rest of the document will be done assuming "broadcast-based SPANs". However these mechanisms will be also valid for "server-based SPANs". In the rest of this document, unless otherwise stated, we will assume that any of the functionalities described which use a broadcast or multicast transmission, can also be performed by means of a SPAN-server in the case of a "server-based SPAN".

1.4 Infrastructure and End-User Nodes

Independently of the use of ad-hoc or access-point networking model, or of the fact that we are in a connected or disconnected scenario, a SPAN can have "infrastructure" and "end-user" nodes.

From a technical point of view, infrastructure nodes and end-user nodes in a SPAN may not be too much different. With regards to the mechanisms that govern the data transfer (communication protocols), both types of nodes may behave in the same way.

Usually, infrastructure nodes may have more resources. For instance, infrastructure nodes may have a continuous power supply, whereas end-user nodes may be powered by batteries. Infrastructure nodes may also employ more sophisticated transmission techniques or communication protocols and may have also a wired or wireless interface connected to other networks (e.g. the Internet).

However, the main difference among them is in the fact that end-user nodes belong to the final users of the network, which participate in the SPAN in a spontaneous and not necessarily in a planned way, while infrastructure nodes are usually fixed in a given geographical point and belong to some entity or company which owns and manages them.

In this document, infrastructure nodes that are connected to a fixed network (e.g. the Internet) will be also referred as "boxes". These boxes could be the same equipment used to serve as the central nodes of access-point based networks, but this is not the case in general.

1.5 Groups and Access Mechanisms

SPANs may contain zero, one or more groups. Groups may include a set of users that share the same characteristics or interests (e.g. fans of a football team, workers of an enterprise, teenagers or just general users, etc). Groups can be seen as a virtualization of different subnetworks inside the same SPAN.

Groups can be public or private. All users may join/leave public groups. A user may belong to zero, one or to several public or private groups.

The fact that a given user does or does not belong to a group is controlled by means of some "access mechanisms". For instance:

1) It is possible to use an access mechanism in which, in order to belong to a private group, users must know a shared secret or have a given token (e.g. a password).

2) In this document we also describe an access mechanism based on Access Lists for controlling the access to a private group.

Figure 5:
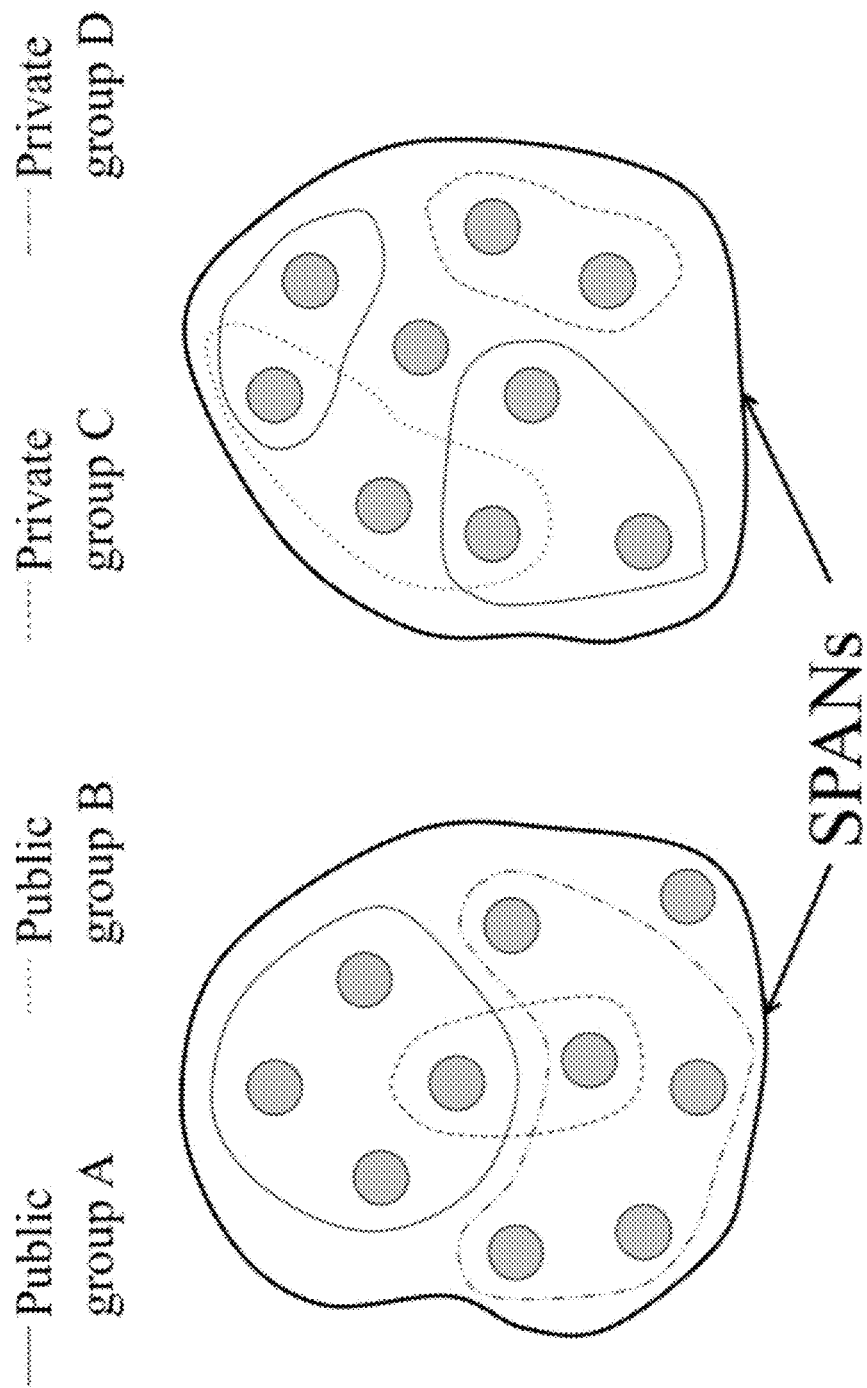
FIG. 5 shows examples of SPAN and Group scenarios.

At the same time, one group may belong to one or more SPANs. This occurs, for instance, when different users of the same group join the group in different geographical areas or even in the same geographical area but in different SPANs. See an example of different scenarios in FIG. 5.

In the specific case of using IEEE 802.11 technology, the mechanism managing the SPANs with different BSSIDs (see section "3.1.3 Merging and Splitting of SPANs and Groups") will also take into account the management of these groups.

Through the SPAN Scanning function (see section "3.1.1 SPAN and Group Scanning"), nodes may detect the existence of the available SPANs in their geographical proximity (although in some cases geographical proximity is not required as explained in section "3.12 Proxy Nodes and Remote SPAN Users"). Moreover, users may obtain information about the existing groups of these SPANs (e.g., a name which identifies the group), and about the users of each group (e.g. a nickname which identifies the user). Nodes may not be able to obtain information from groups they cannot join (e.g. from a private group to which they do not have access permission).

It is also possible that some groups may not be visible to all users except for a given number of them, meaning that some users may not be notified of the existence of these groups.

1.6 User Profile

Nodes of a SPAN can be used by one user, although one may imagine the case in which a node may be used simultaneously by several users. Each user of the SPAN will have associated a user profile.

The user profile includes information relevant to the user, which may be distributed to other SPAN users. For instance this may include a User identifier, which could be a string (e.g. "Alice", "Alice99", "Alice@university", Alice@university.edu, etc) identifying the user. These identifiers may be uniquely defined under a given administrative domain or not:

1) In the first case, an administrative entity, managing the user identifiers, will assign the user identifiers, without allowing repeated identifiers. The other users will know this identity of the user, probably also verifying first the correct identity of the administrative entity.

2) In the second case, users will use a temporary identity. Some way of distinguishing these temporary identities from permanent identities will be provided. For instance "Alice@university" could correspond to a uniquely-assigned identity, while "@Alice" could correspond to a temporary identifier, using, in this example, the character "@" in the beginning of the identifier as indication that this is a temporary user identifier.

The user profile can also include other information. For instance:

1) A small picture or avatar of the user
2) IP address of the communication interfaces of the mobile device (for instance, WiFi interface, 3G interface, etc)
3) Type of SPAN the node belongs to (e.g. SPAN using ad-hoc networking mode, server-based SPAN, etc).
4) In case of server-based SPANs, SPAN server address
5) Applications supported by the user
6) Small text introduced by the user
7) Cryptographic information (e.g. public key, etc)

The user can have a way to manage its own profile and a way of knowing the public information of the profiles of the other users of the SPAN.

1.7 Distribution of Infolets in SPANs

SPANs can be used to distribute "infolets" among users. "Infolets" are pieces of information (e.g. a short text, a picture, short news, a commercial offering, etc) that are distributed to the SPAN users in a delay tolerant manner, usually with some "time to life". The "time to life" defines a period of time within which the infolet is relevant for the users. When this period of time expires, the infolet does not need to be stored, distributed and displayed by the users.

Infolets can be addressed to any user (broadcast mode), to a subset of users (multicast mode), or to a specific user (unicast mode).

Infolets can be generated by any node of the SPAN or by nodes that are connected with the SPAN through some kind of communication network. In the last case, infolets can be injected in the SPAN through SPAN Boxes (i.e. infrastructure SPAN nodes).

Infolets can be displayed in a user's equipment. The infolet can be displayed as part of an application specifically designed for this purpose, or it can be displayed concurrently with other applications that are being executed by the user's equipment. This also includes the case in which the user device uses other methods for delivering information to the user (e.g. audio messages, etc).

For instance, one could imagine that the user device is running an application specifically designed to show, in a given format, the information carried by an Infolet. In another example, the Infolet appears as a short text or a small image in the screen of the user device, while the user is running another application, for instance a game, a chat or file sharing, a bulleting board, etc, on a SPAN. Some portion of the screen of the user device would thus be reserved for displaying infolets.

Infolets can have a viral propagation. Assume that a node A has received an infolet. It can happen that this infolet is shown to the user or not. But independently of this, the infolet can be stored in node A. When node A meets other nodes of the network, lets say node B, node A can send the infolet to node B. Node A can keep storing the infolet and replicating this process in the future with other nodes of the network. Also node B can repeat this process, meaning that the infolet received by node B may or may not be shown to the user of node B, but in any case, node B can store the infolet and send this information to other nodes in the future. Infolets can have a given "time to life" which controls the time in which the nodes keep storing the infolet and keep transmitting them to other nodes of the network.

Infolets can be classified in order to identify which users will be interested in displaying them. Thus, some infolets can be classified as of being of interest for a given class of users, meaning that when a node belonging to users of this class receives the infolet, it would probably display the information to the user. Note that the elapsed time between the moment in which the infolet is received by the node and the time in which the infolet is displayed can be large, and can be made depending on many parameters defining the infolet information, such as a maximum time period defined by the infolet, a priority, user profile, a thematic classification, etc.

1.8 Mobility Servers

The Infrastructure nodes will usually play an important role in service deployment within a SPAN. They can be used, for instance:

1) as SPAN-servers (see section "1.3 SPAN servers").

2) as repository points of infolets without important storage space constrains (see section "1.7 Distribution of Infolets in SPANs").

3) as network access points through which information is injected into the network (e.g. advertising announces, citizen information, etc), (see section "2. SPAN applications") or 4) as network access points through which users can access the Internet or other remote SPANs (i.e., as gateways to the Internet), (see section "3.12 Proxy Nodes and Remote SPAN Users").

Figure 6:
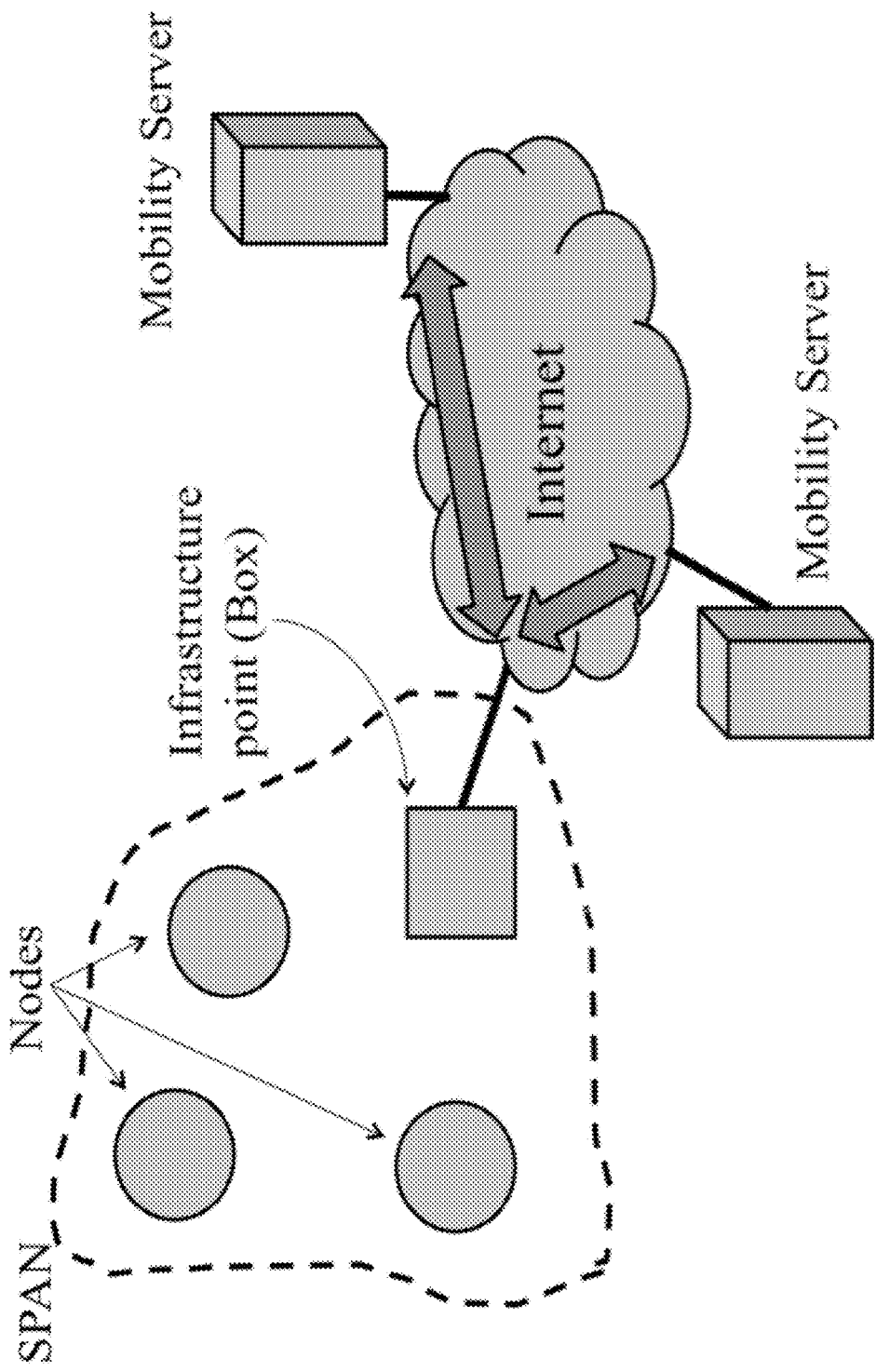
FIG. 6 shows an example of the mobility server scheme.

A Mobility server is a device, usually connected with the Infrastructure point through a communication system (for instance the Internet), which is used as a support point for the Infrastructure nodes or for example, to give a special service to nodes in the SPAN (e.g. serving as a SPAN-server). See an example of the scheme in FIG. 6.

Mobility servers have different constrains regarding resources, security, availability, management, etc, in comparison with Infrastructure points.

Mobility servers:

1) can have much higher storage capacity than Infrastructure points, 2) can be in much secure environments, as they can be placed in physical rooms with security surveillance, etc.

3) can be considered as high-available systems, with redundant power supply, redundant access to the Internet, backup policies, etc, and 4) can be easily managed, as they can be under the full control of the organization providing the service.

Services will be usually built by means of a coordinated operation between the Infrastructure point and the mobility servers.

2. SPAN Applications

In the following we describe some applications that may run on nodes of SPANs.

2.1 Locating Nearby Users

Using some information displayed on the device, for instance a management screen, the user may be able to know how many people is on his group and who they are (for instance, classifying them in either unknown, non-friends, friends, etc).

SPANs are well suited to serve as proximity networks. The fact that two nodes are in the same SPAN will usually mean that they are in their proximity. Users can be approximately located inside a given geographical area without requiring any additional positioning system, such as a Global Positioning System (GPS) device.

Assume user "A" creates a profile (see section "2.2 Profile, Chat and File-Sharing") with information that can be disseminated to other nodes of the SPAN.

A possible embodiment of this would be a simple distributed mechanism in which nodes store the identity of other users of the group or SPAN during a given period of time, and provides this information and its own information to any node who queries them (i.e., provides means for locating nearby users).

In a "broadcast-based SPAN" this dissemination could be achieved through flooding. In a "server-based SPAN", a SPAN server can be used to disseminate this information as described in section "1. SPANs".

Both mechanisms may include means for limiting the horizon in which this information will be sent through the network (see section "3.2 SPAN and Group Limits and Horizons").

Both mechanisms can also have a "delay-tolerant" behaviour. This means that during the process of profile dissemination (through flooding or through the use of a SPAN server), the information can have a given time-of-live, meaning that it is disseminated during a certain time period, even when the originator node has possibly left the SPAN.

Once the profile of user "A" is disseminated through the SPAN, others users of the SPAN can be informed the user "A" is in the SPAN.

This information can be linked with time information (e.g. user "A" is no longer in the SPAN, but he was last seen there at a given time, etc).

Moreover, this information can appear filtered to other users depending on the group to which user "A" belongs, privacy settings, etc.

In this way, SPAN users can know how many people are on his group and who they are (for instance, classifying them in either unknown, non-friends, friends, etc).

What has been described can be a stand-alone application or be part of any other application for which proximity is important, see for instance sections "2.5 FriendsTree" or "3.13 Kalahari: Network abstraction created by Miraveo".

2.2 Profile, Chat and File-Sharing

The idea behind these applications is to include music, video and in general, file sharing amongst friends and neighbors while also serving as a profile based social networking application along with a chat service.

Additionally, the user may be able to know certain details about the other user profiles. This could be made, for instance, scrolling through a list that may also come with a search or optional filter, via an icon alongside the name (e.g. if they have a shared music/video library, have certain playable games, or have blogs/shared documents).

2.2.1 Profile and Chat

It may give the user the ability to create a profile and a status bar. The profile may consist of an avatar or photo along with personal details (for instance, pictures, music, video, documents such as blogs, articles, or private documents, etc).

Users may also be able to create/join/leave certain groups, accept and invite friends, and also control the amount of content visible and sharable to those specific groups or persons.

E.g. Joe works for ACME Corp. and has certain work documents on his mobile device that he wants to share with his coworkers but no one else. He can therefore set the documents to only be visible and shared with persons also belonging to his company's group or even division within the company. Consequentially, he may not want his coworkers to know some personal details, music choices, or friends he has so he can mark those as invisible to that group. This sort of privacy settings can also be applied to individuals as well as groups.

Users may be able to send friend requests and messages to new users, but they may also have the option to automatically decline to receive these requests and messages if one chooses.

Chat may also be incorporated so that users can either chat individual-to-individual, individual to a group, or in a group (multiple individuals in the same chat). The chat history may be saved according to user preferences. Video and audio chat may also be included.

Games (such as Scrabbulous, chess, Battleship, and maybe even group games like Risk) may be also incorporated into these applications as well.

2.2.2 File Sharing

As mentioned above, users may be able to select which files to share and with whom. In order to guarantee the possible restrictions set down by copyright law, restrictions on the way information under copyright is shared can be established. Other material (or copyright material owned by the user) may be either shared as streaming only or available for download depending on the users preference.

An interesting technique for music and video sharing is to link the profile to the music playlist inside the user's phone so that other users on the network may view and stream the music/video to their device.

Documents may be shared to other users and may be maintained within the user's profile in a folder-like organization model.

2.2.3 Billboard

The billboard may serve as a public posting application. Users may be able to browse postings under certain categories such as dating or friendship, buy/sell, public events, recommendations, general questions/comments, meet up groups, jobs, artist/musicians postings, housings/rooms for rent, etc.

The categories may display how many postings they contain so that the user does not need to go into every category in order to find out this information.

This application may be linked with the profile application so that users may see who posted what (although users can choose to post things anonymously) and thus make it easier to connect with.

Additionally, the postings may be kept within the public posting (that will serve as a temporary Virtual Spontaneous Database (see section "3.10 Virtual Spontaneous Databases (VSDs)") so that even if the user leaves the network, his postings will stay alive for other users to see for, for example, a predetermined period of time.

2.3 Keeping Track and Limiting Posting

If there begins to exist postings from advertisers or "power users" or any other form of postings (or other data propagation) that need to be limited in a certain way (for example a posting valid only from June 10-17), one method of doing so would be to use a mathematical hash algorithm that would take these limitations into account (in the example of the Jun. 10-17 limitation, it could be a hash including the date). It may also be utilized to limit the amount of or type of postings or data propagation from an individual or group. The hash code may be included in the system software and the critical hash keys may be kept and maintained by some authority (e.g. the company creating the SPAN software).

2.4 Group Global Neighborhood

Some nodes of a group may be connected to the Internet. This means that other nodes of the group could also get a connection to the Internet through them.

Figure 7:
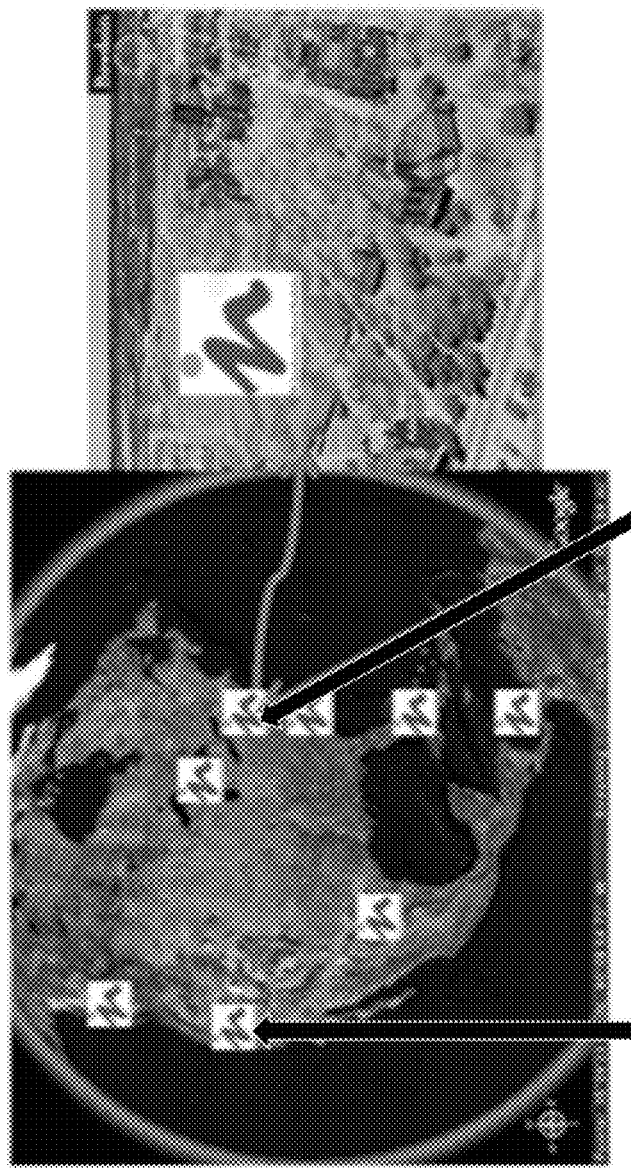
FIG. 7 shows an example of the Group Global Neighborhood.

On the other hand, users who are not in the same geographical area where the group exists can still participate as nodes of the group through a proxy node. We will say that these remote nodes belong to the Group Global Neighborhood. See FIG. 7.

The Group Global Neighborhood may be created in the following way. Users with internet connectivity can browse a map (such as Google maps/earth) on a website that flags all the public or private groups of all SPANs connected to a fixed node serving as an internet access point so that the user can join any one of these groups anywhere in the world via the internet and thus appear as a local member to the other users within that group.

In this way, users can enter into a group of a SPAN within range of an Internet Access Point, thus acting locally even from distance (hence the name Global Neighborhood). The user will now be able to interact with other members of the group as if he was physically close by, i.e. within the group's physical vicinity. This has great potential in multi-hop SPANs.

2.5 FriendsTree

The philosophy behind the Friends Tree Application is to facilitate communication and awareness between persons. This enables a true local network socializing to be able to discover friends around the user and the relationships with people around him/her otherwise unknown.

The application provides core mechanisms to display persons connected near the user, their information/profile, their relationship with him/her and the user's friends, etc. Furthermore, the application may be able to keep track of what users have appeared on the network, including the date and time they were last seen, by storing this information in an offline user list. And lastly, the application may provide interaction capabilities based on messaging, poking or finding, while also allowing the user to customize his/her privacy settings.

2.5.1 Login View

The application may have a login view. It will be the first view a user will see after starting the FriendsTree Application. This view will display a list of all the FriendsTree Accounts already created that a user can choose to login with or delete. The third option the user may have in the login view will be to "Create New Account". If this option is chosen, the user will be taken to the Registration views.

2.5.2 Registration Views

These can be the set of views a user may see when creating a new account. The first view will be composed of entering for example a username, nickname (optional), password (optional), and password hint (optional). At the bottom of the view will be a "Next" button that the user presses to submit the data he inputted (username must be filled in for this to work) and proceeds to the second registration step.

The second view may ask the user if he/she wishes to integrate their account with a Social Network account (optional) they have on the internet (for example Facebook, LinkedIn, etc). The user will be asked for their username and password corresponding to the social network account they wish to integrate with and click on the button "Integrate" at which point the application will try to connect to the social network site, authenticate the account, and download the contacts and relevant information from the account. Either an "Integration Successful" or "Integration Unsuccessful. You can try again later" text will appear depending if the integration succeeded or not. At the bottom of the view will be a "Next" button that the user may press to proceed to the third and final step of creating an account regardless of whether the user integrated with a social network or not.

The third view may prompt the user to fill in his/her profile information. If the user integrated with a social network site, some of these fields may already be automatically filled in, but remain editable. The fields the user will fill in may be contact details such as real name, email address, phone number, etc; personal details such as work or school details, hobbies, etc; an avatar; a set of pictures; etc.

At the bottom of the view can be a "Create and Login" button that the user will press to finalize the account creation and login to the network.

2.5.3 User List View

This view may basically consist on an ordered list of user's friends (those acquired from the Social Network synchronisation or by application friendship establishment), connected users near the user and also recently viewed users even if they are not connected. By means of this view the user can visualize the network activity, have an overview of friendship relationship among the users and interact with them with different provided mechanisms (for example, messaging, poking, etc). This view may be formed by the following elements:

1. User's Main Public Information

On the top of the view it may be shown the user's avatar, the nickname (or the username if nickname is not yet informed) and his/her status info.

2. User List

List of connected users, friends or recently viewed users. Each item of the list may contain the corresponding user avatar, his/her nickname and also particular information depending on the user type. The list may be ordered depending on the user types or categorisation:

1) Connected friends: connected users identified as friends (by Social Network synchronisation or application friendship establishment). For each friend there can be displayed the number of friends in common with the local user in case there is one more shared friends.

2) Connected $2^{nd}$ degree friends: one remote user is recognized as a $2^{nd}$ degree friend when at least one of his/her recognized friends corresponds to one of local user's friends list. For each user item corresponding to a $2^{nd}$ degree friend there is displayed the number of friends in common.

3) Unknown connected users: all connected users not corresponding to any of the precedent categories.

4) Disconnected users: offline users stored depending on its user type. For example:

4.1) Offline friends: they remain permanently in the list.

4.2) Offline $2^{nd}$ degree users: the number of common friends is also informed. They only remain in the list a limited period of time.

4.3) Unknown offline users: they only remain in the list a limited period of time.

When clicking on a particular user a set of options may be displayed (for example, view his/her profile, view his/her relationships, poke him/her, message him/her, find him/her (meaning that as soon as this user appears as connected a popup window will be displayed indicating that the corresponding user has been), request him/her for a friendship, revoke his/her friendship, etc).

2.5.4 Profile View

The Profile view may consist of showing several fields of the user such as username, nickname, avatar, etc. In fact, all the fields used to create this profile.

A user can see and edit any of these fields within his/her own profile with the exception of username and as long as his/her real name and email addresses are not blank.

If a user is viewing another user's profile, only those fields shared with that user by the profile's owner will be viewable to the user. However, all users' username (or nickname if they have one), avatar, status message, and last 3 times seen fields may be publicly shared and visible by everyone on the network.

2.5.5 User Relationships View (URV)

This view is contained in the profile view as part of the user information. It consists of a list with each user's avatar, username or nickname, status and number of friends in common (FIC) with the user of the profile being displayed.

When displaying a friend's URV (fURV), it may show all relationships of the friend with all of the other user's friends as well as the rest of the users connected. On the other hand, an unknown user's URV (uURV) will only show his/her relationships with the handset user's friends.

The main point of this view is the number of friends in common. That is a comparison between both users' friends list. Moreover it allows to click on it and see the names of the friends in common if both users (profile user and user on the list) allow the handset user to see their friend's list, otherwise if one or both of them have their list "protected" the URV won't allow our user to click and see the names. By default you share your friend's list with all your friends and never with unknown users, although it may be changed within settings view.

2.5.6 Activity Log

This view represents a list with the last N interactions from and to our user. Interactions can be pokes, messages and new friendship requests. The list order can be changed in the settings view.

When more than one poke or new friend request is received from or sent to the same user, only one item can be placed in the activity log and it's timestamp will reflect the last similar interaction.

2.5.7 Settings

This view will contain the settings for all the views and features in the application. It's divided into four main groups: profile/privacy settings, activity log view settings, user list categories customization and general settings.

2.5.8 Features 2.5.8.1 Friendship Establishment

In order to become friends directly through the network (i.e. authenticated and trusted users), a user (originator) may first send a friend request to the intended user (destination) and that user may then accept the request. The friend requesting user send a Friend Request to the user he wants to become friends with. Upon receiving this request, the other user will decide to either reject, thus discarding the request, or accept where he stores the account information contained in the message and sends back a Friend Accepted message that includes his relevant account info.

If a user wants to revoke a friendship it will mark a friend as not friend, that friend may be placed on unknown (or $2^{nd}$ degree if in case) category. The revoked friend (RF) won't delete the user until he appears on the network and RF notices that the user doesn't have RF in it's friends list so RF will delete the user as a friend automatically. At the end, both of the users will have each-other on unknown or $2^{nd}$ degree lists and only will see each-other when both are connected.

In case of a request message is sent and the receiver is not connected the system may store this action until the user appear on the network or a timeout (e.g. 1 week) finishes. In case a request message is sent, the receiver accepts it's request but in that moment the originator is not on the network, the receiver behavior will be as he/she hasn't accepted the request yet and a warning message may be shown. Furthermore sender can make several requests to the same user, but only one may be displayed on the receiver until he/she answers it or the timeout expires.

2.5.8.2 Friendship Relationship Maintenance

Users connected on the Network are constantly exchanging their own list of friends with the other users, thus maintaining the relationship between connected users and the local user always updated. However, the application may only store the friends list of the local user's friends so as to recognize the relationship between local user's friends and the other connected users, even if the local user's friends are offline.

2.5.8.3 Social Network Integration

The user's social network site and corresponding account details are saved to his Social Networks List (the user's username becomes linked with the social networks usernames/accounts he wishes to integrate with). His social networking site's contacts can be saved as semi-empty entries (only the contacts Social Networks List detail is filled in using the corresponding information taken from the social network site he is integrating with) within his MyFriends List.

This affects friendships at both the direct and $2^{nd}$ degree level (however, there is no innate limit to the degrees of friendships). For instance, if our user has a friend's MyFriends List which includes a full entry (username, profile info, and Social Networks List) of a user that solely matches a social network contact entry (only info of that entry is the social network username of that contact) in our user's MyFriends List then our user can request and fill in the details of that social network contact to become a full entry in our user's MyFriends List. The Second Degree Friends feature is affected such that if a friend of the user integrates his MyFriends List with his social network contacts, then some of our user's Second Degree Friends will also be derived from the social network of his friend.

Furthermore, status updates written by a user can also be linked to their social networks they've integrated with so that the status update can be uploaded to those social network sites online when an Internet connection is available. It may be also possible to share files and profile info with the Social Networking sites.

2.5.8.4 User Categories

Friends can be placed in folders that come by default or are created by the user (each may have different visibility permissions) in order to help the user organize his friends by type or affiliations. For example, our user might choose to organize his friends into school, work, and soccer categories. Any friend not organized under these categories will be placed in the general friends category that comes as a default category. Each of these different categories may have different permissions and profile visibilities. The category names, settings, and members may be editable at any time by our user.

2.5.8.5 Taking Notes on Users

Notes may be written for any user our user wishes to note and serve the purpose of remembering certain details about a user in the future. However, if the note corresponds to a user that is not a friend of our user, the note written about the other user may be kept with the rest of their relevant information (username/nickname, creation timestamp, avatar, status message, and last time seen) and be stored even if that user is no longer online. These noted users could be stored in a Noted Users List on our user's device.

2.5.8.6 Finder

Finder functionality consists in a particular user's appearance signalling. The local user has the option to mark an offline user appearing on the user list. Once a user has been marked to be found a special icon may appear over the user item and the user will permanently remain in the list even if it is not a friend. As soon as this user appears in the network a popup window will be displayed indicating that the corresponding user has been found and a log message is generated. At the same time, even if the searched user has not appeared but someone connected has seen him/her a popup window will be also displayed indicating that the corresponding user has seen the searched user and the time he/she has been last seen. A log message is also generated. When a searched user has been found it is automatically unmarked to be found.

2.5.8.7 Messaging

When the user wants to communicate with another user, he/she can send a text message. This action can be fetched over any of the users in any view and if the receiver is online. A messagebox popup will be displayed with an empty field to write the message.

When receiving a message, the popup will have the answer button which automatically will open a new send message popup.

If you open a received message from the activity log view, the received message popup will be displayed again and the answer button will only be available if the sender it's on the network. In case of sent messages, a send message popup will be opened with the text filled with the old message, send button will only be available if the receiver it's on the network.

2.5.8.8 Poking

Poking is the fastest way to take attention of a user. When the user pokes another, the receiver will display a poke popup with the user name and it's phone will ring. This behavior can be changed in the settings view, if popups are disabled only a new item in the activity log will be placed.

When a user receives a poke it can answer with another poke, but only if the sender is still on the network.

Opening a poke on the activity log view allows to repoke or answer the selected poke.

2.5.9 N-th Degree Extension

Although in the previous embodiment of the Friends Tree application only $2^{nd}$ degree users are shown, another possible embodiment could be to show the users until a N-th degree of relationship.

For example, it is told that with 6 degrees of relationship every person could meet every other person in the world. Then, we could limit the number of degrees of the applications to 6 instead of 2.

2.5.10 Organizing Users

A user may want to maintain a list of certain trusted users that it allows more access and interaction capabilities to. This set of trusted users are called "Friends" of the user. In addition there might be some users that a user might wish to take write "Notes" about to help remember a certain characteristic of that user next time they see them on the network.

2.6 Virtual Stand

Virtual Stands may serve the purpose to act as a virtual conference or fair to nearby users.

With the Virtual Stands application, businesses and others who wish to have stands at a fair, conference, convention, trade show, etc, may upload specific information and propaganda that they have in their physical stand or additional resources that are only available for their virtual stands that users at the conference and fair can view without having to physically visit the physical stand.

Moreover, the data of the virtual stands may stay available (or at least viewable) to the guests of the conference during breaks, afterhours, or even after the conference has ended, in the conference building or everywhere, as other users can have this information available in their devices, and can exchange this information with users who were not physically in the same SPAN at the point where the fair information was injected.

For instance, in a cell phone conference, a large cell phone manufacturer may want to provide info on its virtual stand profile such as press releases, videos, new phone details, news, events, contact info, and live chat.

Also, a small development company would want to upload such things as experience, pricings, news, company details, contact info, etc. In this way, users within the convention can browse all the virtual stands representing the actual companies in the convention and access any supplemental documents or information they have provided virtually whilst having a coffee break, in his hotel, at home, or any other time and place.

2.7 Virtual Shops

Virtual Shops may serve the purpose to act as a virtual shop to nearby users.

With the Virtual Shops application, businesses and others may make public some commercial information, special offerings, propaganda, etc, for informing potential customers who are reachable through a SPAN.

Moreover, the data of the virtual shops may stay available (or at least viewable) to the customers who did not belong physically to the same SPAN at the point where the shop information was injected, as other customers can have this information available in their devices.

For instance, a shop can made available the collection of the new clothing for the summer period through a catalog which is available through a given SPAN. Once a user has downloaded this catalog, it can take a bus and other potential customers who are in the same bus can also obtain the catalog information, although they are not directly connected to the SPAN the shop belongs to.

As another example, a coffee shop can send to a specific user an offering for a discount latte if the customer visits the coffee shop in the next 30 minutes.

Users may have the option of allowing or not the incoming messages from a Virtual Shop.

2.8 Location Information and Targeted Propaganda

Giving users the ability to be connected in a truly real time and local manner allows for the possibility of locale accurate information gathering regarding statistics such as personal interests and trends. This can be a huge benefit for advertisers in terms of knowing precise details on every neighborhood in an area. Moreover, there could be a template polling application that can be designed according to the interested party (commercial stats company, or a polling organization) so that the desired information can be gathered from users within SPANs (and within privacy limitations).

An example may be music tastes in a particular neighborhood so that advertisers could know what, how, and when to advertise in that area. For instance, by surveying the music playlists (via such applications as the Profile) of users connected in a SPAN in the area for a few days, one finds out that there is a tendency to listen to some bands more than others (or a style of music) which consequentially leads the advertisers to create a billboard in neighborhood X for one band and in neighborhood Y for another.

Besides the information gathering from public information within users in a SPAN, other types of information gathering styles such as voluntary polls or surveys could be initiated with a similar app and could include such things as public opinion, habits, quizzes, games, etc.

On the local business (or advertiser's) side, they can inject information such as news, their menus, location, specials, and misc info and propaganda to a SPAN population such that users gain awareness of not only the people within their surroundings but also businesses and shops. The injected information can be transmitted to the users within the SPAN by postings in a Billboard style application, or as a banner style advertisement on the screen.

Another use of SPANs in the context of targeted propaganda is related with some specific applications. For instance, an application with similar functionalities as FriendsTree (see section "2.5 FriendsTree") could be used as a way of sending targeted propaganda, discount coupons, or any other kind of information from a shop, bar, restaurant, hotel, or any other business, to their customers.

Assume user "A" accepts to be part of a "club of customers", or "frequent customer" etc, of a business (e.g. a shop, bar, restaurant, hotel, or any other brand or business). Assume user "B" is somehow related with user "A" (for instance, "A" and "B" are both related through common friends in a given social network applications such as Facebook, LinkedIn, etc; or they share common interests). When the business detects the presence of B in its proximity, it can send to B any information it wishes. For instance, telling user "B" that user "A" is part of a "club of customer" of this business, and may be offering some kind of discount, or any benefit if "B" purchases in the business.

2.9 Vehicular Networks

Vehicular networks refer to networks formed by nodes mounted on cars, trucks, buses, and any other type of vehicle. SPANs are a natural concept in this environment, as vehicles could establish communication among through direct links, without using any infrastructure.

SPANs may be used to communicate vehicles for exchanging safety alerts, files, maps, etc.

2.10 Applications of Infolets: Viral Propagation of Information

In section "1.1 Connected and disconnected scenarios" we have seen several examples of viral propagation of information. In section "1.7 Distribution of Infolets in SPANs" we have seen how infolets could be distributed in a SPAN.

Merging both sections, we could think in using viral propagation of infolets for specific applications such as propagation of advertising among users of the SPANs, or propagation of city information, institution information or personal information into a SPAN network.

Furthermore, the applications themselves could be virally propagated amongst users.

2.11 Other Applications

SPANs may also be used for applications in factory and industrial automation, vehicle anti-collision systems, military applications, robot communication and interaction, machine to machine status and reporting, local networking of computer and office devices beyond the reach of traditional server based connectivity, human and animal assistance, intelligent warehousing applications, hospital, clinical and rehabilitation facility, and retail store management.

Specific applications for each topic are listed below but are not meant to be exclusive or comprehensive solutions for each:

For example, in factory and industrial automation, SPANs may help to coordinate (i) activities between machines in assembly lines, (ii) self managed equipment for in-building and in-factory transport systems, (iii) interactive communication for floor coverage between intelligent facility cleaning equipment, (iv) parking lot systems to communicate payment and location systems with automobiles, and (v) toll systems to pay for vehicle traffic passing through or by toll collection points, etc.

In vehicle anti-collision systems and traffic control, SPAN may help to coordinate (i) auto to auto collision alert and communications between automobiles to prevent contact while in motion, (ii) automated navigation of automobiles to travel in difficult environments or in dangerous driving conditions for humans, and (iii) traffic control systems to communicate with vehicles for traffic light signaling, speed control, flow management, road alert, and hands free driving, etc.

In Military/Police/Fire control areas, SPANs may help to (i) enable "swarm" behavior for robotic surveillance devices (aerial, ground, water) traveling in dense groups, (ii) allow information sharing across devices and mobile equipment in a localized geography to coordinate search and rescue, fire suppression, intelligence gathering, unmanned navigation, (iii) coordinate weapons targeting in mobile environments such as targeting while in motion by robotic cannons mounted on moving vehicles, (iv) coordinate in flight drones traveling in groups for targeting, fire and effective area coverage, and (v) report from machines, robots, drones to humans for battlefield, search and rescue and command and control coordination, etc.

In human and animal assistance, SPANs may help to coordinate (i) intelligent implant devices to track people and animals (locate lost animals, people) and (ii) external wireless equipment communications to monitor individuals and patients worn on clothing, or on the person/animal, etc.

In robot communications, SPANs can help to coordinate (i) robot equipment interaction where non human control is required or desired and (ii) information transfer among intelligent robots and machines for status, navigation, etc.

In office networking and automation, SPANs can help to coordinate (i) wireless communication for office equipment, computer and communications devices where no network is available, (ii) rural network communication systems, and (iii) remote office, community and school networking of devices and individuals, etc.

In warehousing operations, SPANs can help to coordinate (i) inventory tracking and management equipment communications and (ii) automated warehouse inter equipment and between warehouse and stock control and transport equipment, etc.

In hospital, clinic, rehab center and retirement facilities, SPANs can help to coordinate (i) personnel communication, (ii) facilities staff coordination and (iii) patient transport and support equipment management, etc.

In retail store support, SPANs can help to coordinate (i) communication between product stock and inventory control systems and (ii) communication between product and shopping software to locate products in store, etc.

3. SPAN Network Services

3.1 SPAN and Group Management

This novel network service is designed so that applications may allow users to create, join, leave, scan and, in general, manage SPANs and groups in a SPAN.

The management function may allow creating new SPANs or joining already existent SPANs. In order to join already existent SPANs, the management function may allow scanning SPANs (see section "3.1.1 SPAN and Group Scanning").

At the same time, the management function may allow creating new groups in a SPAN. And for example, when creating a group, if a SPAN does not exist, a SPAN containing this new group will also be created.

The management function may allow joining already existent groups of a SPAN. In order to join already existent groups, the management function may allow scanning groups of a SPAN (see section "3.1.1 SPAN and Group Scanning").

The management function may allow creating public or private groups.

In the case of private groups, the user may choose the conditions under other users can belong to the group (for instance, they may require a password).

In the case of public groups, the user can create generic groups, or thematic groups (i.e. public groups in which users are expected to have some specific interest).

Users can create groups using some pre-stored or pre-configured profiles, which specify the characteristics of the groups the user wishes to create.

Group creation may also be subject to restrictions or limitations. For instance, the creation of private groups may be only allowed if the users register them in some server, and it may even be subject to payment (see section "3.5 Registered and Ephemeral Users, Groups and Applications").

Once within a group, the user will be able to see all other users of his group and interact with them via applications (e.g. chat, billboard, and profile/file sharing).

Additionally, the management function may allow users to see and interact with the users of all public groups within range as well as with the name of all nearby private groups, from the same and different SPANs. The essence of this networking service is to allow the user to view and interact with users of both public and private (if he had the correct permissions) groups that will be within a certain multi-hop range from the user or reachable through infrastructure networks (for example, see section "2.4 Group Global Neighborhood").

For example, a specific embodiment of the SPAN and Group Management service could be allow users to join one or more groups of a SPAN or even to join a SPAN without belonging to any group of this SPAN, but not allowing to create new SPANs in the case that already existent SPANs have been created and found with the SPAN Scanning function (see section "3.1.1 SPAN and Group Scanning"), and also not allowing to choose which SPAN join when several SPANs are available and instead, automatically join the user to the best SPAN (for example, the SPAN with more users already connected). In this example, group management is completely free to the application developers (and so, to the users) but SPAN management is restricted under some conditions (in this example, enforced to create the minimum number of SPANs needed).

Another possible embodiment is to allow application developers (and so, users) to join and create SPANs and groups in a SPAN without any restriction.

3.1.1 SPAN and Group Scanning

This novel network service is designed so that applications will be able to scan both SPANs and groups in a SPAN.

The scanning function may allow scanning (i.e. discovering) which SPANs are in the near-by geographical area where the scan is being performed.

At the same time, the scanning function may allow scanning (i.e. to discovering) which groups are in the previously scanned SPANs. Moreover, the scanning function may include methods for discovering group information of each scanned group and user information of the users belonging to each scanned group.

A possible embodiment of the SPAN and Group Scanning service could be allow users to discover all the available SPANs and, for all these SPANs, to discover some group information (e.g. group name, description, etc) for both public and private groups and some user information (e.g. nickname of the users of the group, etc) for all the public groups and for only the private groups the user is allowed to join to.

Once the user has discovered all the available groups, all this group and user information could be obtained, for example, by joining every group discovered and then, either (i) via listening the flooding messages sent by the users of the group (see section "3.4 User identities") or (ii) via a requesting mechanisms where this information could be requested to one or more of the users of the group (see section "3.4 User identities") or (iii) by using both the flooding and the requesting mechanisms at the same time for a more reliable scanning process.

3.1.2 SSID Management

SPANs can use different wireless network technologies as underlying communication technology. A common case may be the use of IEEE 802.11 networks. In this section we address a novel way of managing SPANs in the specific case of using IEEE 802.11 technology.

In IEEE 802.11 technology, frames use a field to identify the BSS they belong to, known as BSSID, which has the same format as a MAC address. In infrastructure BSSs, the BSSID is set by the Wireless Access Point, and it is usually set to the MAC address of the Wireless Access Point. In independent BSSs (ad-hoc BSSs or SPANs), and according to the mentioned standard, the BSSID is randomly chosen by the node creating the BSS.

BSSs are usually identified by a SSID, a string sent in the Beacon management frames, which at the same time allows other nodes to discover which BSSs are in their vicinity and join them. When a node is instructed by the user or by an application to join a network with a given SSID in ad-hoc mode (i.e., join a SPAN), two possibilities appear:

(i) If the node detects the existence of this network in its proximity (because it is able to receive Beacon frames with the corresponding SSID), it simply adopts the BSSID, also indicated in the Beacon frames. This means that the node can normally communicate with the other nodes of the BSS, as it shares the same BSSID in the sent and received frames.

(ii) If a node does not detect the existence of this network, it usually creates a new network or SPAN, following the procedure described in the IEEE 802.11 standard, or other suitable method. In the IEEE 802.11 standard, the BSSID is essentially a random string of bits.

In case (ii), the following situation can arise: If the node has created a BSS with a SSID and a randomly chosen BSSID, and it moves to an area where another BSS already exists, with the same SSID but with a different BSSID (as the BSSID was also randomly chosen by the node which created the second BSS), both BSS cannot communicate directly, and the situation cannot be easily detected, as both have the same SSID. In other words, there can be two or more SPANs at the same place and time with equal SSID and different BSSID.

Figure 8:
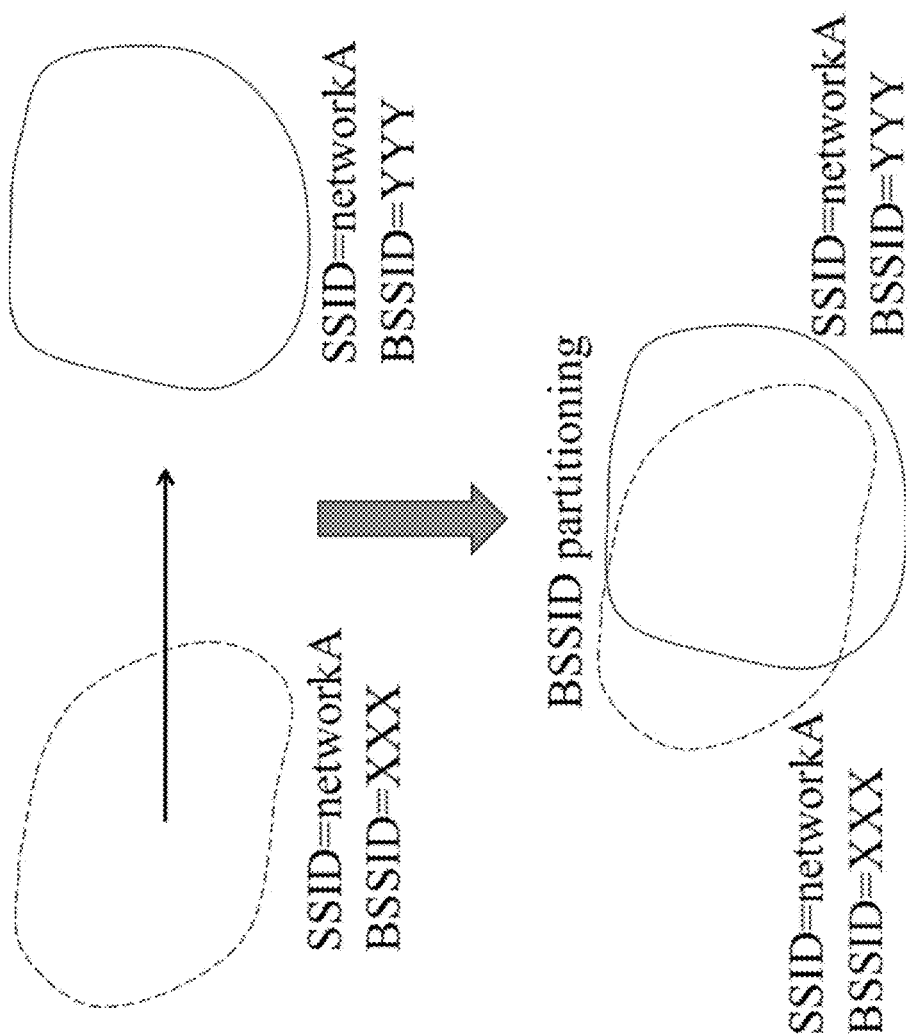
FIG. 8 shows the problem of the BSSID Partitioning.

This situation is often referred to as "BSSID partitioning" (see FIG. 8) and represents a serious problem in order to merge independently created ad-hoc networks when using IEEE 802.11 technology.

The novel solution we propose for this problem is the following:

The set of possible SSIDs that can be used by the SPANs is defined to be formed by a large number of strings, and SPANs identifiers (SSID in IEEE 802.11 technology) are chosen randomly. As an example, they can be defined to be the set of strings of the form "SPAN-xxxxxxxxxxxxxxxxxxxxxxxxxxxx", where "x . . . x" is a 28 character string (i.e. 224 bits) randomly chosen by the node which creates the SSID (i.e., the SPAN).

The structure of these names is chosen to ensure that the collision probability of having two or more SPANs at the same place and time with equal SSID and different BSSID is small. In this way, when different SPANs are in the same geographical area, they can detect with high probability the existence of the other SPANs using different BSSIDs thanks to the fact of also using different SSIDs. Note that when two SPANs have the same SSID but different BSSIDs they may not be able to communicate each other (i.e. they are in fact different SPANs).

Nodes from a SPAN can perform a scanning function (see section "3.1.1 SPAN and Group Scanning") to detect SPANs with a name of the form "SPAN-xxxxxxxxxxxxxxxxxxxxxxxxxxxx" in our example. Then, they can sequentially join these networks and discover the identities of the groups and users of each SPAN. In this way, the user can obtain an aggregate view of the groups and users of the different SPANs, even though they may not be directly connected as they may belong to different SPANs.

If a user wishes to establish a communication with another group or user belonging to another SPAN, it can simply join the corresponding SPAN, so that the communication can be established.

3.1.3 Merging and Splitting of SPANs and Groups

SPANs may merge or split. Two SPANs merge when the nodes of one SPAN move (i.e. join) into the other SPAN.

A SPAN splits when it becomes two or more SPANs, which may be or not geographically separated.

An individual node may take the decision of changing the SPAN to which it belongs. Nodes can temporarily join SPANs in order to obtain the identity of the users belonging to each SPAN. SPAN Scanning is the function to obtain the identities of the users of a number of SPANs (see section "3.1.1 SPAN and Group Scanning").

The decision of merging SPANs may be taken automatically by the system.

In order to reduce the number of SPANs coexisting in the same geographical area, the use of novel automatic procedures for nodes to join other SPANs may be established. For instance, if two SPANs meet in time and geographical area, the users of the smaller SPAN (e.g., in number of users or in number of groups) may migrate to the bigger SPAN. In case that the two SPANs have the same size, other procedures may be set (for instance, the users of the SPAN with lower lexicographic order SSID may migrate into the SPAN with larger lexicographic order SSID).

Some limit controlling the automatic merging may also be established.

For instance we may establish that a SPAN with more than a certain number of nodes may not automatically merge with other SPANs.

SPAN merging policies can also take into account the possible SPAN limits in terms of size (see section "3.2 SPAN and Groups Limits and Horizons").

At the same time, when two or more SPANs merge, groups of each SPAN may also merge, and when a SPAN splits, groups of the SPAN may also split. For example, when two SPANs that contain the same group merge, this group may also merge.

Figure 9:
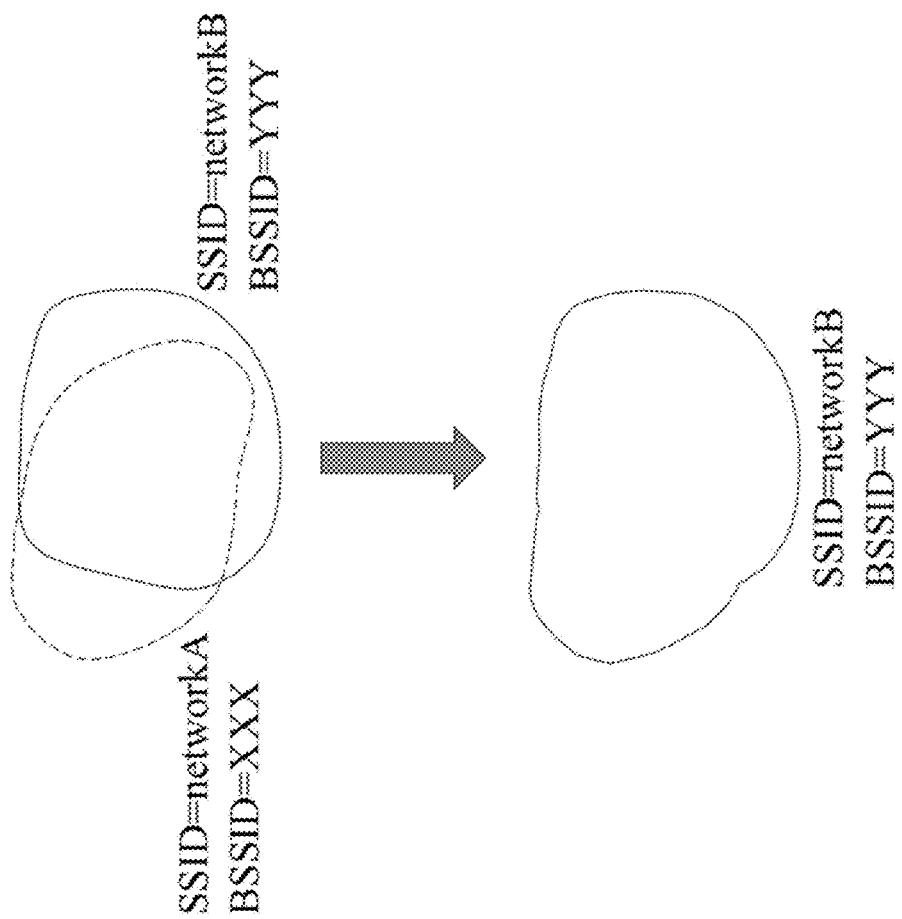
FIG. 9 shows an example of how to merge different SPANs.

A possible embodiment for automatically merging different SPANs that, for example, coincide in space and time, may include (i) a mechanism to discover when start to merge the SPANs, and (ii) a mechanism to merge the SPANs and even to merge the groups of each SPAN (See FIG. 9).

A possible realization for (i) may be performing periodic scans (see section "3.1.1 SPAN and Group Scanning") in order to let nodes to discover other possible SPANs in the same area. In this way, if other SPANs are in the area, mechanisms to learn some information (e.g., the number of users or the number of groups) about the other SPANs can be implemented in order to decide to merge or not the current SPAN with the recently discovered SPANs. On the other hand, two possible realizations for (ii) could be a distributed mechanism where each node of the SPAN decides itself if merge with another SPAN or not, or a centralized mechanism where only one node of the SPAN decides to merge or not with another SPAN and moreover, communicates its decision to the rest of the users of the SPAN. Both mechanisms may include techniques to avoid inconsistencies while merging two SPANs (e.g., to avoid that one node keeps merging from one SPAN to another continuously), techniques to avoid possible interruptions of data flows of the current SPAN due to the merge, etc.

3.1.4 A Possible Embodiment for SSID Management and Merging of SPANs

When a node decides to connect to a SPAN network, it will perform a scanning function (see section "3.1.1 SPAN and Group Scanning"):

1) If one SPAN network is found (SSID equal to "SPAN-xxxxxxxxxxxxxxxxxxxxxxxxxxxx"), then it will join this SPAN network using its SSID.

2) If several SPAN networks are found, then it will join the SPAN network with greatest SSID number, being the SSID number the part of the SSID corresponding to the last 28 characters.

3) If no SPAN networks are found, a new SPAN network will be created with SSID="SPAN$x_0 x_1 \ldots x27$" where $x_i$=random{'0','1','2','3','4','5','6','7','8','9'}.

In order to automatically merge SPANs in the same area, we will use a timer that will be executed every T_MERGESPAN milliseconds (e.g., 5000 ms). Every time the timer expires, we will perform a scanning function (see section "3.1.1 SPAN and Group Scanning"):

1) If other SPAN networks different from the one we are connected are discovered and at least one of these discovered SPAN networks has greater SSID number, then we will change from our SPAN network to the one with greatest SSID number.

Even with the method described before, the problem of the BSSID Partitioning in SPAN networks could still appear, for example (i) when a node fails connecting to an already existent SPAN (for example, due to problems with the scanning function) and then, it creates a new SPAN network with the same SSID but with different BSSID, or for example (ii) when two distant nodes that created a SPAN network in the past coincide in the future on the same place and their random part of the SSID of their SPAN is the same. In these cases, the following can be performed in order to solve the problem:

1) Every time the timer of T_MERGESPAN expires and the scanning function is performed, if we detect two or more SPAN networks with the same SSID, different BSSID, and we are at this time connected to one of these networks (i.e., BSSID partitioning), then we will proceed to merge the SPANs only if there exists a SPAN network with greater SSID than the SSID of our SPAN network. If there is not any SPAN with greater SSID, then, instead of continue residing in the same SPAN, we will create a new SPAN network as explained before but choosing the random part of the new SSID between the number of our current SSID plus 1 and the maximum value for this number. In the case that our current SSID is already the maximum value, then the random will be chosen between 0 and the (maximum value/2). With this solution, after a certain period of time, every node will end to the same SPAN, i.e., all SPANs will have merged to a unique SPAN, thus solving the BSSID partitioning problem.

3.2 SPAN and Group Limits and Horizons

We may set some limits in the amount of nodes that may belong to an SPAN, or in the communication capabilities of nodes of an SPAN.

For instance, SPANs and groups may have a horizon (which can be finite or not). Horizon establishes a limit beyond of which the communication is unreliable or even impossible. Horizon can be defined in terms of forwarding hops, in terms of geographical area (i.e. distance between users), in terms of number or density of users per SPAN or group, in terms of data traffic (i.e. bandwidth usage), etc.

These SPAN limits may be of importance when establishing policies for merging/splitting SPANs.

Figure 10:
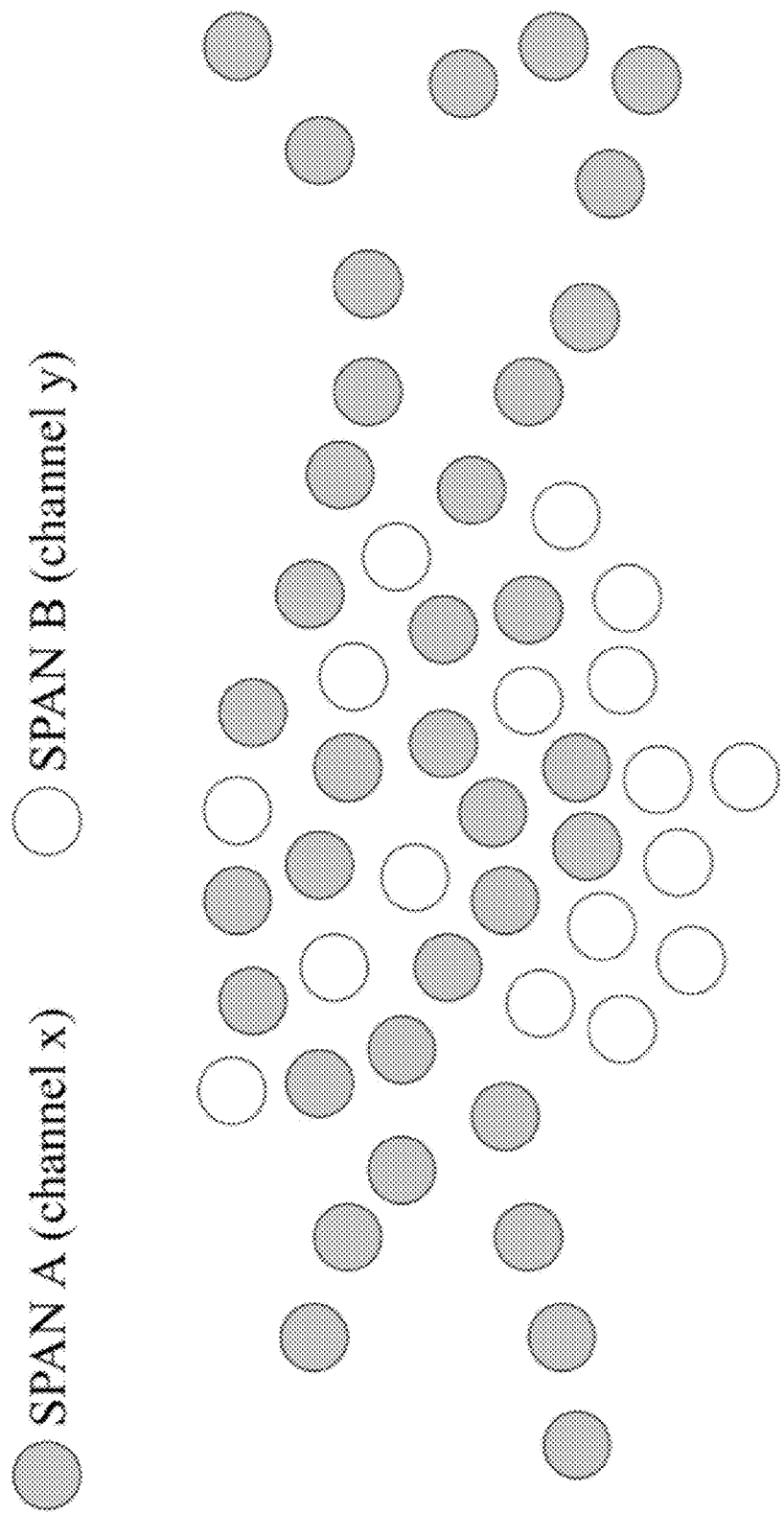
FIG. 10 shows an example of a SPAN horizon.

For example, a possible horizon for SPANs could be an infinite horizon, only limited by the number of neighbours at distance 1 hop (i.e. 1-hop neighbours), meaning that every node is allowed to join a SPAN until the maximum of 1-hop neighbours allowed per SPAN is not reached. If reached, a new SPAN (for example, in a different channel) may be created to allow joining additional users. In this way, SPANs tend to be as large as possible (see an example in FIG. 10).

On the other hand, as another example, the groups of a SPAN may have a finite horizon limited by the number of hops between the users of the group (and also limited for the horizon of the SPAN), meaning that only users separated less than a certain number of forwarding hops may establish a communication between them. In this way, one group may have users separated more than the maximum allowed number of hops, but only the users separated less or equal hops than the maximum allowed will be able to communicate each other. In other words, there is no a centralized view of the group horizon. Every user of the group has its own view of the group horizon in a distributed manner.

Figure 11:
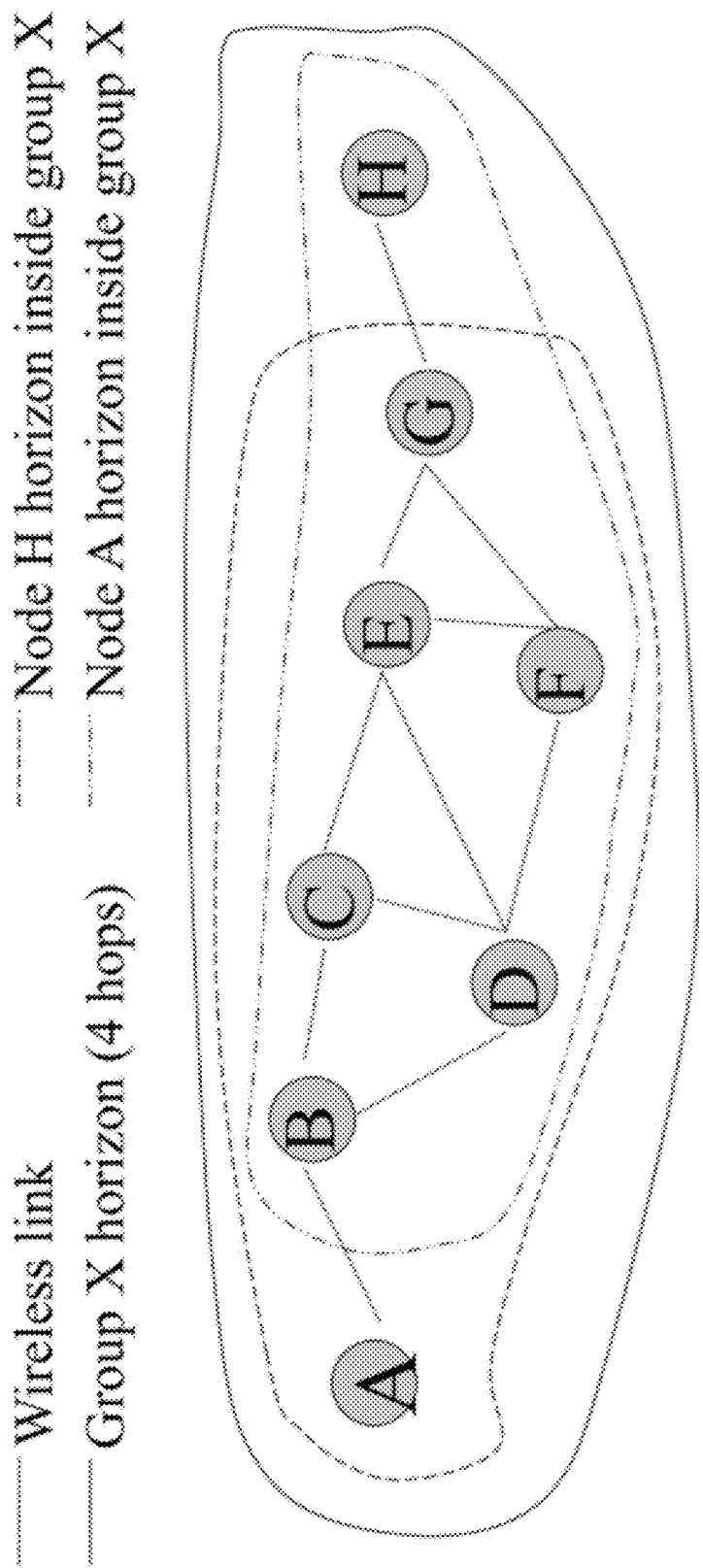
FIG. 11 shows an example of a distributed group horizon.

For example, FIG. 11 shows an example where the maximum number of hops allowed has been set to 4. All nodes A, B, C, D, E, F, G and H belong to the group X, but only nodes B, C, D, E and F are able to communicate with all the other nodes of the group. Node A and node H are only allowed to communicate with nodes B, C, D, E, F and G.

Figure 12:
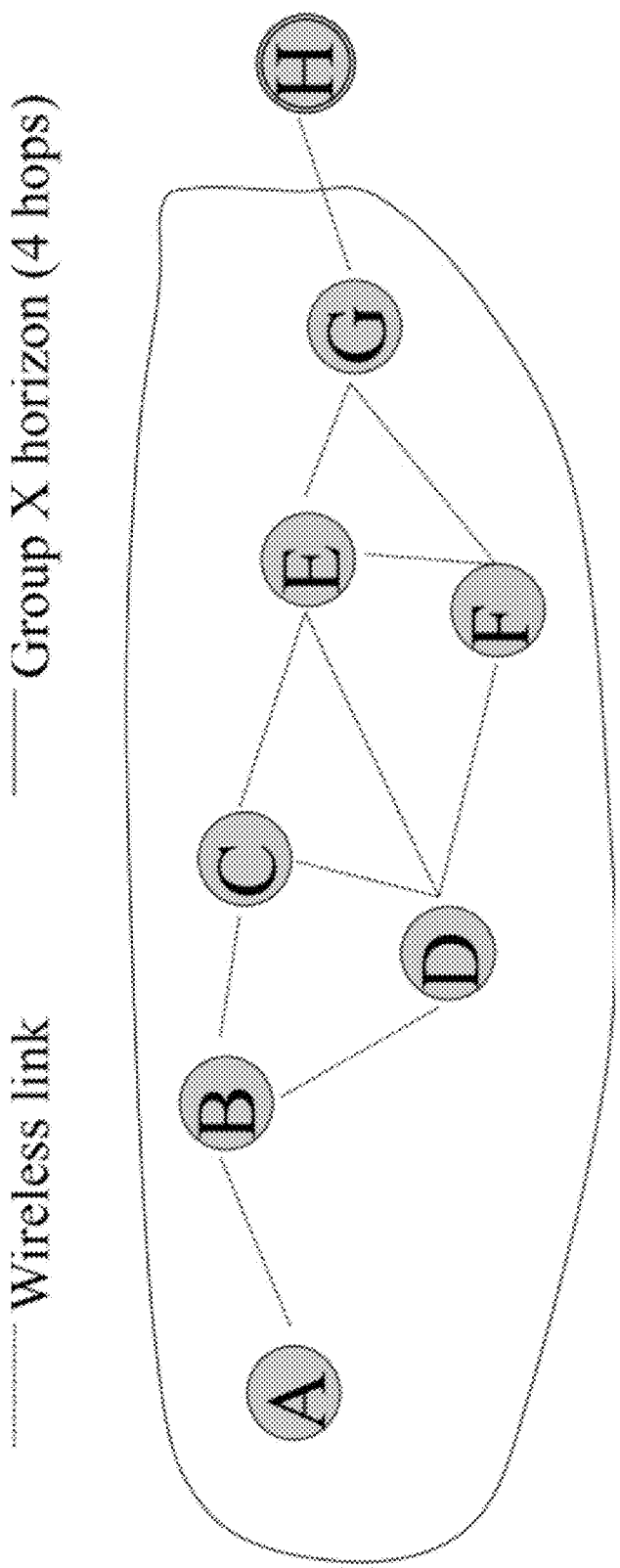
FIG. 12 shows an example of a centralized group horizon.

On the other hand, another possible implementation for the group horizon may be a centralized scheme, in which all users of the group have the same group horizon. For example, in FIG. 12 we see an example where nodes A, B, C, D, E, F and G belong to group X, and where node H is not allowed to join the group X, since in the case node H would joined group X, it would not be able to communicate with node A (more than 4 hops).

Moreover, in addition of these implicit group horizons, explicit group horizons (always contained inside the implicit ones) may be defined, for example, by the users of the group. For example, the creator of the group "my friends" may decide to set an explicit group horizon limiting the group to a maximum of N users (independently of the distance between them), which is exactly the number of friends he wants to communicate with.

3.3 Application Identities

SPAN applications may be identified by an Application Identity.

The application identity may consist, for instance, of an application identifier that uniquely identifies each application. Other parameters as a description of the application, etc may also be used.

The application identity may be used to identify which applications support each user (i.e. the application identity may be used as a service location service in SPANs).

3.4 User Identities

Users may define different identities to be used in the different groups or even in the same group.

The user identity may consist, for instance, of a nickname, an avatar, a description, an address, a list of application identities, etc. The nickname may consist of a short string that serves as name of the user. The avatar may be a photograph or other graphic information that graphically identifies the user. The description may be a short text of the user's preferences, or any other information that the user wants to present as a way of explaining his identity to the other users. The address may be any protocol address (e.g., an IP address) that allows other users of the SPAN to identify the user and to be able to establish communication with him (i.e. as an address/name resolution service). The list of application identities may be a list of the applications the user is supporting (i.e. as a service location).

Every user of a group may know about the other users of the group or other groups (from the same or different SPAN) by means of their identities.

The nodes may have means for discovering the identity of the other users, and for making public the identity or identities of the node's user.

A possible embodiment of this would be a simple distributed mechanism in which nodes store the identity of other users of the group or SPAN during a given period of time, and provide this information and its own information to any node who queries them. This information may also be provided and/or updated by means of periodical exchange of information among the group or SPAN nodes using a flooding mechanism. Both mechanisms may include means for limiting the horizon in which this information will be sent through the network (see section "3.2 SPAN and Group Limits and Horizons").

3.5 Registered and Ephemeral Users, Groups and Applications

User identities, groups and application identities may or may not have guaranteed their uniqueness in the SPAN. Thus we may classify user identities, groups and application identities into two types: registered and ephemeral.

On the one hand, registered means that user identities, groups and application identities may have a method (for instance registering into a server or into an entity) in order to ensure their uniqueness. In this way, everybody can create and register its user identities and be sure nobody will use the same user identities, meaning that registered user identities become a key identifier of a person or entity in every SPAN or group he/she/it joins to. In the same way, everybody (e.g., a company) can create and register its groups and be sure nobody will be able to create the same groups again. And in the same way, everybody (e.g., an application developer or a company) can create and register its application identities and be sure nobody will be able to use the same application identity again, allowing the networking services to uniquely identify these applications.

On the other hand, ephemeral user identities, groups and application identities do not have guarantees of uniqueness, meaning for instance that the user identity, group or application identity has not been registered. However, authentication for ephemeral users can be achieved by means of linking, for example, a special key or timestamp (as is used in FriendsTree) to the ephemeral user, for instance at the moment of user creation. In this way, ephemeral user identities, groups or application identities can be used, for example, in a temporary or spontaneous way, without requiring the process of registering but without the possibility of owning the user identity or group. For this reason, ephemeral user identities, groups and application identities can be used for everybody at any time and even at the same time, meaning that they do not have ownership properties.

The system can provide means for ensuring that registered and ephemeral users, groups and applications may be easily identified. A possible way of identifying which user identities or groups are registered and which are ephemeral is, for example, to add some special characteristic in the identity (for instance, including a specific character such as an '@' character at the front of the nicknames/group names of ephemeral user identities/groups). A possible way of identifying which application identities are registered and which are ephemeral is, for example, to limit the application identifier that identifies an application identity between 0 and 32767 for registered applications and between 32768 and 65535 for ephemeral applications.

3.6 Node Addressing

Nodes that participate in a SPAN require the use of communication addresses. For instance, in the case in which the SPAN uses IEEE 802.11 technology and IP protocols, two addresses are required: MAC address (used by the IEEE 802.11 network cards and frames), and IP addresses (used by the network interfaces and IP forwarding tables). MAC addresses are usually provided by the IEEE 802.11 NIC manufacturer, and are assumed to be unique. IP addresses should be set by the system.

Some form of distributed host configuration or autoconfiguration methods can be used.

A possible method would be to randomly choose an IP address from a range of IP addresses (e.g. 10.0.0.1 to 10.255.255.254). If this range is large enough, and as it is expected that the number of nodes sharing the same SPAN would be relatively small, the address collision probability (i.e. the likelihood that two nodes of the same SPAN have same IP address) can be quite small. Some mechanisms may be provided in order to distribute these addresses to the rest of the nodes of the SPAN (for example, see section "3.4 User Identities"). Some query methods may be provided in case we want to be extremely sure there are not IP address collisions, and some recovery methods may be provided in case an IP address collision is detected.

If the SPAN is connected to a public network, such as the Internet, a mechanism could be used in order to allow the communication with external nodes.

For instance, a pool of public IP addresses for assigning IP addresses in the SPAN, or Network Address Translation, may be used.

3.7 Object Addressing

From the application's point of view, SPANs exchange objects between different nodes. The definition of object is fairly general, as it is any data structure which can be uniquely referred by another application and which is susceptible to be transferred through the network. In section "4. SPAN Communication Protocols" we describe a novel implementation of a delay-tolerant object layer abstraction, that we call DELTOYA, which uses some specific methods for addressing objects.

3.8 Energy Saving

Nodes of SPANs may be battery powered, meaning that energy saving is a key feature in order to ensure a satisfactory user experience.

A novel technique for energy saving in nodes of a SPAN, that we call Energy Saving Rendez-Vous (ESRV) process, is described.

The proposed mechanism may work concurrently with other energy-saving mechanisms. This could be a common situation, as many hand-held devices incorporate energy-saving mechanisms independent of the proposed ESRV process.

Many wireless network interfaces have different operational modes, with different power consumption regimes. In IEEE 802.11 technology, for instance, we can easily distinguish between TRANSMIT mode, in which the interface is active and transmitting packets, RECEIVE mode, in which the interface is active and receiving packets, IDLE mode, in which the interface is active but it does not transmits nor receives packets, and SLEEP mode, in which the interface is put into a power saving state, and some of its functions are deactivated.

Typical values of the power consumption for these states are:

TRANSMIT mode: 1.4 W.
RECEIVE mode: 1 W.
IDLE mode: 0.83 W.
SLEEP mode: 0.13 W.

We can also define an INACTIVE state in which the network interface is deactivated.

The actual power consumption values for each mode depend on the network interface used, but these values can be taken as representative. In some other cases, the RECEIVE and the IDLE mode may be considered as the same mode.

Other network technologies could define other modes.

In general, medium or high active modes will correspond to states in which communication can be performed without impediments, whereas low power consumption modes usually will correspond to states in which some parts of the network interface is put into special energy-saving state, meaning that communication cannot be performed in the same optimal conditions as in the case of the medium or high power consumption states.

The important observation is that energy consumption in some modes can be much lower than in others. For instance, in the IEEE 802.11 technology case, SLEEP/INACTIVE modes have figures of power consumption which can be almost an order of magnitude lower than figures for the TRANSMIT, RECEIVE or IDLE modes.

On the other hand, many applications running on nodes of SPANs may be most of the time in a DISCOVERY phase. We will define this phase as a state in which the node is not actively involved in any communication process with other nodes, and it is only trying to discover other nodes in its neighborhood. Of course, for every application the detailed definition of this DISCOVERY phase may be different.

While nodes are in DISCOVERY phase, an Energy Saving Rendez-Vous (ESRV) process may be used. When nodes in DISCOVERY phase are using this process, we will say that they are in a ESRV DISCOVERY phase. If nodes are not using this energy saving process, they will be in a regular DISCOVERY phase.

Nodes will change from one phase into the other depending on the state of the network.

For instance, a node may be in ESRV DISCOVERY phase when no users are detected in its neighborhood and change into regular DISCOVERY phase when some nodes are discovered in its neighborhood. The node may change from regular to ESRV DISCOVERY phases if during a given time-period, no nodes are discovered in its neighborhood.

When a node is in ESRV DISCOVERY phase, its network interface may alternate between periods in which it will be in a medium or high power consumption modes (for instance, in IEEE 802.11 network interface it could be TRANSMIT, RECEIVE, or IDLE modes), and periods in which it will be in low power consumption modes (for instance, in IEEE 802.11 network interface it could be SLEEP or INACTIVE modes).

When a node is in regular DISCOVERY phase, the proposed mechanism does not make any assumption about the network interface mode.

If a node is in a ESVR DISCOVERY phase, an its network card is in medium/high power consumption mode, it may transmit/receive packets using similar procedures and conditions as the ones used in regular DISCOVERY phase. We could also define a special discovery behavior for the nodes which are in a ESVR DISCOVERY phases, and have its network card in medium/high power consumption modes. For instance, these nodes may be more aggressive in the node discovery process.

This node discovery process may consist in the transmission of broadcast packets which contain the identity of the node, and in the processing of these broadcast packets received from other nodes.

When a node is in ESRV DISCOVERY phase, the node may use a random or pseudo random algorithm to determine the duration of the medium/high power consumption modes, and the duration of the low consumption modes.

For instance, we can choose a fixed duration for the medium/high power consumption modes, while choosing randomly the duration of the low power consumption modes.

The random algorithm may be chosen in order to obtain a given expected value for the duration of the low power consumption modes.

If two or more nodes are in a given geographical area, and some or all of them are in ESRV DISCOVERY mode, there is a likelihood that the ESRV DISCOVERY modes which are in a state of medium/high power consumption modes will be able to discover the existence of other nodes. This may have the effect that these nodes move from the ESVR DISCOVERY phase into a regular DISCOVERY phase.

Note that during ESRV DISCOVERY phases, the network cards alternate into modes of medium/high power consumption and modes of low power consumption. Thus, we can expect that the average energy consumption will be reduced in comparison with regular DISCOVERY modes.

The use of the ESRV DISCOVERY phase will have as a consequence an increased expected time to discover other nodes.

3.9 Energy Control

Even when the wireless network interface is operating in TRANSMIT mode, an energy control policy could be applied in order to save in energy during the period of time in which the wireless network interface is in this high power consumption mode.

Energy control techniques are based on tuning the transmission power of the wireless interface card in order to save energy (i.e., the less transmission power is used to transmit a packet, the less energy is consumed).

A novel technique for energy control in nodes of a SPAN, that we call Energy Control Environment Aware (ECEA) process, is described.

ECEA may keep setting the transmission power of the wireless network interface in a dynamic way, varying its value depending on the battery level of the node, the type of the information to transmit (e.g., the more priority the information has, the more transmission power may be used), the state and topology of the network (e.g. the less transmission power is used, the less interference to neighbor nodes may be created), etc.

330 Virtual Spontaneous Databases (VSDs)

A hitch in ad-hoc networks is how to design and implement a system for the connected users to be able to view and share/transfer that data in a way that is transparent and reliable enough so that problems with disconnection does not necessarily translate into loss of visibility or availability of the data of the disconnected user.

The VSD design is made to handle these sorts of situations although it can be expanded to other situations. The idea is to create, organize, and maintain a database of an amount of data that is being communicated in a SPAN so that data held by a user or users of the SPAN may be visible (to at least one user or system) and/or downloadable/usable whilst the users are in the SPAN and even if the users who are owners of the data disconnect from the SPAN, via the methods of data management described below.

An example of VSD on a bulletin board style application built on a SPAN:

In an SPAN without VSD

1) User1 and User2 enter or create a group in the SPAN, and each one publishes a "Looking for room to rent for June" post on the board that in turn, shows up in the bulletin board for all users in the network.

2) User3 joins the group and publishes a "Poker meet up group Sundays at 3 pm" post.

3) User1 and User2 leave and User4 joins publishing a "Room for rent starting in June" post.

4) User5 joins and also publishes a "Room for rent starting in June" post.

5) User3 leaves and User6 joins publishing a "Looking for poker meet up group" post Table 1 below shows how any user of the group would see the bulletin board after each of the steps in the number timeline above:

TABLE 1

| STEP | POSTS IN BULLETIN BOARD |
| --- | --- |
| 1 | Looking for room to rent for June (User1) |
|   | Looking for room to rent for June (User2) |
| 2 | Looking for room to rent for June (User1) |
|   | Looking for room to rent for June (User2) |
|   | Poker meet up group Sundays at 3 pm (User3) |
| 3 | Poker meet up group Sundays at 3 pm (User3) |
|   | Room for rent starting in June (User4) |
| 4 | Poker meet up group Sundays at 3 pm (User3) |
|   | Room for rent starting in June (User4) |
|   | Room for rent starting in June (User5) |
| 5 | Room for rent starting in June (User4) |
|   | Room for rent starting in June (User5) |
|   | Looking for poker meet up group (User6) |

Now the same example in Table 2 below, but this time in an SPAN with VSD:

TABLE 2

| STEP | POSTS IN BULLETIN BOARD |
| --- | --- |
| 1 | Looking for room to rent for June (User1) |
|   | Looking for room to rent for June (User2) |
| 2 | Looking for room to rent for June (User1) |
|   | Looking for room to rent for June (User2) |
|   | Poker meet up group Sundays at 3 pm (User3) |
| 3 | Looking for room to rent for June (User1, not available) |
|   | Looking for room to rent for June (User2, not available) |
|   | Poker meet up group Sundays at 3 pm (User3) |
|   | Room for rent starting in June (User4) |
| 4 | Looking for room to rent for June (User1, not available) |
|   | Looking for room to rent for June (User2, not available) |
|   | Poker meet up group Sundays at 3 pm (User3) |
|   | Room for rent starting in June (User4) |
|   | Room for rent starting in June (User5) |
| 5 | Looking for room to rent for June (User1, not available) |
|   | Looking for room to rent for June (User2, not available) |
|   | Poker meet up group Sundays at 3 pm (User3, not available) |
|   | Room for rent starting in June (User4) |
|   | Room for rent starting in June (User5) |
|   | Looking for poker meet up group (User6) |

Without VSD, the users may never find a match to their posts. Even though they stayed a little longer, or joined earlier, they may not have found a perfect match. Thus, they rely solely on chance encounters during an exact timeframe. With VSD, the users will see the bulletin board with any posts previously made to it (posts can have a predetermined or user-determined duration), even if the original user that published the post is no longer in the SPAN. Hence, other users will have a better probability of finding matches to their posts and will be able to contact them (either directly [if still in the network], or via contact info provided in the post).

This sort of temporal data propagation that survives the original source of the data, if he is no longer in the SPAN, may be applied to all types of data, from messages and postings to video, music, documents, etc. The effect is to have information pertaining to a database of the SPAN being managed by users of the SPAN, in which all or parts of the actual data are also maintained by users of the SPAN, so that information and data from and about users that join the SPAN is gathered and stored in a temporal and virtual manner.

The methods of data gathering and management may be made by, but not limited to, searches done at random intervals (or when new users join the SPAN) of the users' new data pertaining to the relevant search criteria and the subsequent download or virtual flag and update of the data on the VSD in the SPAN, as well as updating done by virtually capturing data and information intentionally shared, posted, and propagated by the users, and hence uploading it to the VSD.

Another method of obtaining a database would be to make a query for the information a particular user seeks from other users within the SPAN and so essentially become a pulling of data, so that the data can be dynamically called by from a user without having to constantly (or periodically) kept by all or several users within the SPAN. The query would essentially ask the users of the SPAN for relevant data of which multiple users could have different parts of the requested data. The query could send a general search that could be propagated via the SPAN (or even possibly SPANs) so that it could reach all users and even have attached info such as who has certain parts of the data as well. This could be called a Floating Database.

Several VSDs may be maintained per SPAN, for example, if VSDs are application-dependant, meaning that each application may use its own type of VSD, with its own information and methods.

3.11 Visibility

If a user is within a SPAN, all other users within the SPAN may see him as a user of that SPAN. Any action he takes (chat, postings, etc) or data he is sharing may be also seen as currently within the SPAN and reliable (i.e. not purely virtual as might happen with some data in VSD whose original user is no longer within the SPAN). In the case a user has the option of joining more than one SPAN in his vicinity, the user may choose to enter one SPAN as a full member, and the other (or others) as being under 'visible' mode. This mode may alert members within that SPAN that user is currently 'visible'. There may or may not be certain limitation attached to this mode, but generally, in order to be visible, a user may enter the SPAN he wants to be visible in every so often (a predetermined period of time) and may announce his intention of remaining visible, at which point other users can alert him of any messages or notes that were meant for him (users may or may not message or request data transfers from him while they are away but still with 'visible' mode, depending on whether other users of the SPAN will be allowed to save such messages and requests to forward to him once he gets back). This mode will essentially try to allow a user to be in more than one SPAN at a time as much as technically possible.

3.12 Proxy Nodes and Remote SPAN Users.

Usually, nodes will have a single user, which can define several user identities to be used in different SPANs or even in the same SPAN. Some nodes can also act as proxies of other nodes, meaning that a number of remote users can participate in the SPAN through these proxy nodes.

Figure 13:
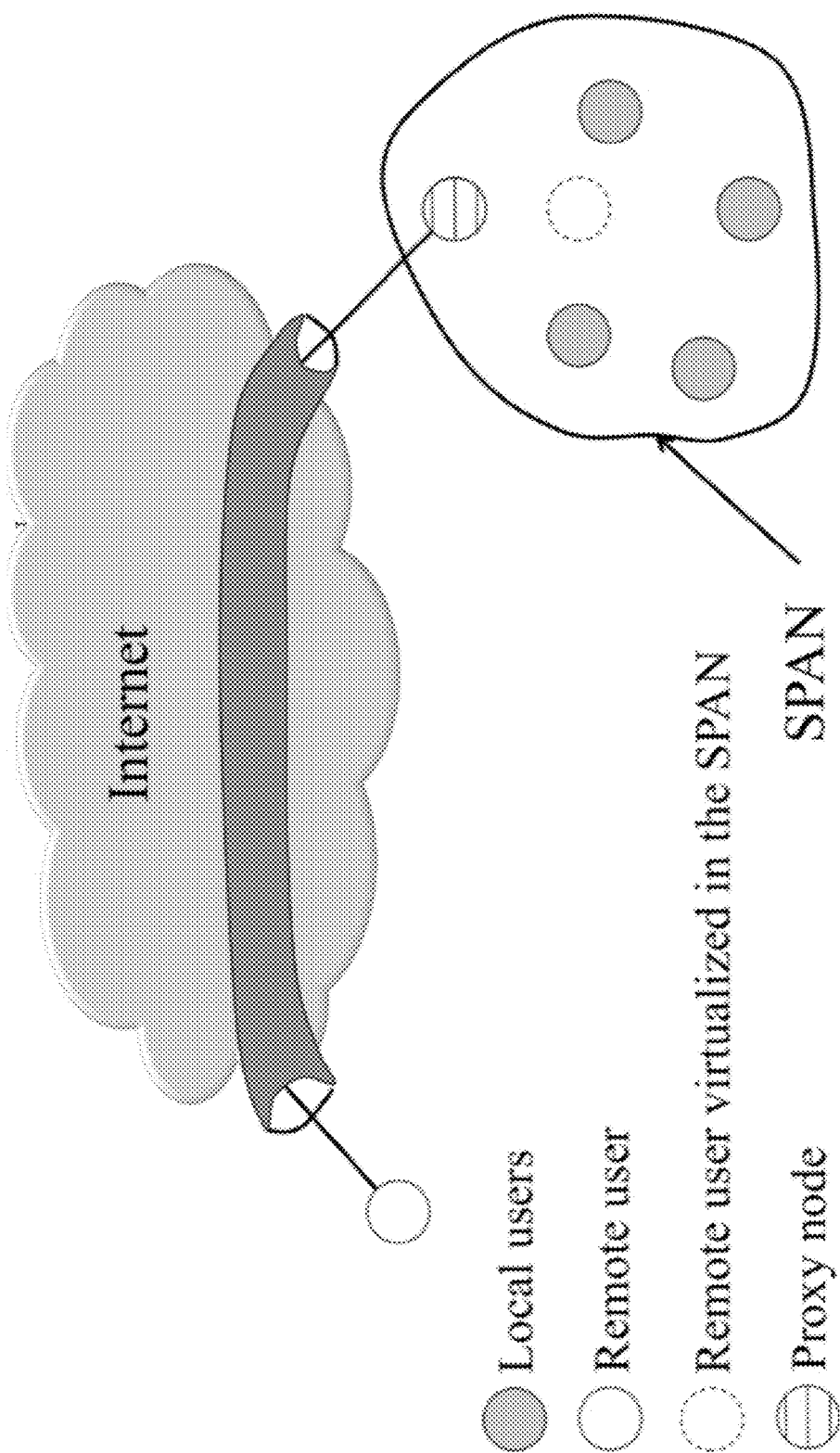
FIG. 13 shows an example of a scheme with proxy nodes and remote SPAN users.

As an example of the use of proxy nodes, we may have the following scheme: a remote node, which is not in the geographical coverage of a SPAN, connects by means of a communication system (e.g. the Internet) with a fixed infrastructure node belonging to this SPAN. The fixed infrastructure node may act as a proxy, meaning that it acquires the required information from the remote node in order to publish the remote user's identity in the local SPAN, and provides the remote user with the required SPAN information (e.g. other SPAN user's identities). If the remote node wants to communicate with the other SPAN users, the proxy node acts as a relay of the required messages. From the other node's point of view, the remote user resides in the fixed infrastructure node, although it may be possible for the local users to identify the user as remote or not (see an example in FIG. 13).

Fixed infrastructure nodes may be accessible from any communication node connected to the communication system (e.g. the Internet), and they may use geographical information system (e.g. a map), where their location is indicated, allowing the remote users to chose the SPAN they want to belong, appearing to the other SPAN users as essentially a regular node belonging to the SPAN.

As another example, we can have the case in which a broadcast-based SPAN is connected to a Server-based SPAN. In this case the proxy server can act as a gateway of the broadcast messages of the broadcast-based SPAN, which will be copied and resent to the SPAN-server of the server-based SPAN. Alternatively, the SPAN-server will address the equivalent of these broadcast messages in the server-based SPAN to the gateway, which will transform these message to the adequate format used in the broadcast-based SPAN, and transmit them in this SPAN, redirecting the replies to the SPAN server.

3.13 Kalahari: Network Abstraction Created by Miraveo 3.13.1 The Internet as an Infinite Library Much of the enormous success of the Internet relays on the interplay between windows-based OSs and the Web. Windows-based OSs create the metaphor of an office desktop where documents and folders can be manipulated; see D. C. Smith et al "Designing the Star User Interface", Byte, April 1982. Web browsers perfectly fit into this metaphor, as they open the user a window to an infinite and chaotic library, which for many users is a very popular conceptual model of the Web and the Internet; see H. Bruce, "Perceptions of the Internet: what people think when they search the Internet for information".

The amount of information available in the Internet is huge and it is disordered, and the use of information search tools is almost unavoidable. The number of users is so big. There are sites that facilitate the interaction with other users already known (the users' friends). To meet new users is also becoming extremely popular. Distance is not a natural concept in the Internet, and when location is required, some extra information, as the one provided by GPS or other location tools, is usually required.

In general, in Internet the user is exposed to a huge, virtually infinite, amount of information, and her/his problem is how to discriminate amongst the interesting and the uninteresting information.

3.13.2 Small World

The information available in the SPAN nodes can be seen as being far from an Infinite Library. Location is a key aspect of these networks, as only proximate nodes are accessible (although some exceptions such as in the "Group Global Neighborhood" are also possible).

The interest of using a MANET does not relay in the access to a huge amount of information, but in that we are usually interested in our environment and on the people who are next to us. Usually the interesting information will reach us, and we do not need to search for this information in the middle of a chaotic and infinite library.

The MANET user's conceptual model maybe quite different from the one adopted for the Internet. MANET usage is much closer to our daily experience than the Internet usage. The challenge is to create an easily acceptable conceptual model in resource limited devices as smartphones or other portable devices.

3.13.3 The Kalahari Framework

Figure 14:
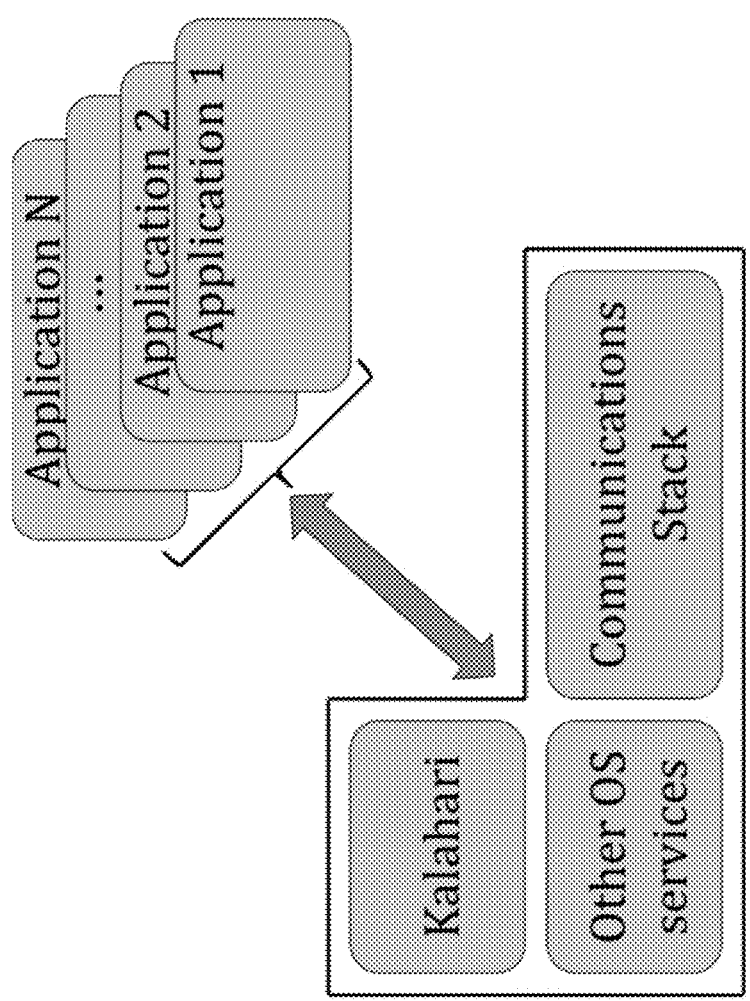
FIG. 14 shows the Kalahari framework.

The framework we describe (that we call "Kalahari") supports a new abstraction for SPANs. See FIG. 14.

Users may usually be aware that they belong to a proximity network. This framework is available to the application developers, meaning that they can use some of the functionalities to easily create their applications and integrate them into the framework.

We assume that Kalahari can support different applications. For instance, in a SPAN users can use a "Chat" application, a "file transfer" application and a "finder application". In each mobile device the applications can use the Kalahari services in common way, meaning that Kalahari gives services to the three applications. Note that some users can use only a subset of applications (for instance, a user has not installed the "Chat" application).

Kalahari may provide means to:

1) Show the participants in the SPAN. These participants can be classified into the so called "Groups of participants". Given the small screen area available in many mobile devices, these users appear in a certain order (alphabetical order, most interesting participant first, etc) and in case many participants are in the SPAN, a search facility is used to easily locate a particular participant in the SPAN.

2) Show the relevant characteristics of the participants in the SPAN. For instance, Kalahari can show the user name, a small picture or avatar, the supported applications, the user status, or other relevant information.

3) Show events in the SPAN. Applications can create "events", which are indications that something relevant to a given participant has happened in the network. As an example, assume that Alice and Bob participate in a SPAN. Imagine that Bob creates a message addressed to Alice (e.g. a chat text line) which arrives to Alice. Assume that in this moment Alice is using another application supported by the SPAN (e.g. Alice is transferring a file from user Corinne). When Alice finishes the file transfer, she can be notified that Bob sent the message to her.

4) Show the available applications supported by Kalahari, and provide means to interact with these applications (for instance, for running one of these applications)

Note that more than a Kalahari instance could run on the same node. Each Kalahari instance would support its own set of applications.

3.13.4 Kalahari Graphical User Interface Requirements

One of the main features used by Kalahari could be a Graphical User Interface (GUI) able to display in a user-friendly and understandable manner the participants of the SPAN, the events and the application management.

The Kalahari GUI could fulfill the following requirements:

1) Allows a quick access to the users present in the network

2) Allows a fast way to see what is happening in the network

3) Allows a natural way of creating new information in the network 3.13.4.1 An Example of Kalahari GUI An example of a Kalahari GUI is shown in this section of the document. It fulfills the requirements of the Kalahari GUI, and it is based on the use of three screens that map directly the requested features, that is, a Users Screen, a Status Screen and an Applications Screen.

3.13.4.1.1 Screen Switching

The user can use the left and right directional keys to switch from a screen to another. In touchscreen phones dragging the screen to the left or to the right can also make the current screen change. The three screens will switch in a circular manner. That is, there may always be a screen on left and a screen on right of the current screen.

3.13.4.1.2 Initial State of the Interface

The first screen the user will see is, for example, the User Screen. The Applications Screen may be at left of it and the Status Screen can be at right. This means that when we are on the Applications Screen the User Screen can be at right and Status Screen at left and that when we are on the Status Screen the Applications Screen can be at right and Users Screen will be at left.

3.13.4.1.3 Miraveo City

The three main screens can implement the Miraveo City concept. To accomplish this, the user avatar and nick may be drawn at the top left of the screen, and at the top right part of the screen there can be an image depicting where the user is located.

The location image may be injected to the network via miraveoboxes. This means that a location image is not guaranteed to exist for every location. When a location image is not available a Miraveo default provided image may be shown.

The algorithm for drawing the location image can be based on time and proximity. The user device will ask each new miraveobox he sees appear if it is a location image provider. In case it is and there is no location image shown at the moment, it may fetch the image and display it. If the user device is already showing a location image it can only ask for the image in case the new device is closer (in hop count) than the previous location provider device. When the miraveobox that provided the location image disappears the user device may check if there is another location provider device in the network, if there is, the location image may switch to it, if there is no, the location image may be shown for 5 minutes more and then removed and changed to the Miraveo default image.

3.13.4.1.4 Users Screen

This screen may show the existing users of the network in a list. The list can be formed by rows having an avatar depicting the user at left and the name of the user at right. The list can be alphabetically sorted. The list can provide a line search functionality that will filter out users not having the substring typed in the search line. If the user depicted in a row has any event ongoing with the user of the device there can appear a small icon overlay representing that event over the lower right corner of avatar. Up to four events will be overlaid on the user icon, one at each corner, if there is the need of having more events there will be just one overlay indicating that there are many events ongoing. Clicking on the user will pop a menu allowing direct access to the ongoing events with this user. It will also allow creation of events that are user directed like starting a chat with a particular user.

3.13.4.1.5 Status Screen

This screen may show a list with the current status of the network. The list can be formed by rows having an icon depicting the information item (infolet) at left and up to two rows of text at right describing it. Each plugin will be given up to five items in the status screen. The information items can be sorted by plugin, for example, Chat infolets will be shown first, then Board, then File Sharing and then Ringer ones. The granularity of information will be decided by the plugin itself that will decide how to group the things currently happening. For example the board can decide to show the unread posts if they are less than 6, but in case there are 6 or more it will show the first 4 unread and the fifth will be used to show "and N more unread posts". When selecting an infolet the menu will change to show the possible actions to take on it. Most infolets will probably just have the "View" action that will open the relevant plugin to show it, for example a Board post will have the "View" option that will open the Board plugin showing the post. Some other infolets can have more actions, for example a Ring one can have two actions, returning the ring to the person that ringed you and ignoring all the subsequent rings from that person. The list can provide a line search functionality that will filter out infolets not having the substring typed in the search line.

3.13.4.1.6 Applications Screen

This screen may show a list with all the applications that are available in the user device. The list can be formed by rows having an icon depicting the application at the left and the name of the application at right. The list can be alphabetically sorted. Clicking on the item will start the plugin. This will be the screen the user will have to configure if he wants to receive ringer events or not, to create new board posts, etc.

4. SPAN Communication Protocols

In this section, novel SPAN communication mechanisms (protocols) which exploit delay-tolerance, cooperation and diversity techniques are described: DELTOYA, PTP and AGENET.

4.1 A Possible Organization

An example of a novel architecture which accommodates a possible organization of the mechanisms is described first.

It is important to point out that the communication mechanisms described later (DELTOYA, PTP and AGENET) could be also organized into a different architecture without losing their novelty and usefulness. Moreover, the proposed architecture could also accommodate a different set of mechanisms. Then, for instance, DELTOYA and PTP could run on top of a different routing protocol other than AGENET, or for instance, a different transport mechanism could be used instead of PTP, while maintaining DELTOYA or AGENET, etc.

The described architecture organizes the communication mechanisms into layers, providing interfaces among these layers. The layered architecture is useful as it facilitates the independence of the mechanisms used in different layers, although some degree of cross-layering may be also used.

We follow some of the concepts and terminology commonly used in describing layered communication stacks (for instance, the Open System Interconnection reference model of the International Standards Organization REFERENCIA, or the TCP/IP stack adopted by IETF).

For instance, we adopt the usual convention that layers can be considered as organized in a vertical structure, in which aspects related to user interaction and specific applications reside at the top while the hardware related aspects reside at the bottom.

However, the presented architecture is novel and specifically exploits delay-tolerance, cooperation and diversity.

We assume that layers interact among them through an interface. These interfaces consist of a number of primitives. Primitives have means to serve as indications for mechanisms of one layer to mechanisms of other layer. In a first example, one primitive of one layer could serve as a mean of triggering an action of a mechanism in another layer. As a second example, a primitive could be invoked by a mechanism of a layer to indicate to a mechanism in another layer that a given event has happened.

Figure 15:
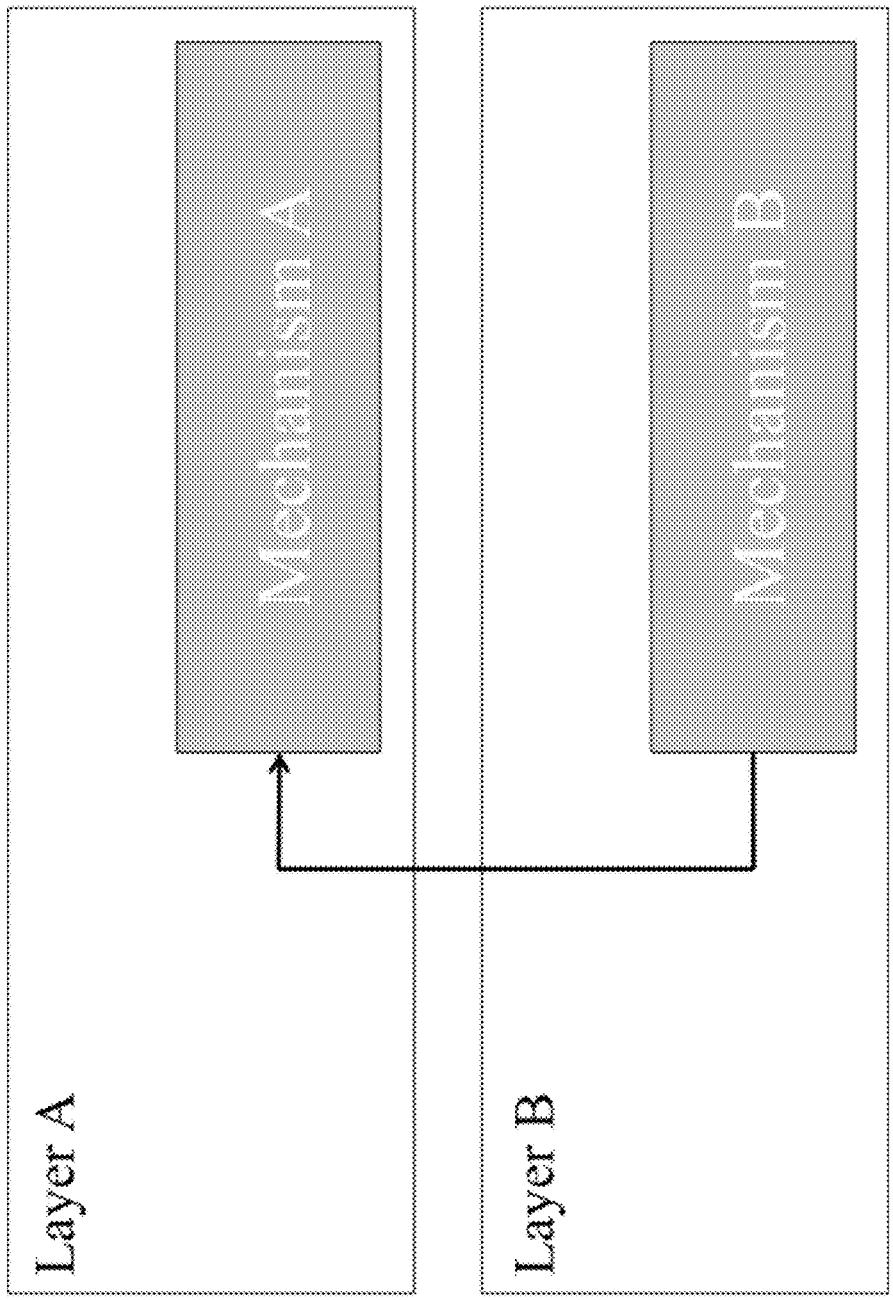
FIG. 15 shows a scheme of layers and primitives.

FIG. 15 shows two mechanisms belonging to two different layers and interacting through a given primitive.

Usually, primitives have a number of parameters that are used to specify the exact meaning of the provided indication. Primitives can also deliver to the invoking mechanism a result of its action. For instance, a primitive can return as a result the value of a variable or whether the action could be correctly performed or if an error condition occurred.

Primitives are usually implemented as functions, system calls, etc, while the parameters of the primitive are the parameters of the corresponding functions or system calls.

The mechanisms, primitives, data structures, etc described in the architecture can be implemented as a middleware, i.e. a software layer between the networking applications and the operating system of the devices. However, the described architecture is completely general, and nothing prevents for other possible implementations. For instance, it could be embedded into the Operating System of the network nodes.

Figure 16:
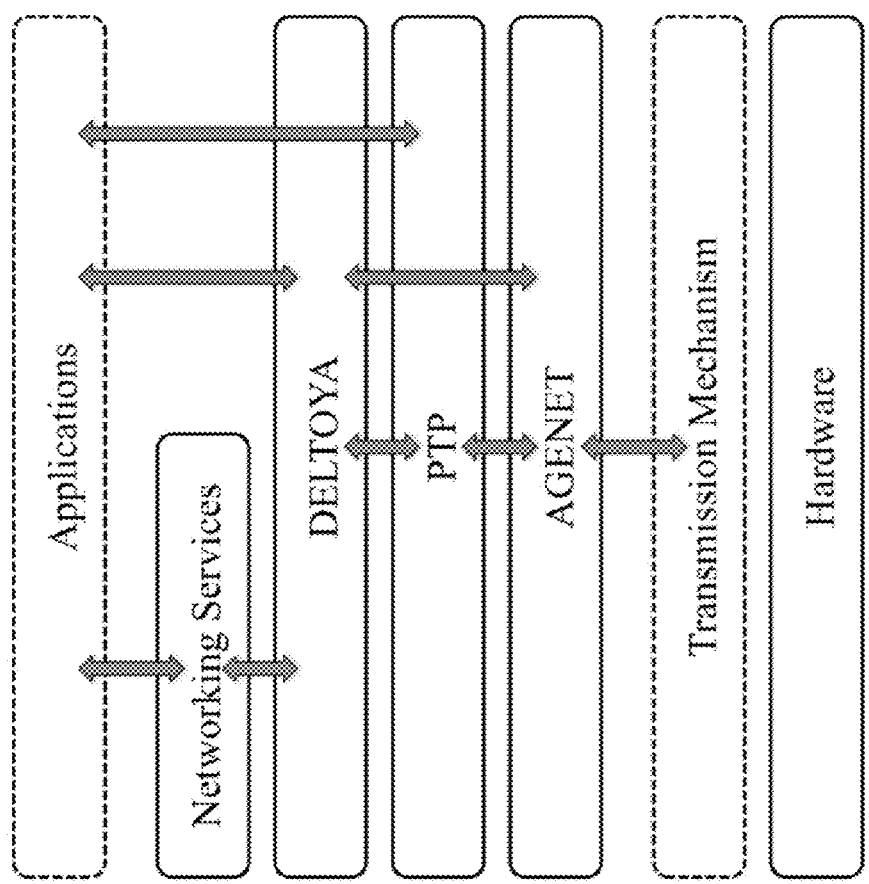
FIG. 16 shows the main components of the layered architecture.

FIG. 16 shows the main components of the described architecture. The arrows represent examples of possible interfaces. Note that in general the architecture allows for interfaces between any layers, even if they are not contiguous.

We usually will assume that the described architecture is placed between the Applications and the Transmission Mechanism. Note however, that the described architecture could be also placed in other environments.

The Applications implement different utilities that interface with the network users, such as file-transfer, instant messaging, etc. The developers of these applications usually expect that some abstraction of the objects which are manipulated and transferred through the network is provided by an under-laying layer. The described communications system provides this abstraction to the application developers.

The Networking Services implement services common to many Networking Applications, including for instance services such as name resolution, address allocation, service location, access control policies and authentication.

The Transmission Mechanism provides the mechanisms for the actual transmission of data information through the communication channel.

This Transmission Mechanism is not required to implement sophisticated error-control, congestion control, routing, etc, as this is already implemented in the described network architecture.

Depending on the actual implementation, the services provided by this Transmission Mechanism can be of different nature. For instance, in a given implementation, the Transmission Mechanism services could be the datagram UDP/IP communication services. In other implementations, for instance, the Transmission Mechanism could be the communication services offered by wireless transmission subsystems (e.g. IEEE 802.11).

DELTOYA offers to the applications a set of primitives to manage pieces of data that we call "Delay Tolerant Distributed Objects", DTDOs.

A DTDO is any piece of data managed by DELTOYA. Examples of DTDOs are data file, user identifiers, directories, voice streams, etc. In section "4.2 DELay Tolerant Object laYer Abstraction (DELTOYA)" devoted to the description of the DELTOYA mechanism we have more examples of DTDOs.

DTDOs can be referred to independently of the node which has originated it, meaning that the object can be stored in nodes different from the one which has originated it, and that an object can be accessed even when the node which has originated it is not already part of the network.

DTDOs can be originated with an assigned Time to Life (TTL), which provides a mechanism for limiting the time the object is kept in the network.

DELTOYA offers primitives to the Applications and to Network Services and it can use primitives of PTP.

The DELTOYA primitives offered to the Applications and to Network Services could, for instance, include ways of sending, requesting or sharing DTDOs, creating and assigning an identifier or a TTL to a DTDO, etc.

PTP includes mechanisms for ensuring a reliable transport of information through the network and for performing the control of transmission rates so that the network does not come into a congestion condition.

PTP offers communication services to the mechanisms of DELTOYA and uses the communication services of AGENET. PTP may also offer services to the Applications and to Network Services.

A distinctive characteristic of the mechanisms of PTP is that they can handle transparently the possibility of retrieving the data of a DTDO from different nodes of the network, taking into account the delay-tolerant properties that characterize the described stack. For instance, if a DTDO is a data file, PTP mechanism can retrieve different parts of the data file from different nodes.

The retrieval mechanisms use Maximum Retrieval Time (which may be set by the Applications, DELTOYA or PTP itself), meaning that they are persistent in the sense that even if during a given period of time, the data is not available in the network, the mechanisms persists in their task of data retrieval, until the overall object is retrieved or the given timeout, with initial value fixed by means of the corresponding Maximum Time or Retrieval, expires.

AGENET includes mechanisms for determining transmission paths along a network (path determination) and the mechanisms for transmitting the data through these communication paths (forwarding).

AGENET Layer offers communication services to the mechanisms of PTP layer and uses the communication services of the Transmission Mechanism.

A distinctive characteristic of the mechanisms of AGENET is that it (i) supports delay-tolerance in the forwarding and (ii) exploits cooperation, meaning that more than one node, other that the selected explicitly by the path determination mechanism, can act in the packet forwarding process.

For simplicity, the description of the SPANs mechanism in the rest of the document will be done assuming "broadcast-based SPANs". However these mechanisms will be also valid for "server-based SPANs". In the rest of this document, unless otherwise stated, we will assume that any of the functionalities described which use a broadcast or multicast transmission, can also be performed by means of a SPAN-server in the case of a "server-based SPAN".

4.2 DELay Tolerant Object laYer Abstraction (DELTOYA)

DELTOYA is a novel mechanism that provides means for creating, modifying, deleting, publishing, requesting, sending, infecting and, in general, handling Delay Tolerant Distributed Objects (DTDOs).

DELTOYA will exploit cooperation, delay-tolerance and diversity in order to build a robust communication system among nodes of a SPAN.

In the following, we show a possible embodiment of the DELTOYA mechanism.

A DTDO is any piece or source of data that in general may support the properties of being distributed and delay-tolerant. Examples of DTDOs are data files, user identities, or directories. Some types of data that in general are not distributed or delay-tolerant, like for instance voice or video stream, may be also considered as special cases of DTDOs, for instance, with an almost zero delay-tolerance.

DTDOs may be referred to independently of the node which has originated them, meaning that DTDOs may be stored in nodes different from the one which has originated them. For instance, they may be accessed even when the node that has originated them is not a part of the SPAN anymore.

DTDOs may be originated with an assigned Time to Life (TTL), which provides a mechanism for limiting the time the object is kept in the SPAN. The exact meaning of TTL may vary from one implementation to another. TTL, for instance, may refer to the maximum time elapsed from the creation of an object until its destruction, whether it resides in its originator node or in any other node of the SPAN. TTL may also refer to the maximum time a node can maintain locally a DTDO originated in other node. Another implementation may include both or more possibilities, which will be distinguished, for instance, using an additional field.

When an application running on top of DELTOYA has copied the DTDO data, the expiration of TTL does not mean that the application will destroy this data, but rather that DELTOYA will not maintain a copy of the retrieved DTDO for being shared with other nodes.

If a DTDO does not have assigned a TTL, we can think that the assigned TTL is 0, meaning in fact that it is not a delay-tolerant object. On the other hand, if the TTL is unlimited, we can think in setting TTL to infinity (e.g. TTL=−1).

DELTOYA may include means to manage DTDOs. These can include actions such as creating, modifying, deleting, publishing, requesting, sending or infecting DTDOs. We will call these actions "methods".

DELTOYA methods can be invoked by other mechanisms. In a layered architecture, for instance, mechanisms residing in other layers (and even in the application layer) can interact with DELTOYA using a given interface, usually consisting of a set of primitives. Moreover, in order to perform its operation, DELTOYA can invoke methods performed by other mechanisms through the adequate interfaces.

4.2.1 DTDO Fragmentation

A DTDO may be partitioned into several DTDO fragments. The resulting DTDO fragments may be identifiable as being fragments of the original DTDO. This may be done, for instance, by using the same DTDO Identifier and some information that identifies the fragment of data of the original DTDO that is contained in the DTDO fragment.

Several DTDO fragmentation methods may be used.

A simple method, for instance, may be to consider fixed-size blocks, each block corresponding to a DTDO fragment. In this case, DTDO fragments may have, in their header, the necessary information to build the original DTDO from its fragments. For instance, this information may include: the original DTDO ID, original DTDO data size, block size and offset (i.e. the position of the DTDO fragment data into the original DTDO data). If the DTDO cannot be fragmented into blocks of exactly the same block-size, some of the fragments (for instance, the last fragment) may be of variable length.

As an example of this, let us consider a DTDO whose data field is of a size of 2.5 MB. This original DTDO could be partitioned into three DTDO fragments, with a block size of 1 MB. The first DTDO fragment would indicate an offset of 0. The offset of the second DTDO fragment would be 1 MB, while the offset of the third DTDO fragment would be of 2 MB. In the case of the third DTDO fragment, the information of the original DTDO data field length (i.e. 2.5 MB), allows knowing that the DTDO fragment data field length is of only 0.5 MB.

Other methods may be also considered, as for instance, considering variable-length blocks.

DTDO fragments should have the same delay-tolerant properties as the non-fragment DTDOs.

In the rest of the document, and unless otherwise stated, we will assume that the term DTDOs could correspond to either un-fragmented DTDOs or fragments of DTDO.

4.2.2 Access Permissions

DELTOYA may also provide means to limit the access to DTDOs to only an intended set of nodes that have permission access. The access permissions may be in concordance with the group permissions described in the section "1.5 Groups and access mechanisms".

4.2.3 DTDO Chaining

DTDOs may be chained. This means that if one node retrieves one of these DTDOs it may also be informed that other DTDO should be also retrieved.

As an example, let us assume that DTDOs B and C are chained to DTDO A. This means that if a node retrieves DTDO A, it must also retrieve DTDOs B and C in order to have the complete information. Chaining may be recursive.

4.2.4 DTDO Addressing

DTDO addressing is an important aspect of DTDO management. Several ways of identifying a DTDO may be used. For instance, a DTDO may be referenced by using its DTDO Identifier (DTDO_ID).

A DTDO_ID may be an SPAN-wide unique alphanumeric string. This ID can be obtained, for instance, by chaining the IP or MAC address of the node that creates the DTDO and a random string.

As an example, the DTDO ID of a DTDO created in a node with IP address 10.0.0.1 could be: "10.0.0.1.3141592ABC"

For instance, a DTDO may also be indentified using a DTDO tag. A DTDO tag is a string that has some meaning inside the application which creates, writes and reads the DTDO, together with other information which may help to uniquely identify the DTDO, such as the originator node IP or MAC address, or even the timestamp when it was created.

As an example, a DTDO tag could be: "10.0.0.1.UserDirectory[1]".

4.2.5 DTDO Fields

DTDOs may have associated several fields.

As an example, these fields may include a data field (DTDO_data), an originator node identifier (DTDO_originator), an SPAN-wide unique DTDO identifier (DTDO_ID), an SPAN-wide unique DTDO tag (DTDO_tag), a DTDO data version identifier (DTDO_version), a DTDO Time of Life (DTDO_TTL), information related with DTDO fragments (DTDO_fragments), list of chained DTDOs, or information related with access permission (DTDO_access), etc.

We may also include some "status" fields.

These fields, for instance, may store information about whether the DTDO has been already requested by other nodes, whether the DTDO has been already made public or not, etc.

4.2.6 DTDO Creation

DELTOYA may provide methods to create DTDOs. In general, this may associate some data to a DTDO data structure together to fixing the value of some other DTDO fields.

In a given implementation, this may produce the reservation of the corresponding memory for storing the DTDO fields, and setting those fields to initial values.

4.2.7 DTDO Modification

DELTOYA may provide methods for modifying an existing DTDO. In general, not all nodes may be allowed to modify existing DTDOs. The restriction may be, for instance, that only the creator of a DTDO may modify it, or some community of nodes that may modify a DTDO could be created.

In order to distinguish between different versions of the same object, DELTOYA may use the DTDO_version field, meaning that each time a DTDO is modified, this field may be modified (e.g. it may be incremented by 1). A DTDO may also include fields indicating which nodes have made the modifications.

DELTOYA may provide means to notify the other nodes of the SPAN that a DTDO has been modified. This may be accomplished, for example, by sending a notification message addressed to the other nodes of the SPAN (for instance, addressing the message to a broadcast address). Note however that, given the special characteristics of the networks we are dealing with, in general it may be possible that some nodes do not get the notification.

4.2.8 DTDO Deletion

DELTOYA may provide means to delete DTDOs.

In general the deletion of DTDOs may be done on locally created and stored DTDOs.

In a given implementation, this may produce the releasing of the memory used to allocate the DTDO in the local machine.

Note however that copies of DTDOs may be distributed in other nodes of the SPAN. In a given implementation, a mechanism for destroying copies placed in other nodes of the network may also be provided.

Moreover, DTDOs stored in other nodes other than the node that created it may be automatically destroyed once the TTL has expired.

In general, when a node obtains a new copy of a DTDO, with same DTDO_ID as one DTDO already stored in it but with different DTDO_version, it may destroy the DTDO with oldest DTDO_version.

4.2.9 DTDO Publishing

DELTOYA may provide means to make DTDOs accessible to other nodes. This means that nodes will serve requests for DTDOs or fragments of DTDOS, made by other nodes, and provided these nodes have the permission for doing so.

A node may accept or deny a request depending on, for example, the node that made the request. Privacy may also be ensured by using encryption or other privacy mechanisms.

4.2.10 DTDO Requesting (DELTOYA Discovery Mechanism)

DELTOYA may provide means for the application to request a DTDO or fragment of a DTDO that is stored in other nodes of the network.

A key characteristic of DELTOYA is that nodes may store DTDOs or fragments of DTDO that have not been locally generated, making these objects accessible to other nodes of the SPAN. A node that requested a DTDO or fragment of the DTDO may store it during a time determined using the TTL field (and, for instance, only if there is enough memory space or if there is more memory space than a certain threshold in the device). The node may act as a proxy of the node that originated the DTDO, for instance, it may serve requests for obtaining the DTDO or fragments of it made by other nodes. Note that if a node modifies one of its stored DTDOs, it may produce a potential coherence problem. During the request process the DTDO version may be used to avoid this potential problem.

The DELTOYA discovery mechanism must determine the set of nodes where the DTDO is available and the subset of nodes (which may be equal to the previous set or not) from the previous set from where to get the DTDO. This subset may be elected by means of, for example, some Quality of Service (QoS) parameters like traffic congestion of the network in the routing path, type of data contained in the DTDO, etc.

An example of an embodiment of this mechanism is the following: when DELTOYA issues a message requesting a DTDO (DTDO Request message), it may include some means of identifying the requested DTDO across the network (e.g. DTDO_ID, DTDO_version, etc). This message may be answered back via messages (DTDO Response messages) by the nodes that have available the requested DTDO, or part of the requested DTDO (for instance, a fragment of the requested DTDO). If no answer is received, the request may be repeated after a given time. The process may be repeated until an answer is received or a timeout (set by the upper layers or by a default value of DELTOYA) expires. When the answers are obtained or the timeout expires, DELTOYA must determine the node or set of nodes from which the DTDO will be retrieved. In the case of fragmented DTDOs, different fragments of the same DTDO may be retrieved from the same or from different nodes. Some criteria that may be used are: choose first the originator node, chose the closest node, etc.

Once the decisions are taken and a request is made, the DTDO may be obtained by means of other mechanisms placed in other layers of the communication architecture, for instance PTP.

4.2.10.1 DELTOYA Example

Here we show some examples of the operation of a possible implementation of the DTDO Requesting mechanism of DELTOYA.

Figure 17:
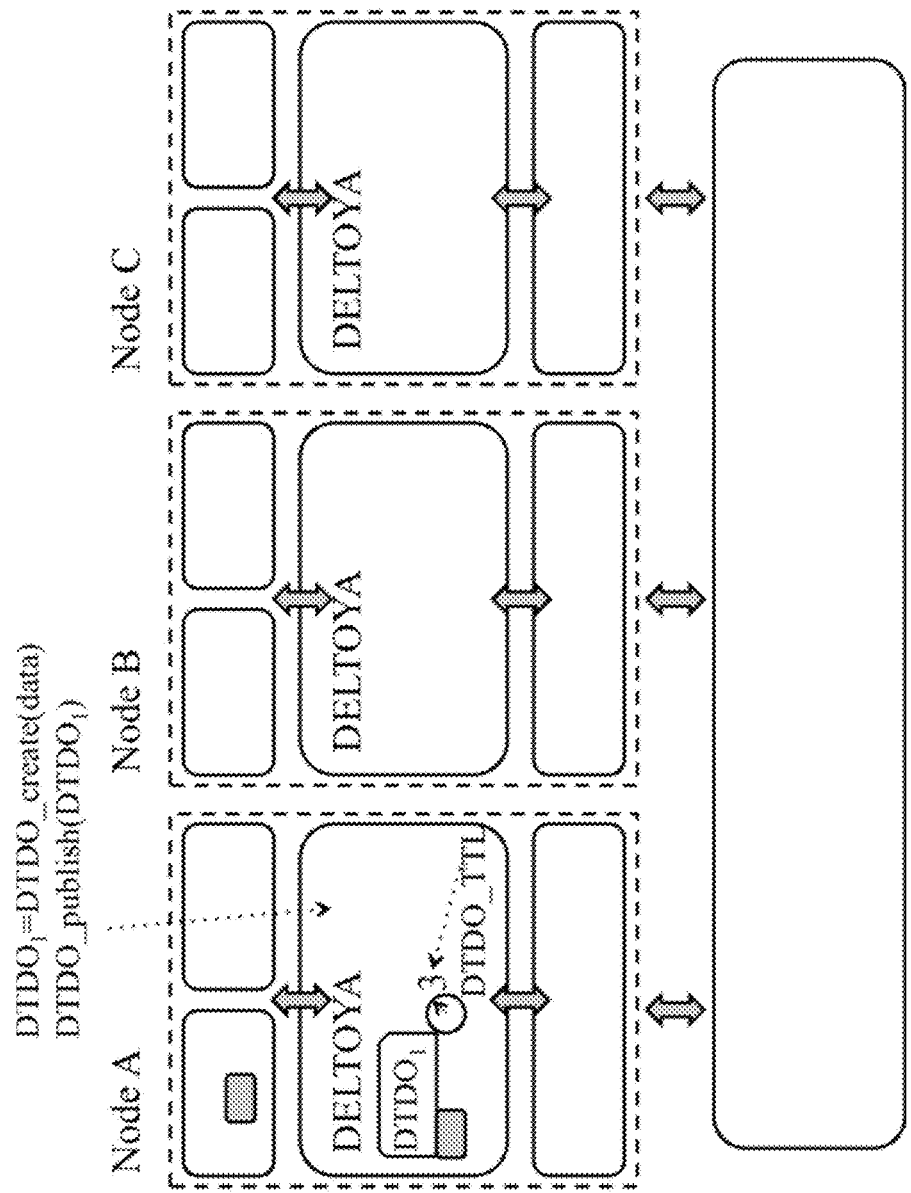
FIG. 17 shows an example of creating and publishing a DTDO.

FIG. 17 shows a diagram where three nodes (Nodes A, B and C) are connected through a communication system (e.g. a wireless ad-hoc communication network). In the three nodes there are some applications that exchange data by using the services of several communication mechanisms. One of these mechanisms is DELTOYA.

In node A, one of the applications has created and published a DTDO $DTDO_1$, associating some data to this DTDO. The $DTDO_1$ has a DTDO_TTL of 3 seconds in this example. In FIG. 17 we show the primitives DTDO_create and DTDO_publish invoked by the networking application in order to create and publish the DTDO.

Figure 18:
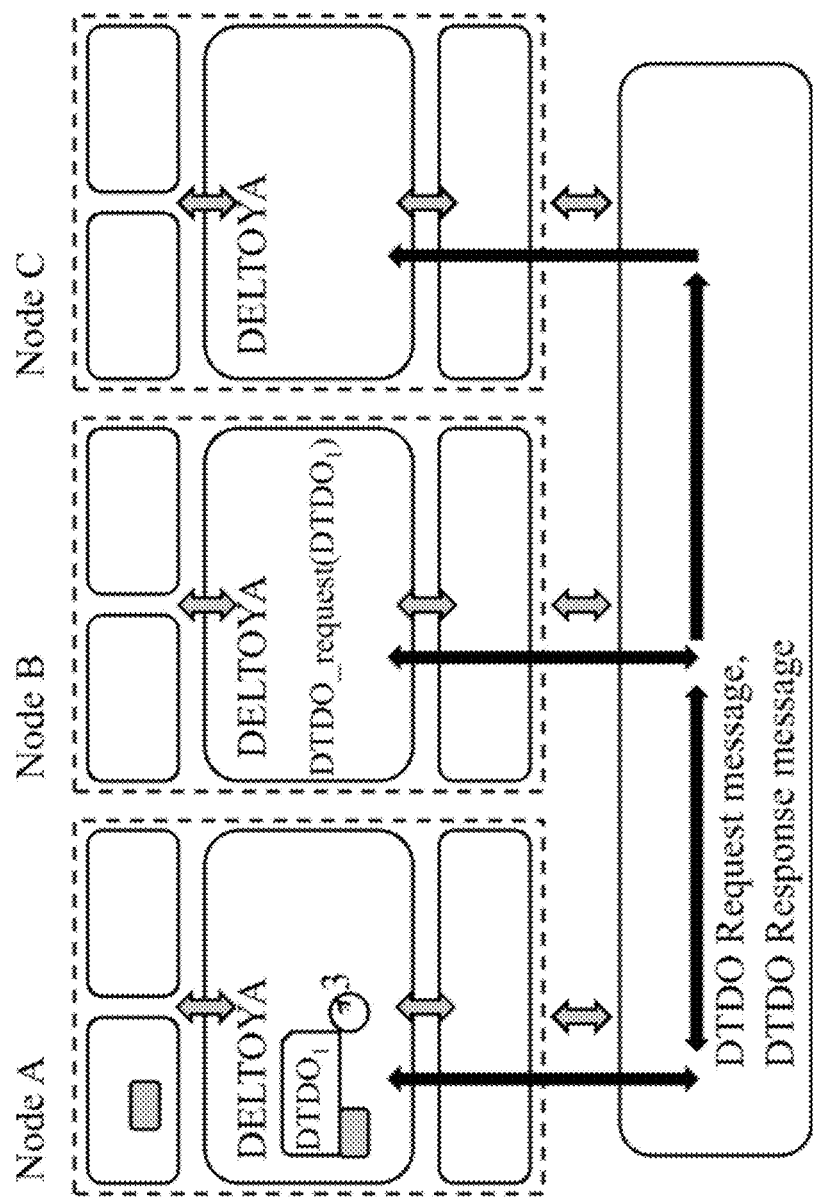
FIG. 18 shows an example of requesting the DTDO.

In FIG. 18, node B's application requests $DTDO_1$. In the example, this is invoked by the networking application by means of a DTDO_request primitive. This triggers the transmission of a message (e.g., sent in broadcast) requesting for the DTDO (DTDO Request message). Node A will answer that it has the requested DTDO available, by means of the DTDO Response message.

Figure 19:
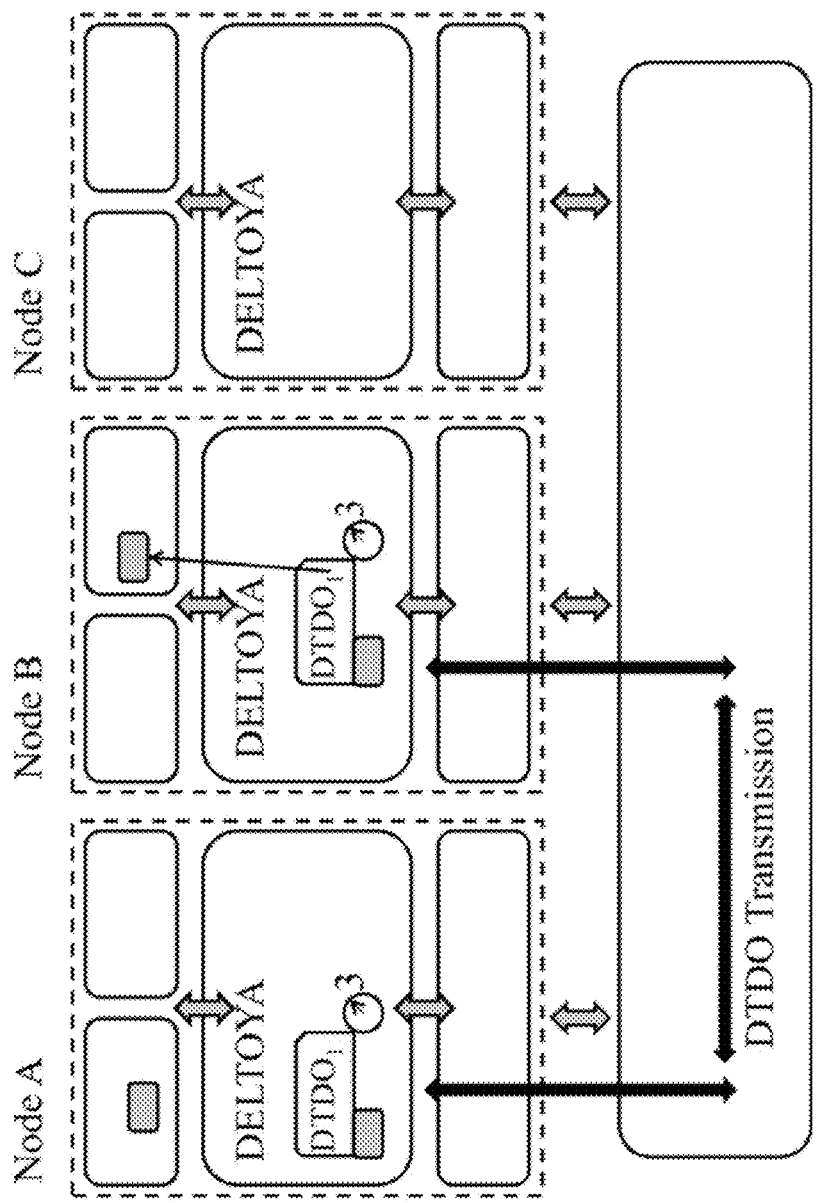
FIG. 19 shows an example of transmitting the DTDO.
Figure 20:
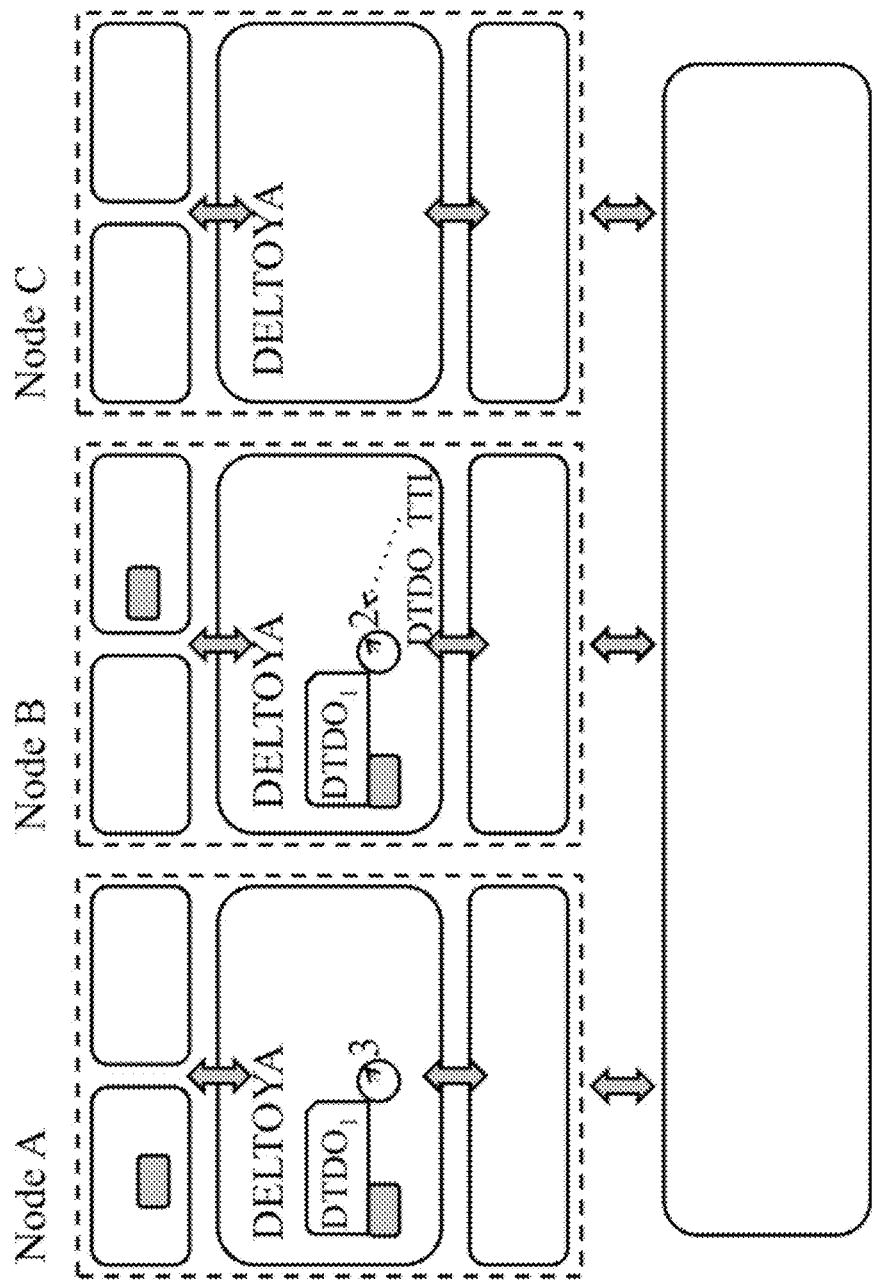
FIG. 20 shows an example of the DTDO aging.

FIG. 19 shows node B finally getting the DTDO (via other protocols of the layering architecture of the section "4.1 A Possible Organization" such as PTP). The DTDO_data part (i.e. the field of the DTDO containing the actual data) is copied to the networking application which has requested the DTDO. Moreover, the DTDO resides for sometime in the DELTOYA memory space. The time the DTDO will reside there will be determined by the DTDO_TTL field. The DTDO_TTL of the DTDO stored in node B is shown in FIG. 20.

Figure 21:
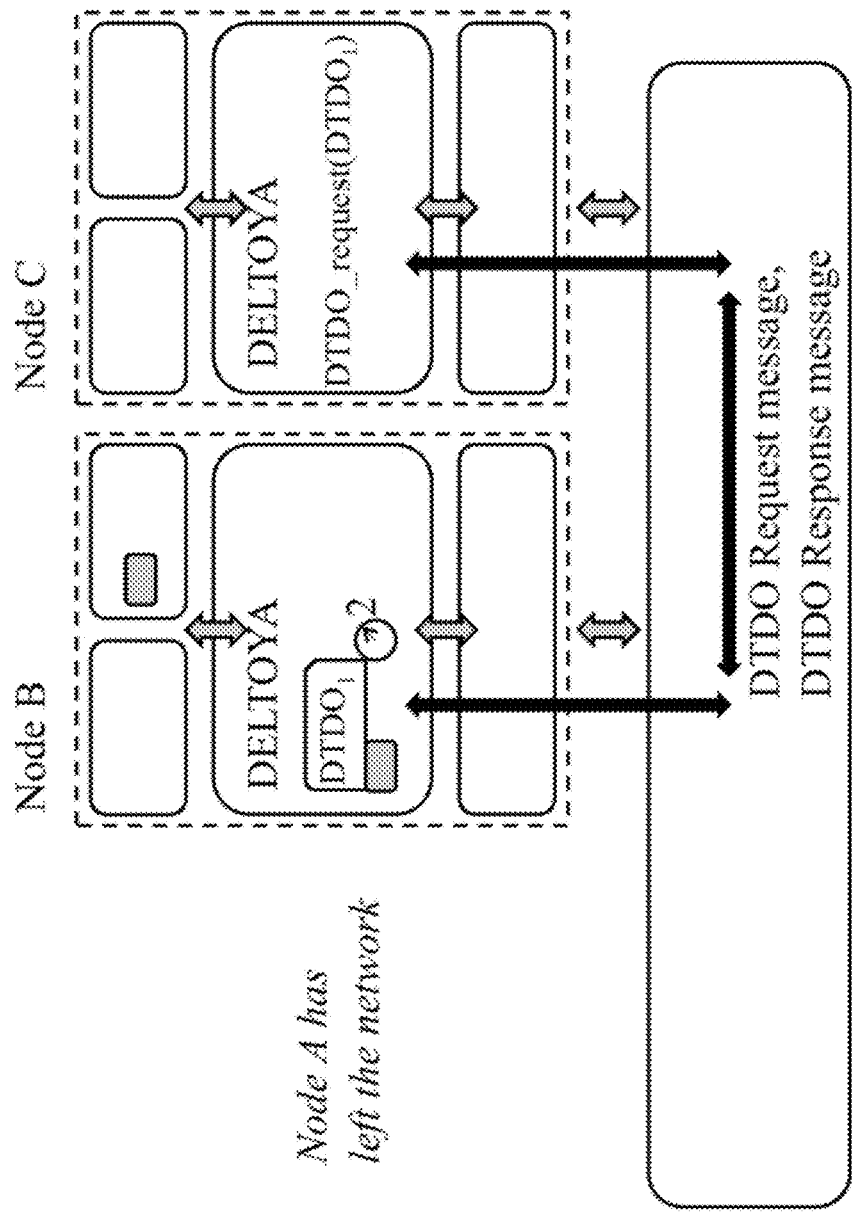
FIG. 21 shows an example of requesting again the same DTDO.

In FIG. 21 we see that an application residing in node C requests the same $DTDO_1$, again using a DTDO Request message. At this moment of time, node A, which created the DTDO, has left the network. The request made for node C is now only answered by node B, with a DTDO Response message.

In case node A was in the network, both nodes will answer the request, and it would be a decision of node C to choose from which node to retrieve the DTDO or fragments of the DTDO. In this case, node C could even request the same DTDO, or fragments of the DTDO to both nodes A and B, or just to A or B.

Figure 22:
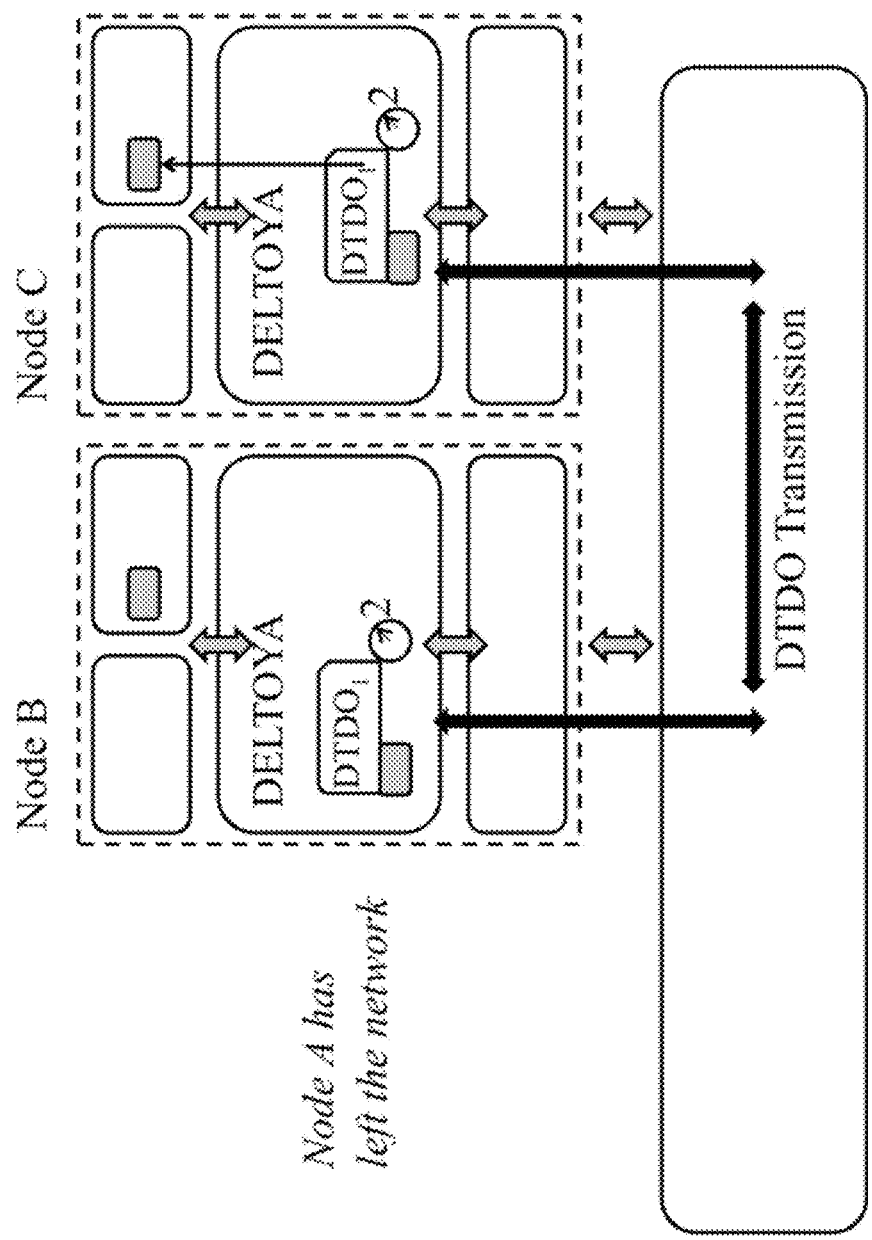
FIG. 22 shows an example of transmitting again the same DTDO.

In FIG. 22, node C finally gets the DTDO from B (via other protocols of the layering architecture of the section "4.1 A Possible Organization" such as PTP), by means of a "request_dtdo" primitive. The DTDO_data is delivered to the application in node C. The DTDO is again stored in the memory space of DELTOYA in node C.

Figure 23:
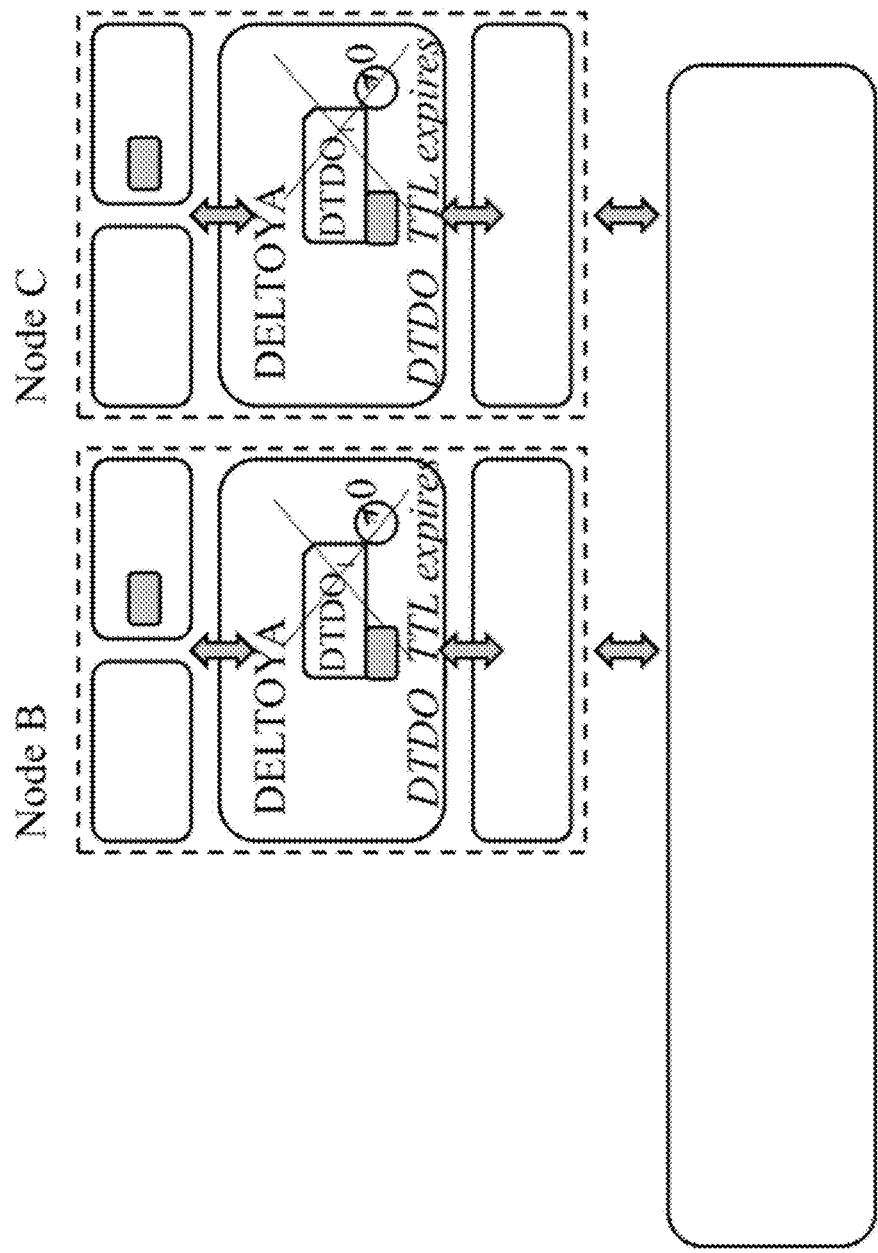
FIG. 23 shows an example of deleting the DTDO.

In FIG. 23 we see that the DTDO_TTL expires in both nodes B and C. These nodes will remove then the DTDO copies in their DELTOYA memory space. Note however that the data stored by the applications is not affected by the TTL expiration.

4.2.11 DTDO Sending

DELTOYA may provide means for the application to send a DTDO or a fragment of a DTDO to other nodes of the network, even when the destination node has not requested the DTDO or fragment of the DTDO.

We can provide structure to the exchanged DTDOS, defining, for instance, a "chain", which defines an ordered sequence of DTDOs.

In order for the destination node to receive the DTDOs, we may define a new structure, called "dock", which defines a kind of virtual deliverable place for DTDOs. Docks are identified by a "dock_id", which may include a way to identify the node where the dock resides, and uniquely identify the dock inside the destination node.

As an example, assume that an application residing in Node A wants to send a DTDO to another application residing in node B. Node A sends a DTDO Send message to node B, indicating the DTDO, fragment of the DTDO or chain of DTDOs it wants to send, and the dock_id of the dock where this DTDO will be placed. In case of a DTDO chain, there may be some additional parameters, as the "chain resistance" explained later. If node B receives the DTDO Send message, and it accepts the request, then it will start a DTDO Requesting mechanism for the DTDO, as if the DTDO Request was originated by Node B. Note that it can be possible that the node B starting the DTDO Requesting mechanism gets the DTDO or fragment of the DTDO from a node or nodes different from the node A that has sent the DTDO Send message, achieving then the same diversity than in the DTDO Requesting mechanism.

4.2.11.1 Docks and DTDO Chains

A dock is a structure where DTDOs sent by other nodes are placed. Docks are uniquely identified by identifying the node to which they belong and uniquely identifying the dock inside this node.

Docks can receive unchained DTDOs (i.e. DTDOs not belonging to a chain structure) or chained DTDOs (i.e. DTDOs belonging to a chain structure).

DTDO chains are a data structure consisting of an ordered sequence of DTDOs. DTDOs include information to identify the chain to which they belong to and their sequence order inside this chain.

Docks receiving chained DTDOs deliver these DTDOs in order. This means that DTDO with sequence number N+1 will be delivered after the DTDO with sequence number N has being correctly received by the dock and delivered to the entity reading the DTDOs from the dock.

DTDO chains may, however, have a "resistance" (R) property. The "resistance" of a DTDO chain defines the maximum time the dock waits until making available to the destination node application an out-of-order DTDO belonging to the chain. For instance, assume that DTDO with sequence number N+1 is correctly inserted in a given dock at time instant T. If at time T, the DTDO with sequence number N is not available for delivery by the dock, the DTDO with sequence number N+1 will not be available for delivering by the dock. The DTDO with sequence N+1 will be available for delivery whenever one of these two events happens: (i) DTDO N is available for delivery by the dock, or (ii) the time instant T+R is reached, being R the chain resistance of the chain where the DTDO belongs to.

Although it is possible to have pre-established and well-known docks in every node of the SPAN, mechanisms for querying non pre-established docks can also be used. For example, we can ask to an specific node which are its docks in this moment, or for example, we can ask to all the nodes of the span if someone has an specific dock.

4.2.11.2 DELTOYA Send Example

Here we show an example of the operation of a possible implementation of the DTDO Send mechanism of DELTOYA.

Figure 24:
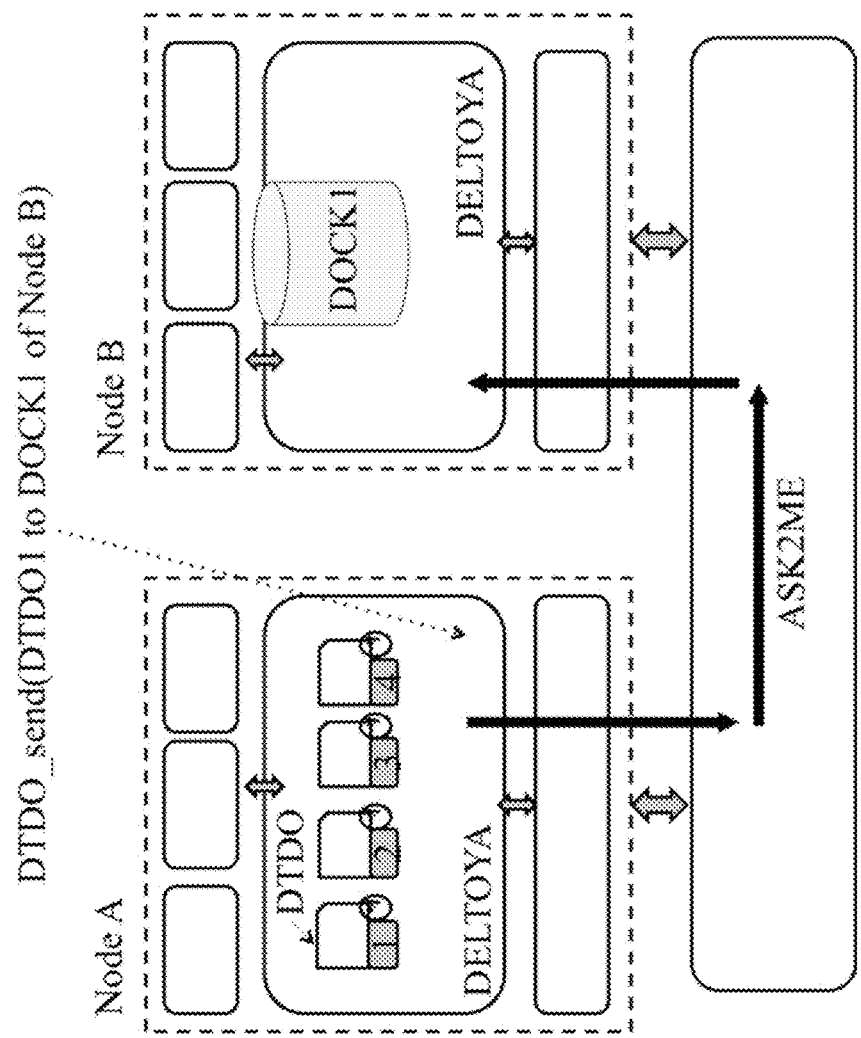
FIG. 24 shows an example of sending (or pushing) a DTDO to a DOCK.

In FIG. 24, Node A wants to send the DTDO1 to the DOCK1 of the node B. Node A calls the DTDO_send primitive specifying the DTDO it wants to send and the DOCK where it wants to put the DTDO. Note that in this example, node A is already aware of the existence of the DOCK1 in node B. DOCK1 could be a well-known dock for every node, or if not, node A would have executed previously a DOCK discovery mechanism querying for the possible docks of node B in order to discover the DOCK1 of node B.

As a result of the primitive, an ASK2ME message is sent from node A to node B.

The ASK2ME message contains all the information needed to allow the node B to get the DTDO1 from node A. If node B accepts receiving the DTDO1 from node A, node B will start a DTDO_request primitive as if node B was the node that was started itself a DTDO_request for this DTDO1. See FIG. 18 and FIG. 19 where there is an example of a DTDO_request done by node B to node A.

Figure 25:
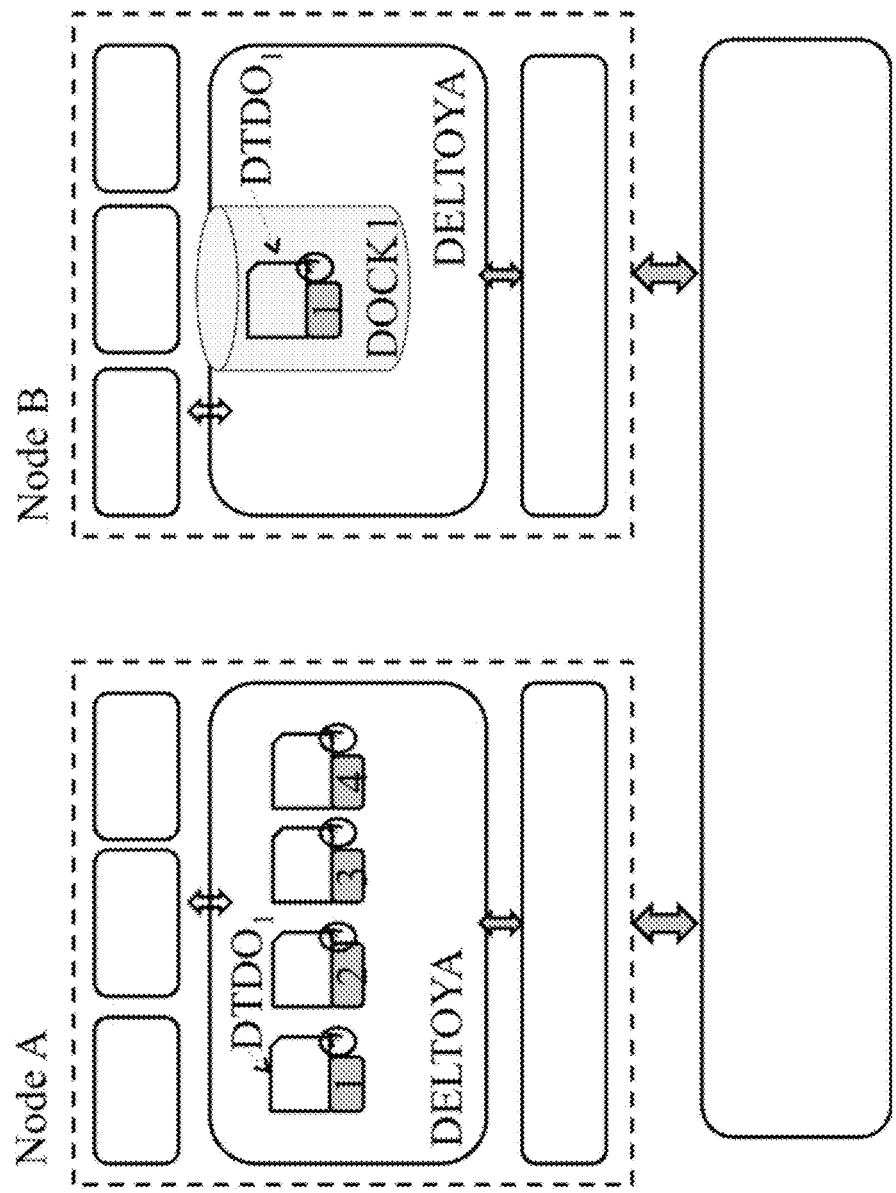
FIG. 25 shows an example of a DTDO waiting in a DOCK for being picked up.

In FIG. 25, node B has finally received the DTDO1 and, since the DTDO_request of nod B was due to a DTDO_send from node A, node B has put the DTDO1 in the corresponding DOCK1. From now on, the DTDO1 inside the DOCK1 is already waiting for being picked up from the DOCK.

4.2.12 DTDO Infecting

DELTOYA may provide means for the application to infect a DTDO (or a fragment of a DTDO) or a request for a DTDO to other nodes of the network, even when they are not interested in caching or requesting this DTDO (or fragment of this DTDO).

Several examples of DTDO Infecting are explained in chapter "Connected and disconnected scenarios".

4.3 Patient Transport Protocol (PTP)

PTP is a novel mechanism for ensuring a reliable transport of information through the network while avoiding congestion conditions.

PTP may be considered as a transport protocol, that adds to the typical functions of transport protocols (e.g. end-to-end error retransmission, reordering, congestion and flow control), the property of delay tolerance, meaning that PTP is patient when it wants to send or receive information through the network (i.e. it does not block when it cannot get a specific packet).

PTP may closely work with DELTOYA, as in the example architecture described in section "4.1 A Possible Organization". However, PTP may also work independently of DELTOYA.

For example, PTP may work directly with the application (i.e., without using DTDOs as transfer data units), in the same way other transport layer protocols such as TCP do. In this case, MRT and other parameters of PTP can be set by the application or set to their default values.

When DELTOYA issues a primitive for requesting a DTDO, a Maximum Retrieval Time (MRT) and other parameters of PTP may be set. This means that PTP may keep in the process of retrieving the object for MRT seconds. If the DTDO transfer is interrupted (may be due to a network disconnection), PTP may keep retrying for MRT seconds, or until de object is successfully retrieved.

4.3.1 PTP Segmentation

In the case of PTP working together with DELTOYA, DTDOs or fragments of DTDOs may be segmented into a number of PTP Protocol Data Units (PTP PDUs) of a given size.

PTP PDUs are the basic transfer units used by PTP. PTP PDUs may include a PTP PDU header in which some control fields may be included (e.g. segment size, segment offset, DTDO_ID, DTDO fragmentation information, sequence number, checksum, etc).

When the destination node receives the PTP PDUs corresponding to a DTDO or fragment of a DTDO, it may reconstruct the DTDO or fragment of the DTDO from the received PTP PDUs using the adequate header fields (e.g., segment size and segment offset). Erroneous PTP PDUs may be discarded. An error control mechanism may be used in order to ensure a reliable transfer of PTP PDUs.

In the case of PTP working without DELTOYA, the same concept of PTP segmentation that with DELTOYA may be applied, the only difference being that blocks of data from the application point of view are used instead of DTDOs in order to be segmented into PTP PDUs.

4.3.2 PTP Push and Pull Modes

PTP may include push or pull transfer modes.

In push mode, the source node may decide the time instants in which the PTP PDUs are sent to the destination node. The destination node may send back acknowledgement packets, indicating the segments that have been correctly received. Window-based congestion and flow control mechanisms may be used, meaning that a maximum number of non-confirmed PTP PDUs may be in the network at any time. This maximum number of non-acknowledged packets is the window, which may be dynamically adjusted.

In pull mode, the destination node may send back to the source node PTP PDU Request messages, which request the transmission of a given number of PTP PDUs. The maximum number of PTP PDUs in the network in any given moment may be controlled by the destination node, which may use also a window-based mechanism, with a dynamically set window size. In pull mode, acknowledgements may not be needed (although they may be used) to guarantee error control. For example, just requesting the information PTP wants to get and waiting for it until a certain timeout may be enough to guarantee error control.

Figure 26:
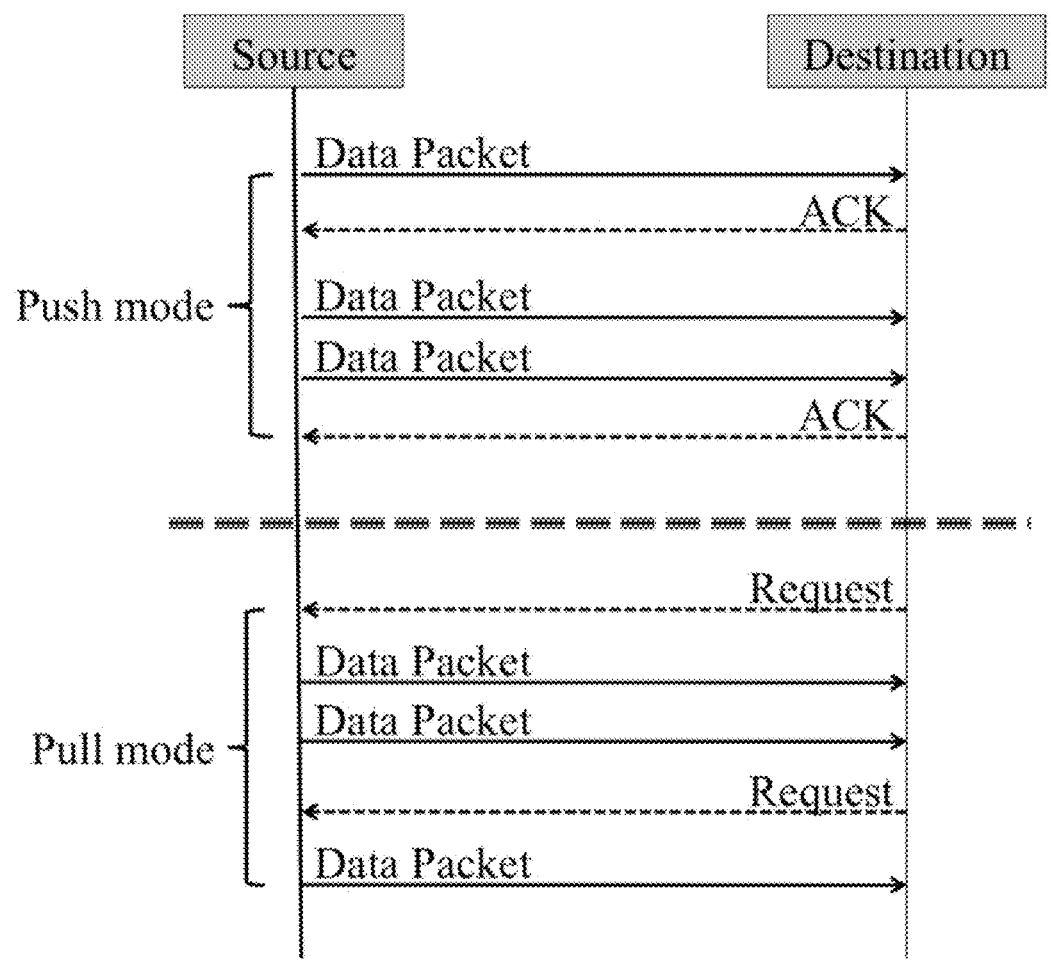
FIG. 26 shows an example of the scheme of the PTP push and pull modes.

In FIG. 26 we can see a possible scheme of both PTP push and pull modes.

4.3.3 Error Control

PTP error control may exploit delay-tolerance, meaning that when some packets fail to be correctly transmitted, PTP may try to get the lost packets from the same or other nodes depending on if using DELTOYA or not while continuing to get other packets, instead of blocking waiting for the lost packets from the same node.

Depending on the PTP transfer mode (push or pull), PTP may have different mechanisms of error control.

4.3.1.1 Pull Mode

In the case of PTP working together with DELTOYA, when DELTOYA sends to PTP the information of the nodes that have a certain DTDO or fragment of it and the request to retrieve this DTDO or fragment of it, then PTP may start the retrieval of the DTDO or fragment of it, and it may chose to perform the whole transfer from a single node, or retrieve different or even the same PTP PDUs of the DTDO from the different nodes. As said before, DELTOYA may provide the information of the different nodes from which PTP may be able to retrieve the DTDO or fragment of it. Moreover, PTP may request updates from DELTOYA of this information along time.

If PTP chooses a given node, but the transfer of information is interrupted or has low performance metrics (e.g. packet loss ratio, throughput, etc), PTP may chose to continue the DTDO transfer from other nodes. From doing so, PTP may ask DELTOYA for issuing a new DTDO Request message (DELTOYA Discovery mechanism) across the SPAN if it considers, for example, that the information it has about the previous DELTOYA Discovery mechanism is already obsolete. These actions are performed until the DTDO is completely obtained or the MRT timeout expires.

An example of an embodiment of this is the following: the destination node may send PTP PDU Request messages of the PTP PDUs that form the DTDO or fragment of it to a given node. These PTP PDU Request messages are used by PTP to request a given node the sending of a given PTP PDU or a set of PTP PDUs.

When some of the PTP PDUs fail to arrive, the node that requests the PTP PDU transmission may keep requesting these PTP PDUs to the same node, or it may choose another node that stores the same DTDO or fragment of it.

In this way, the process of getting the PTP PDUs of a DTDO or fragment of it does not block.

The idea is keep getting these PTP PDUs without bearing in mind if some are lost (and so, without the need of using acknowledgments and then, saving in overhead).

Eventually, the receiving node may decide to perform the error control. The error control is in charge of checking the PTP PDUs that have not been received. For requesting these non received PTP PDUs, new PTP PDU request message can be generated. These requests can be sent to the same nodes as before or to new ones, thus exploiting spatial and time diversity at the same time.

Moreover, even the process of getting the different PTP PDUs of one data flow may be distributed over several users in order to exploit diversity at maximum. The idea is to not worry about which PTP PDUs are lost during the process of getting the DTDO, as we do not want to block the flow; lost PTP PDUs will be asked to the same node/other nodes at this time/another time, when PTP determines to be convenient.

In the case of too many loses, PTP may also delay the retrieving process of the DTDO or the fragment of the DTDO by waiting a configurable period of time (which may depend for instance on the type of the information that the DTDO contains) for the appearance of new nodes in the network which could contain this DTDO or fragment of the DTDO.

In this way, PTP does not block when it cannot get the DTDO or fragment of the DTDO. Instead, it tries to get the DTDO or fragment of the DTDO from other nodes and only when it believes that too much time (e.g. MRT) has been used and no result has been obtained, then PTP may decide to notify the upper layers of the stack with the impossibility of getting this DTDO or fragment of the DTDO.

The decision of (i) how many of the users that have a specific DTDO or fragment of it PTP wants to get the DTDO, (ii) whether and how to divide the DTDO in several PTP PDUs, and (iii) how to set the parameters that define the delay tolerance that PTP wants to assign to the process of getting the DTDO, may depend on the type of the information the DTDO represents and on the state of the network at the moment of the request of the DTDO. Tuning all these aspects may be done in a dynamic way for every request of a specific DTDO and may be done by PTP itself or may be specified by the upper layers of the stack (e.g. DELTOYA, application, etc).

In the case of PTP working without DELTOYA, the same concept of error control that with DELTOYA may applied, the only difference being that data may only be retrieved from a single node (if there is not a discover mechanism like the DELTOYA Discover mechanism) and so, may be there is not possibility to change of node in order to get the data (although the application may issue actions on PTP in order to achieve this behaviour if PTP notifies the upper layers with feedback about the data transfer).

4.3.1.2 Push Mode

In the case of using PTP in push mode, acknowledgment mechanisms may also be used in order to guarantee error control.

In the case of PTP working together with DELTOYA, depending on the diversity that DELTOYA has decided to use to get a DTDO (e.g. from how many nodes we get the DTDO), simple acknowledgment strategies, selective acknowledgment strategies or negative acknowledgment strategies (i.e. ACKs, S-ACKs or N-ACKs) may be used, in a static or dynamic way.

The more diversity DELTOYA decides to use to get the DTDO, the less aggressive the acknowledgment mechanism of PTP may be needed (i.e. the more probability of getting a packet from different nodes, less error control we have to do for this packet). In this way, when we have more overhead due to the redundancy of exploiting diversity, we will have less overhead thanks to use less aggressive acknowledgment mechanisms.

For example, if DELTOYA decides to get the same DTDO from several nodes, just an error control identifying which packets have been lost could be needed when all flows have ended. Negative acknowledgement messages (N-ACKs) may be used in PTP in order to identify lost packets. If DELTOYA decides to get different parts of the DTDO from different nodes, we may need an error control a little bit more aggressive (since the probability of getting one specific packet is smaller). And if DELTOYA decided to get the entire DTDO from only one node, then the error control may be more aggressive. In both cases, acknowledgment messages (ACKs) or selective acknowledgement messages (S-ACKs) may be used in order to identify lost packets.

Selective acknowledgement messages are a generalization of acknowledgment messages for which a single message can indicate the acknowledgement of a non-contiguous number of PTP PDUs.

In the case of PTP working without DELTOYA, the same concept of error control that with DELTOYA may applied, the only difference being that data may only be retrieved from a single node (if there is not a discover mechanism like the DELTOYA Discover mechanism) and so, there is not possibility to adapt the acknowledgement strategy depending on the diversity of nodes to get the data that DELTOYA provides (although the application may issue actions on PTP in order to achieve this behaviour if PTP notifies the upper layers with feedback about the data transfer).

4.3.4 Congestion Control

Data rate may be controlled in order to avoid congesting the network. Problems that arise from a congested network may cause poor performance in the data flows of the network and in the functioning and operation of the network.

Depending on the current state of the network (number of flows, priority of the flows, number of users, type of data transmitting in the flow, etc) some mechanisms (e.g. TBFs, multipath routing, etc) may be used to assure no congestion state is achieved in the network, while new flows are added to the network.

A possible implementation of a congestion control may be done in a handshake way by both sides of the data flow. While the originator of the data packets may use a TBF to limit the rate, and keep decrementing the rate (up to a minimum), the receiver may keep telling the originator to increment the rate in case it receives the packets without loses. This behavior will let both sides to stabilize in the correct data rate, and always without exceeding the TBF.

4.3.5 Order Control

In the case of PTP working together with DELTOYA, PTP PDUs must be identified in some way in order to be able to build the entire DTDO or DTDO fragment correctly.

Sequence numbers, offsets, etc are possible mechanisms to be used for this purpose, and they can be fields of the PTP PDU header.

In the case of PTP working without DELTOYA, the same concept of PTP order control that with DELTOYA is applied, the only difference being that blocks of data from the application point of view are used instead of DTDOs in order to be controlled.

4.3.6 DELTOYA+PTP Example

Figure 27:
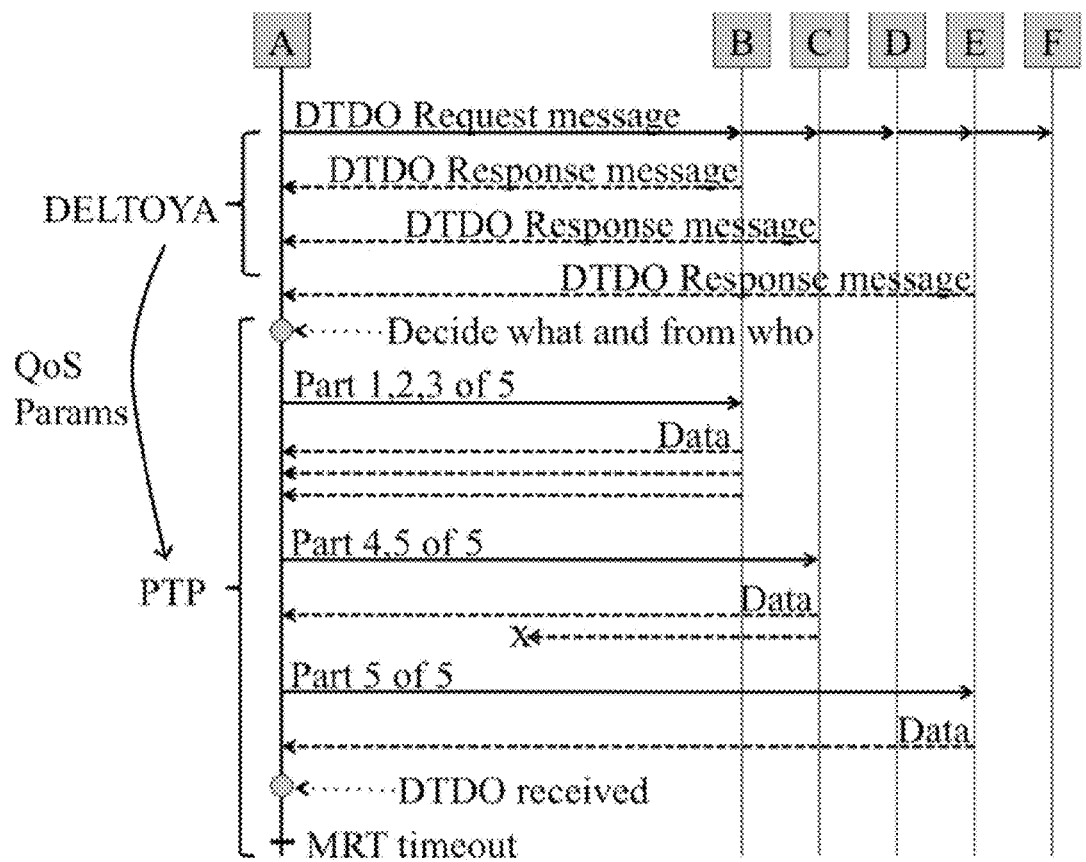
FIG. 27 shows a scheme of a possible operation of DELTOYA and PTP during the process of getting a DTDO.

In FIG. 27 we show a scheme of a possible operation of DELTOYA and PTP during the process of getting a DTDO. A, B, C, D, E and F are the nodes involved in the process. A is the node that wants to get the DTDO, and B, C and E are the only nodes that have the DTDO.

During the process, the first question that A issues is who has the DTDO. Node A will send a DTDO Request message, for example, in flooding and with the corresponding retransmission algorithm in case the DTDO Request message has no effects. All nodes that have the DTDO (B, C and E in this example) will reply with a DTDO Response message indicating which part of the DTDO they have (it is possible to have only fragments of the DTDO).

The payload of the DTDO Request message could contain the DTDO_ID and DTDO_version fields in order to identify the DTDO. The payload of the DTDO Response message could contain the DTDO_ID and DTDO_version, together with the [offset,size] of the fragments of the DTDO that the node has.

Once DELTOYA knows who has the DTDO, DELTOYA can request to PTP to start getting the DTDO while passing to PTP a set of QoS parameters (e.g., the set of nodes that have the DTDO, the MRT, etc) in order to let PTP know the more efficient way of retrieving the PTP PDUs in which PTP will divide the DTDO. Now PTP can decide if request all the PTP PDUs of the DTDO to one single node, or different PTP PDUs of the DTDO to different nodes, or same PTP PDUs of the DTDO to different nodes, etc. This decision may be taken in function of the QoS information of the DTDO. Moreover, and independently of how PTP gets the PTP PDUs, PTP may also decide from which node or nodes of the set of nodes hosting the DTDO it wants to get the PTP PDUs. This decision may be taken, for example, in function of some routing information, i.e., PTP may get data from the nodes with the best routing path.

Now, PTP may start the data flows to get the PTP PDUs of the DTDO from the node or nodes it decided to get the DTDO, while doing error, order and congestion control for each flow as we explained before.

4.4 AGgressive and Explosive NETwork Protocol (AGENET)

AGENET is a novel networking protocol that comprises the routing and forwarding capacities needed to establish communication between different nodes of the SPAN.

AGENET exploits cooperation and diversity, two aspects inherent to SPANs, mainly due to the broadcast properties of the wireless medium. Since SPANs are very fragile networks (e.g. due to node mobility and to wireless transmission errors), it becomes apparent that cooperation and diversity are two properties that may be exploited in order to build resilient SPANs.

AGENET is reactive to node mobility. Node mobility may cause frequent changes in the topology of the network, and so, frequent disconnections to communications between applications of different nodes of the SPAN.

AGENET works in a pure datagram way, as it does not establish per-flow routing paths between nodes involved in the communication process (e.g. source and destination node of a unicast communication process), then avoiding using obsolete routing paths due to node mobility. On the contrary, it uses recent routing information to decide where to send the packets at every packet transmission time.

Routing Zones (RZs) may be created in order to not send the routing information all over the network, and thus avoiding scalability problems.

Moreover, AGENET is CPU and battery aware, meaning that it takes into account the CPU usage and battery level of every node involved in the process of routing and forwarding, and tries to guarantee a fair use of these resources along these nodes.

Due to overhead and scalability problems, which do not allow sending routing information of the network very frequently, routing can lead to election of erroneous routing paths. In these situations, a mechanism called explosive forwarding may be used as a last resort, in order to keep alive the flow of packets towards the destination.

4.4.1 Aggressive Routing

Routing in AGENET does not establishes a per-flow routing paths between nodes involved in the communication process. Instead, routing in AGENET allows every node of the network to decide, at every packet transmission time, to which next node send the packet in order to finally allow the packet reach its destination. This decision may be taken depending on recent topology and state information of the network. This lets the routing to be more reactive in front of node mobility, the main problem of SPANs.

We will assume that a routing agent, in charge of managing the routing capabilities, is present in every node of the SPAN.

Routing agents in AGENET send routing information between all nodes of the network, in order to let every node know the information needed to decide to which next node send the packet in order to reach the destinations.

This information may include several wireless aware routing metrics.

For instance, it may include: (i) the number of hops between source and destination in a multihop SPAN, (ii) the number of explosive neighbours of each routing node, (iii) the level of battery of each routing node, (iv) the freshness of the information, etc.

Routing agents in AGENET may use flooding to send this information to all nodes of the network. Every node of the network may be in charge of sending its own information and the information it has learnt from other nodes of the network.

For instance, they may send this information periodically.

The nodes may also send this information depending on some triggers generated by the state of the network.

Routing agents in AGENET may use mechanisms to detect which of the routing information that travels through the network is more recent and to avoid routing loops.

Packet identifiers managed by the originator of the information may be used to detect the most recent information. For instance, they may use sequence numbers, timestamps, etc.

Source routing information may also be used for the same purpose.

Routing agents in AGENET may use a heuristic to decide how to build the routing table from all the routing information they receive. The heuristic may be based on the wireless aware routing information sent by the routing nodes. The heuristic allows nodes to build the routing table with the best routing information at every time instant.

In case of having several possible next-hops to the same destination with the same or similar costs, routing agents in AGENET may use some mechanisms to decide among these possible options, the next node to which the packet must be sent in order to reach the destination.

For instance, a Round Robin may be used, meaning that the nodes establish a periodic pattern so that the same route does not need to be chosen always even if the costs have not changed. The Round Robin mechanism may allow nodes to distribute the data packets for different routing paths, achieving a fair CPU and battery usage of the nodes involved in the routing paths.

Routing agents in AGENET may send routing information messages with high frequency and priority, mainly to supply every node of the network with very recent information of the topology and state of the network. In this way, problems that arise due to node mobility will be almost negligible, since they will be repaired in a short period of time. However, the routing agents would have to address potential scalability and overhead problems.

In order to deal with the scalability issues, AGENET tries to minimize the overhead due to routing information messages. The mechanism tries to send routing information messages only when they are needed and only where they are needed. While no data flows appear in the network, the mechanism tries to not send routing information.

Routing in AGENET addresses scalability by using the concept of Routing Zone (RZ).

A RZ is a set of nodes of a SPAN that are involved in the process of routing (i.e., sending routing information, forwarding data packets, etc) due to the appearance of a data flow. Outside the RZ (i.e., in the areas of the network in which there is no data traffic) no routing information is sent.

RZs may take into account the number of nodes in a specific area, meaning that scalability is not only achieved outside the RZ but also inside it. Routing in AGENET includes mechanisms to start, maintain and stop the RZs needed to support each flow of data that can appear in the network.

Routing agents in AGENET may reduce the overhead of sending the routing information by implementing a scheduled flooding mechanism where nodes distribute their own routing information and the information learnt from others through the network in a periodic way. For instance, this could be performed by flooding. The process of distributing this routing information may be triggered when they receive new information or may be generated at some time instants.

Routing information may have a Time to Live period assigned, in order to avoid sending it all the time and to avoid sending it out of the limits of the network.

Depending on the state of the network, the information sent in the flooding messages may be set dynamically, meaning that nodes only communicate the necessary information at a given instant of time (e.g., at a given time, nodes only communicate the information that may affect the routing decisions of most of the routing nodes).

4.4.1.1 Routing Information: AGgressive ROuting Hellos (AGROHellos)

AGROHello messages are used to distribute routing information (e.g. connectivity information, cost per routing path, etc) through the network. This distribution may be performed by means of flooding.

Nodes of a RZ may use some mechanisms in order to save in overhead.

For instance, they can use periodic flooding of information, meaning that every time period of T_AGROHELLO seconds each node in the RZ will send an AGROHello message with its own information, also including the information it has learnt from other nodes of the network.

Since AGROHello messages could become large messages, the time period T_AGROHELLO has to be enough small to avoid work with obsolete information but enough large to avoid a lot of overhead and scalability problems.

In order to reduce the size of AGROHello messages, nodes may try to minimize the amount of redundant information included.

For instance, in a quasi-static network, only changes to the routing information may be sent.

The information carried out by the AGROHellos messages will be used to update the Routing Tables.

4.4.1.2 Scalability: Routing Zone (RZ)

A Routing Zone (RZ) is a set of nodes of a SPAN that are involved in the process of routing (for instance, sending routing information, forwarding data packets, etc). Outside the RZ, the nodes do not send any information related to the routing mechanism. In this way, scalability is achieved by limiting the geographical areas in which routing information is sent. In this way, routing information will be sent only when it is needed and where it is needed.

Moreover, not all nodes in a geographical area in which a RZ has been started may belong to the RZ. Depending on scalability parameters, as for example the number of nodes, AGENET may decide to include only a limited number of nodes in the RZ. Consequently, in SPANs with many nodes and high-density, a node belonging to a RZ can have other neighbouring nodes, which are in the same geographical area, but that may be excluded from the RZ.

Figure 28:
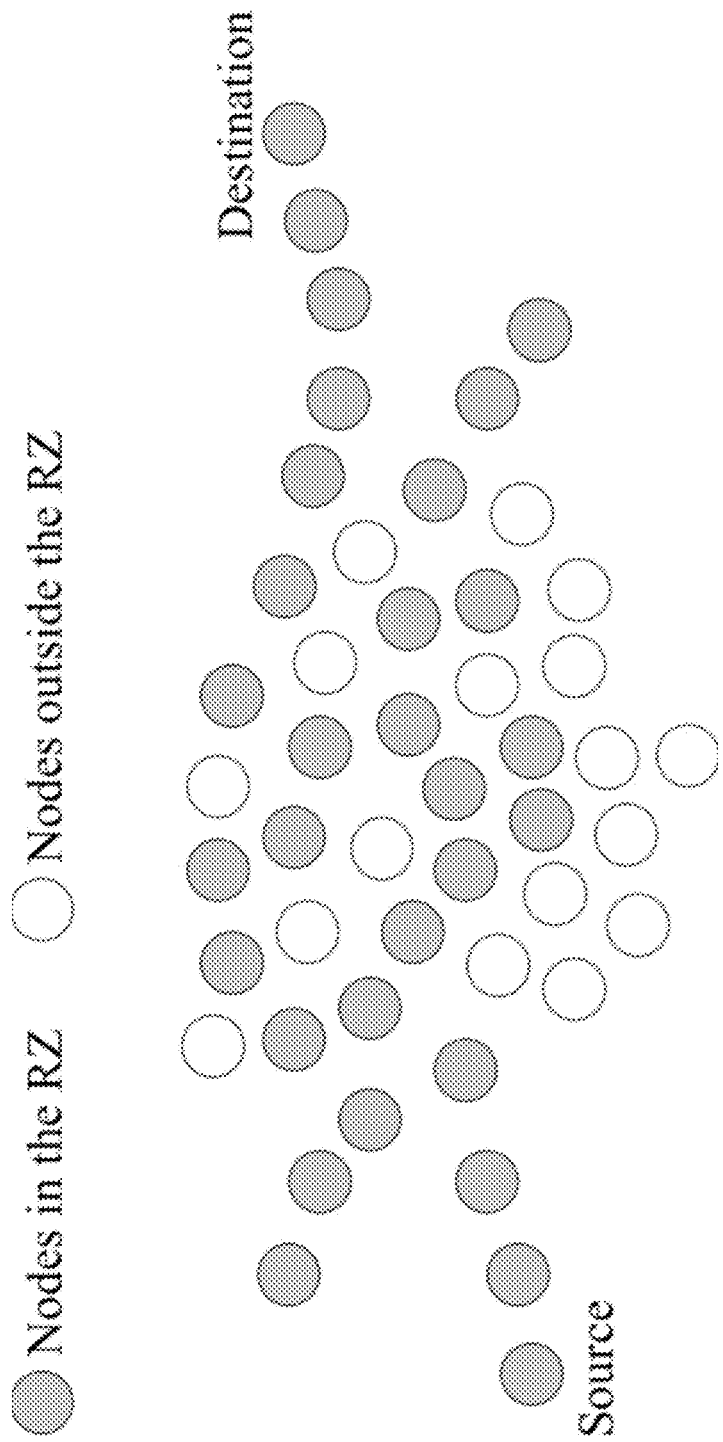
FIG. 28 shows an example of a routing zone.

In FIG. 28 we can see an example of a RZ.

An example of an embodiment of a mechanism that creates, maintains and ends RZs is the following:

4.4.1.2.1 Creating a RZ

When a source node wants to establish a communication path with a destination node to send data packets, a Route Discovery mechanism may be initialized.

The Route Discovery mechanism may be used to both discover one or multiple routing paths to the destination and create the RZ.

A possible embodiment of the Route Discovery mechanism is the following:

The source node broadcasts a Route Discovery Request (RDREQ) message in flooding in order to reach the destination.

RDREQ messages may use RDREQ identifiers (e.g., set by the source node and incremented each time a new RDREQ message is sent) and source routing lists (i.e. a list of the nodes for which the RDREQ message is forwarded from the source towards the destination). In this way, intermediate nodes may both detect duplicated RDREQ messages and decide to forward only a limited number of RDREQ messages. At the same time, intermediate nodes may use the source routing list of the RDREQ messages to detect routing loops and to decide if to forward the current RDREQ message or instead, to wait for a possible new RDREQ message that can be received in the future. This decision may be taken, for example, depending on the type of the routing paths that nodes want to establish (e.g. node-disjoint or link-disjoint routing paths).

Intermediate nodes forwarding a RDREQ message may learn the routing path from where the RDREQ message comes from, i.e., the routing path to the source node. This routing path may be used to forward back the responses to the RDREQ messages that the destination may send to the source node.

Figure 29:
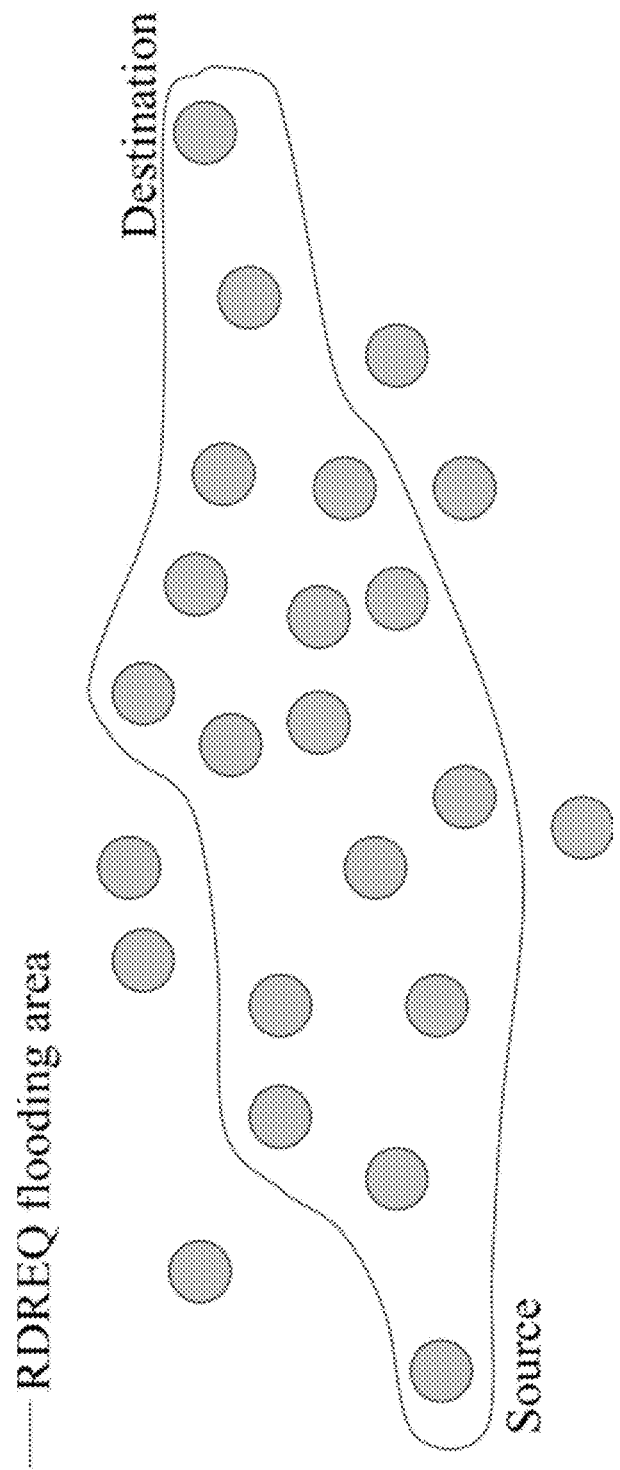
FIG. 29 shows an example of how to send RDREQ messages.

In order to avoid disseminate the RDREQ flooding all over the SPAN, every RDREQ can have attached a TTL value which, once the RDREQ is parsed, the TTL will be decremented hop by hop. The TTL value will be initialized at MAXTTL and when it reaches 0, the RDREQ can be discarded and so, not forwarded. This RZ information (the TTL) is strictly related with the horizon of the groups of a SPAN (see sections "3.2 SPAN and Group Limits and Horizons" and "3.4 User identities"). See an example in FIG. 29.

A retransmission algorithm for RDREQ messages may be used in order to keep sending RDREQ messages for a certain destination until, for example, a response is obtained or a given timeout expires.

Mechanism such as sequence numbers, etc may be used in order to avoid creating routing loops due to the fact, for example, of using multiple RDREQ messages for the same destination.

Once one or more RDREQ messages reach the destination, Route Discovery Response (RDRES) messages may be sent from the destination to the source node, for example, in unicast mode and one RDRES message for each RDREQ message received (or just a limited number of RDRES messages).

RDRES messages may also use RDRES identifiers (e.g., set by the destination node and incremented each time a new RDRES message is sent) and source routing lists (i.e. a list of the nodes for which the RDRES message is forwarded from the destination towards the source node) in the same way RDREQ messages do.

Figure 30:
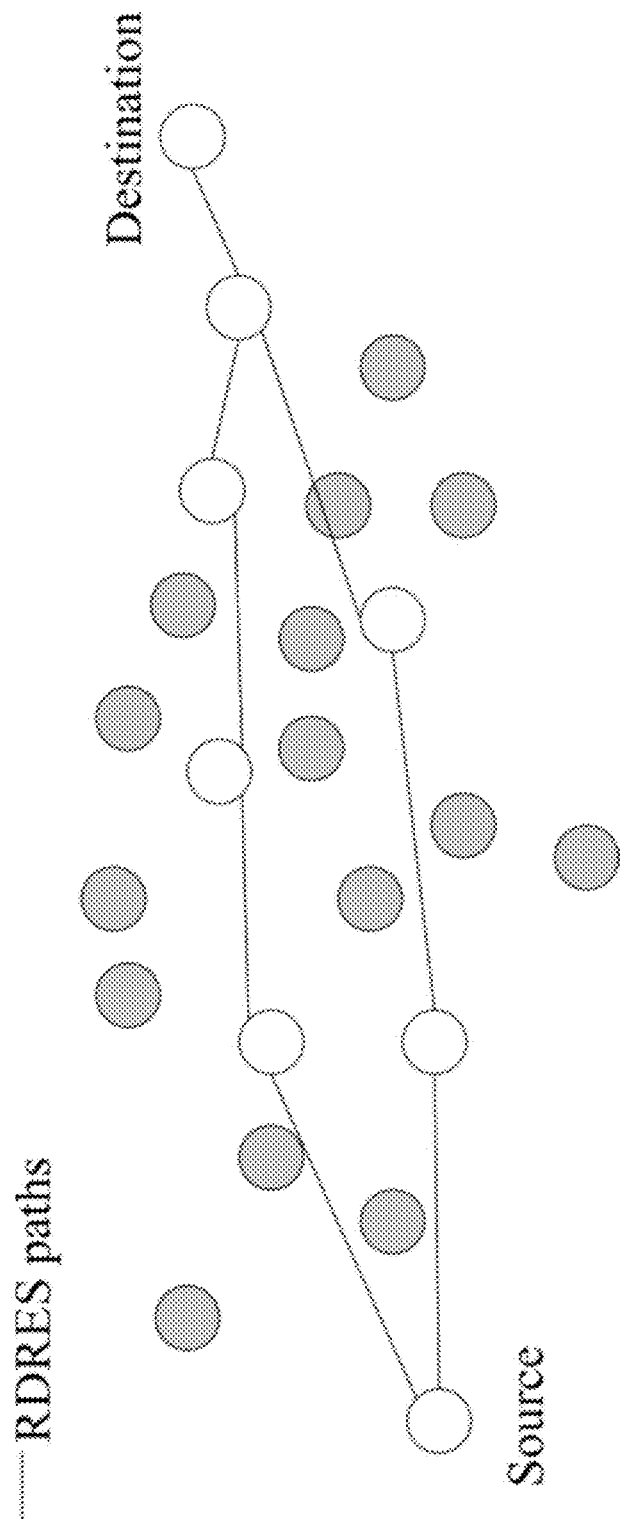
FIG. 30 shows an example of how to send RDRES messages.

RDRES messages may be forwarded through the intermediate nodes that previously have forwarded RDREQ messages (i.e., intermediate nodes that have a routing path to the source node). Intermediate nodes that have forwarded N RDREQ messages for the same destination may receive, for example, N RDRES messages to forward to the source node. These N RDRES messages may be either forwarded using a Round Robin mechanism with the N routing paths to the source node that the intermediate node may have learnt due to the N RDREQ messages or forwarded using the source routing list of the corresponding RDREQ for each RDRES. See an example in FIG. 30.

From now on, all the nodes that have parsed a RDRES message may become members of the RZ, and they may start to send the routing information via AGROHello messages.

4.4.1.2.2 Maintaining a RZ

Figure 31:
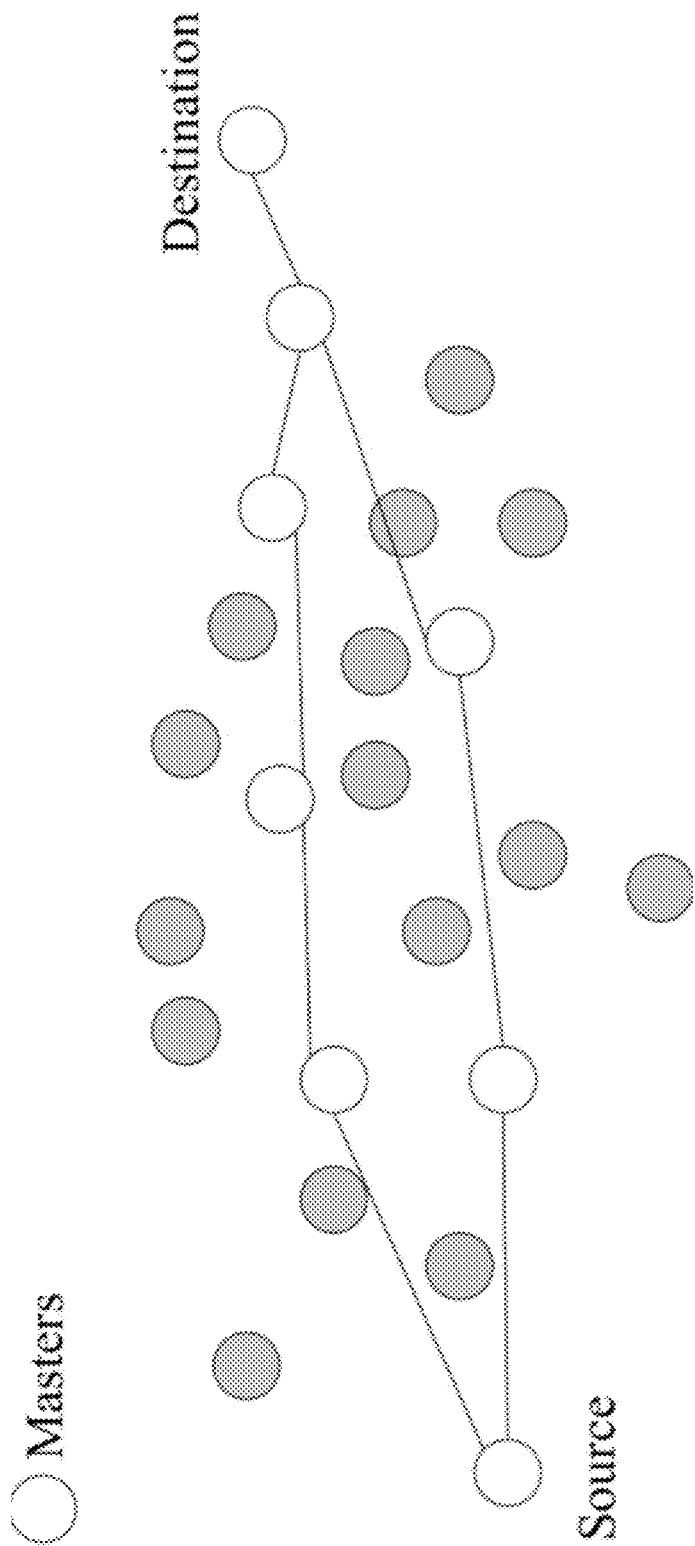
FIG. 31 shows the masters of a routing zone.

Every time a node forwards (or receives in the case of the destination node) a data packet (or a RDRES message), it automatically may become member of the RZ and may start sending AGROHello messages. This type of members of the RZ are called Masters. See an example in FIG. 31.

The AGROHello messages sent by the masters may contain the RZ information needed to tell other nodes in the vicinity to also become members of the RZ.

For example, a hop count value may be used inside the AGROHello messages to tell nodes that are at distance RZ_HOPS hops from the masters to become members of the RZ. Nodes at distance more than RZ_HOPS hops from the masters may not become members of the RZ, even if they receive AGROHello messages.

Note that in the SPAN there are other limits to be taken into account (for instance, the horizon of the groups of a SPAN, see sections "3.2 SPAN and Group Limits and Horizons" and "3.4 User identities"), which could introduce additional limits to the RZ size.

Figure 32:
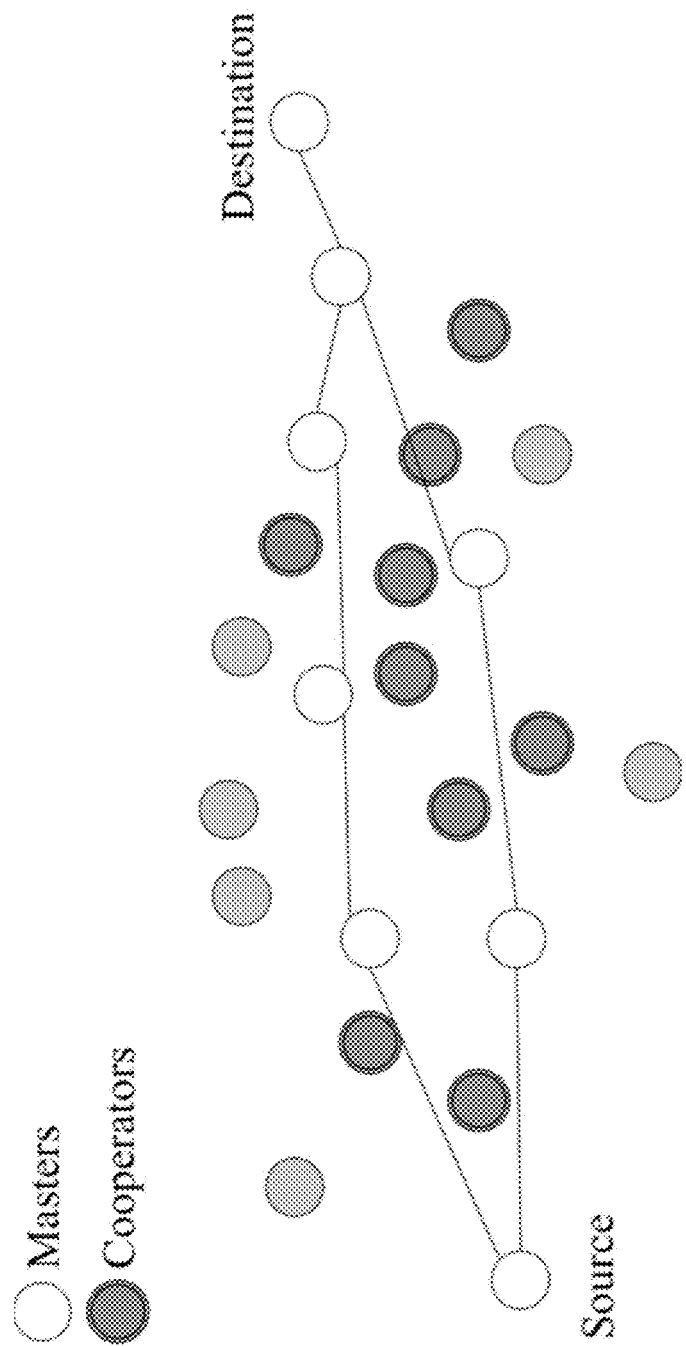
FIG. 32 shows the cooperators of a routing zone.

This type of members of the RZ are called Cooperators. See an example in FIG. 32.

Masters are the only members of the RZ that may designate other nodes to become members of the RZ (and, in a first stage, as cooperators). Once these cooperators forward a data packet due to routing decisions, then they automatically become masters, and then they can start to designate new cooperators for the RZ.

If a node is not member of a RZ, it will not forward a data packet.

RZ may be maintained along the time, thus supporting node mobility.

Figure 33:
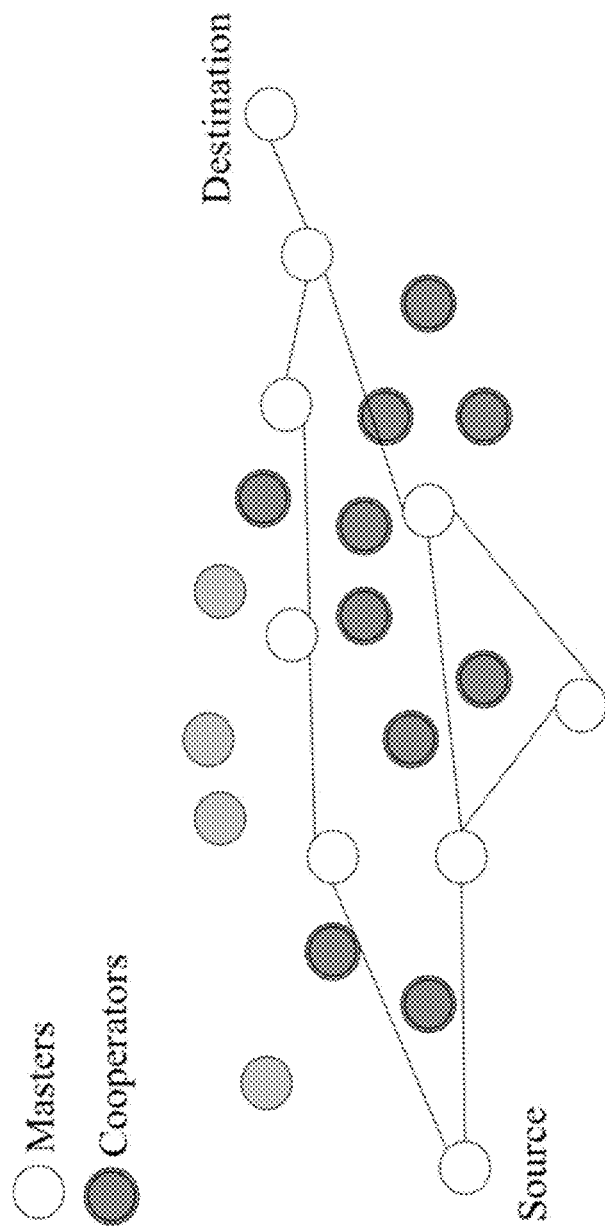
FIG. 33 shows an example of maintaining a routing zone, in which a new route has been used, and new masters and cooperators have been designated.

FIG. 33 shows an example, in which a new route has been used, and new masters and cooperators have been designated.

As we said before, some mechanisms for avoiding the creation of too big RZ may be used.

In order to avoid this too-big RZ situation, nodes may decide to not become cooperators of the RZ when they receive AGROHello messages indicating them to become members of the RZ.

Masters always become members of the RZ when indicated so.

Nodes may use an overhearing mechanism in order to know which nodes are already members of a RZ. For instance, they may listen to the AGROHello messages. From this information, nodes may learn how many nodes are already members of the RZ, deciding then to be or not part of the RZ. This mechanism avoids the creation of too-big RZ in SPANs with a high number of nodes, thus improving the scalability of the routing mechanism.

In order to avoid possible inconsistence problems, the source node may decide to restart a RZ. For instance, it can start the RZ every time period of RZ_RESTART seconds.

Another possibility is to restart the RZ when the source node detects that the paths are becoming too long, or too unreliable.

4.4.1.2.3 Ending a RZ

There are several possibilities for ending RZs.

An explicit message may be generated by the source node, in order to indicate nodes of a RZ that they should stop generating routing information message for the RZ.

Another possibility is to use an inactivity timeout. For instance, when a master node does not receive/transmit any data packet during a time period of TOUT_RZ seconds, then the node may leave the RZ.

Analogously, when a cooperator node does not receive any AGROHello message indicating it to become member of the RZ during a time period of TOUT_RZ seconds, then the node may leave the RZ. In other words, when the source node stops sending data packets, the RZ may automatically end.

4.4.1.3 Routing Table

Every entry of the routing table may correspond to a destination node (there can be more than one entry per destination, and a upper limit MAXENTRIESxDEST may be set), and it may contain information about the routing paths.

For instance, it may contain information about: (i) the path to reach this destination, (ii) the sequence of nexthops, which implicitly tells us the number of hops of the path, (iii) the number of explosive neighbours of each nexthop in the path, (iv) the level of battery of each nexthop in the path, or (v) the timestamp of this information (e.g. the time instant when this information was generated by the source node).

Moreover, every entry may have a timeout value of TOUT_ROUTINGENTRY seconds. For instance, if during TOUT_ROUTINGENTRY seconds the entry is not used, then it can be deleted from the routing table.

For instance, the routing table may have the information of Table 3 below:

TABLE 3

| Destination | Path | Timestamp (seconds) | Timeout |
|---|---|---|---|
| A | $B^{(2,20\%)}, C^{(4,83\%)}, A^{(1,99\%)}$ | $T_1$ | |
| A | $B^{(2,20\%)}, D^{(0,99\%)}, A^{(1,99\%)}$ | $T_2$ | |
| I | $B^{(2,20\%)}, E^{(4,5\%)}, F^{(3,25\%)}, I^{(1,50\%)}$ | $T_3$ | |
| G | $C^{(4,83\%)}, G^{(1,33\%)}$ | $T_4$ | |

Where the Path field is the path of nodes to follow in order to reach the destination, and every node has a superscript value indicating the pair (number of explosive neighbours that this node has, level of battery that this node has).

4.4.1.4 Loop-Free Mechanism in Aggressive Routing

A desirable property of the routing in AGENET could be the guarantee of loop-free routing paths. This is obtained by including a loop-free mechanism.

An example of a loop-free mechanism may be to add to the data packets a list (source routing list) of all the nodes for which the packet has been travelling along from the source to the destination. With this information, together with the Path field of the routing table, AGENET may be able to avoid sending packets through routing paths that may include loops.

For example, AGENET may check if one of the nodes of the source routing list of the packet appears in the list of nodes of the Path field of the entry to use in order to forward the packet.

4.4.1.5 AGROHello Format

Routing information may be distributed through the network via AGROHello messages. An example of AGROHello message format can be seen in Table 4 below:

TABLE 4

| Version, flags ... | | | Reserved | # of MACs |
|---|---|---|---|---|
| RZ information | MyMAC | | (# of explosive neighbours, level of battery) of mine | MyTimestamp |
| # of nodes  MAC1 | (# of explosive neighbours, level of battery) of MAC1 | MAC2 | (# of explosive neighbours, level of battery) of MAC2 | ... Timestamp |

TABLE 4-continued

| # of nodes | MAC1 | (# of explosive neighbours, level of battery) of MAC1 | MAC2 | (# of explosive neighbours, level of battery) of MAC2 | ... | Timestamp |
|---|---|---|---|---|---|---|
| ... | | | | | | |

Where:
1) Version=1
2) Flags=unused
3) Reserved=unused
4) # of MACs=number of destinations that the AGROHello contains (>0 because an AGROHello always will contain the information of the node sending it.
5) RZ information=used to define the limits of the RZ (e.g. a hop count value).
6) MyMAC=the MAC address of the node sending the AGROHello.
7) # of explosive neighbours of mine=the number of explosive neighbours (see section "4.4.2 Explosive Forwarding") of the node sending the AGROHello.
8) level of battery of mine=the level of battery of the node sending the AGROHello.
9) MyTimestamp=the time in which the node sends the AGROHello.
And then, for every additional destination contained in the AGROHello:
1) # of nodes=number of nodes to travel in order to reach this destination.
2) MAC1,MAC2, . . . , MACN=the nodes to reach the destination. MACN is the destination, MAC1 is the node sending the AGROHello, and the order of these MACs sets the order to follow towards the destination.
3) # of explosive neighbours of MAC1, MAC2, . . . , MACN=number of explosive neighbours associated to every node of the path.
4) # level of batter of MAC1, MAC2, . . . , MACN=level of battery associated to every node of the path.
5) Timestamp=the timestamp that this destination set when it sent the AGROHello containing it.

4.4.1.6 Sending AGROHellos

Only nodes that belong to a Routing Zone may send AGROHello messages.

For instance, these messages may be sent with a time period of T_AGROHELLO seconds (e.g., 1 second).

As an example, in each AGROHello, nodes may add:
1. Their own MAC address, their number of explosive neighbours and a timestamp equal to the time when they create the AGROHello message.
2. One entry (MAC address of all nodes in the path to this destination, number of explosive neighbours for every of these nodes, level of battery for every of these nodes, and timestamp which the destination assigned to this entry) in the AGROHello message for every entry they have in the routing table.
3. The RZ information depending on if they are masters or cooperators of the RZ (see section "4.4.1.2 Scalability: Routing Zone (RZ)").

4.4.1.7 Receiving AGROHellos

Not all nodes receiving AGROHello messages must process them.

For example, one possible embodiment is the following:

Masters must process all the AGROHello messages they receive.

Cooperators and other nodes only treat AGROHello messages for which the RZ information of the AGROHello message designates them as cooperators, either if this messages confirm their status of cooperators or if they designate them as new cooperators (e.g., if the AGROHello message was originated in a master at distance less or equal hops than RZ_HOPS hops from them).

When a node processes the AGROHello message, it may update its routing table in different ways. For instance:

For every entry in the AGROHello, the node may check if it has already an entry in the routing table for the same destination and with the same Path field:
1) Assume that the node has an entry in the routing table for the same destination and with the same routing path:
1.1) If the timestamp in the AGROHello message is greater than the timestamp of the entry in the routing table, the node may update the entry. For instance, it may update the number of explosive neighbours of every node in the path, the level of battery of every node in the path, and the timestamp, and updating the timeout of the entry.
1.2) Otherwise, the node will discard this entry of the AGROHello message.
2) Otherwise, the node will add the entry in their routing table only when:
2.1) No loop is created. This condition may be checked determining whether the node already belongs to the list of nodes which conform the path to the destination of this new entry, and
2.2) the node has less than MAXENTRIESxDEST entries for this destination, or the node has MAXENTRIESxDEST entries for this destination and the heuristic for this new entry is better than the heuristic of some of the MAXENTRIESxDEST entries that the node already has for the destination. In this case, the new one will substitute the entry with worst heuristic (see section "4.4.1.9 Routing Heuristic").

Moreover, masters may have to update their Explosive Neighbour List (see section "4.4.2.4 Explosive Neighbour List") and the cooperators and other nodes that treat the AGROHello message may set to TOUT_RZ seconds the timeout corresponding to their belonging to the RZ (see section "4.4.1.2 Scalability: Routing Zone (RZ)").

4.4.1.8 Routing Table Look Up

Every time a node of a RZ needs to send a packet, it may check the routing table in order to discover which entry it has to use in order to send the packet towards the destination. Since several entries may be simultaneously present in the routing table for a single destination, the node may have to choose which is the one to be used at this moment. This entry may be used to determine the nexthop node to which transmit the packet in order to follow the forwarding path towards the final destination node.

An example of this mechanism is a Round Robin mechanism. In this example, the entries for a given destination are chosen following a periodic order, meaning that each time the node needs to use an entry for a destination, it uses the entry subsequent to the entry used with the previous packet sent to the same destination, building a circular list of the possible routes to the destination.

In order to avoid loops, once the entry to be used is chosen, and before using it, the node may check if one of the nodes of the source routing list of the data packet appears in the list of nodes of the path of the entry recently chosen (see section "4.4.1.4 Loop-Free Mechanism in Aggressive Routing"). In this case, this entry will not be used and the next entry will be used in order to avoid loops with data packets. Another entry of the list will be then determined and the same process will be repeated, until an entry with no loop is found. In the case no entry is found for this destination, the packet may be discarded or even sent in broadcast (i.e. it will explode following the terminology of the section "4.4.2 Explosive Forwarding").

As it is explained in the section "4.4.2 Explosive Forwarding", the described look up process may have some exceptions. Once an entry is chosen, before using it and as a last check, nodes may check via EXFOHellos if they have to explode or not instead of using the routing information of the current entry. An alternative may be, before exploding, to use the next entry for the same destination, and only explode when several or all the entries of the destination have bad EXFOHello statistics (see section "4.4.2 Explosive Forwarding").

4.4.1.9 Routing Heuristic

The heuristic of Aggressive Routing may be used to decide which of all the entries that may be learnt via AGROHello messages will be stored in the routing table.

A limit may be established, e.g. a maximum of MAXEN-TRIESxDEST entries that may be stored in the routing table for each destination.

The entries with the best heuristic may be the entries stored in the routing table.

As explained before, for every entry the node may have routing information to a destination node.

For instance, the entry may have the following information: (i) the destination node, (ii) the path to follow in order to reach this destination, (iii) the number of explosive neighbours of each nexthop in the path, (iv) the level of battery of each nexthop in the path, and (v) the timestamp of this information (e.g. the time instant when this information was generated by the source node).

The path to follow to the destination node may include the sequence of nexthops, which implicitly tells us the number of hops of the path, although only the first nexthop will be used. Note that once the packet reaches the first nexthop, it will be responsibility of this nexthop depending on its routing table to decide to which subsequent nexthop send the packet.

See an example in Table 5 below:

TABLE 5

| Destination | Path | Timestamp (seconds) | Timeout |
|---|---|---|---|
| A | $B^{(2,20\%)}, C^{(4,83\%)}, A^{(1,99\%)}$ | $T_1$ | |
| A | $B^{(2,20\%)}, D^{(0,99\%)}, A^{(1,99\%)}$ | $T_2$ | |
| I | $B^{(2,20\%)}, E^{(4,5\%)}, F^{(3,25\%)}, I^{(1,50\%)}$ | $T_3$ | |
| G | $C^{(4,83\%)}, G^{(1,33\%)}$ | $T_4$ | | where the Path field is the path of nodes to follow in order to reach the destination, and every node has a superscript value indicating the pair (number of explosive neighbours that this node has, level of battery that this node has).

Several heuristics for determining the best paths are possible. For instance, a possible heuristic is to determine for every routing path a value H, in a way that the lower the H, the better the routing path.

4.4.2 Explosive Forwarding

Forwarding in AGENET is based on exploiting cooperation and diversity inherent in SPANs.

Due to overhead and scalability problems, which do not allow sending routing information of the network very frequently, routing can lead to election of erroneous routing paths.

In these situations, a mechanism called explosive forwarding may be used as a last resort, in order to keep alive the flow of packets towards the destination.

We will assume that a forwarding agent, in charge of managing the forwarding capabilities, is present in every node of the SPAN.

Due to node movement or to changes in the conditions of the wireless links, links of a routing path can enter into a state of poor transmission conditions, leading to frequent loss of packets.

Forwarding agents in AGENET may use some mechanisms in order to detect when links are in these poor transmission states.

For instance, a possible mechanism is to use frequent signalling messages (called EXFOHello messages) among nodes. These messages are one hop messages, meaning that they are not sent through the whole network and thus, cause minor problems of scalability. Moreover, only nodes involved in a communication path (i.e. masters of a RZ) will send these messages.

Other mechanisms for detecting bad transmission conditions, such as using feedback from the Transmission layer may be also used.

When a node detects that a link changes into a poor transmission state, it may start sending the data packets in broadcast. We will call this an "explosion". These messages will thus be received by the nodes in its vicinity (that we call "explosive neighbours"). This condition of broadcasting data packets will be maintained until the link changes into a good transmission state or until the routing forces the node to change of link.

When packets are forwarded via explosive forwarding and not via traditional forwarding, the explosive neighbours that receive the packet may use a heuristic to decide whether to forward the packet to the destination or not.

The heuristic used by explosive forwarding may allow explosive neighbours that receive packets via an explosion to decide whether to forward or not the packet. The heuristic may be based on properties of the topology and state of the network (e.g. hop count to the destination, etc) and it should also avoid the creation of loops or infinite series of explosions with the same packet.

Forwarding in AGENET does not necessarily avoid the retransmission of the packet by more than one explosive neighbour when explosion takes place. This may cause duplicate packets to the destination but it increases the robustness of the network.

Mechanisms to avoid duplicated packets or more than one cooperative action may be used.

4.4.2.1 Explosive Forwarding Example

Here we show an example of the mechanism of explosive forwarding.

Figure 34:
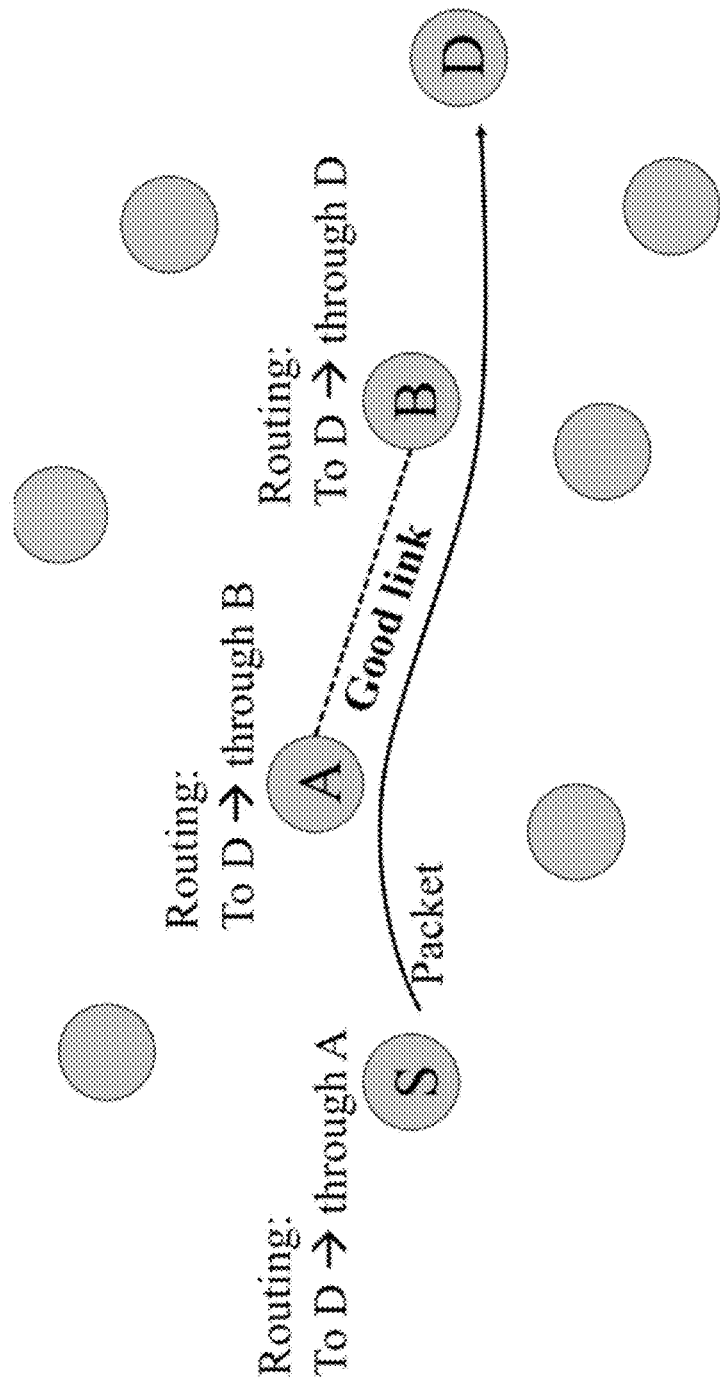
FIG. 34 shows a routing path between S and D, and a good link between A and B.

In FIG. 34, a routing path between S and D has been established. The wireless link between the masters A and B is good enough to be able to forward the packets without excessive transmission errors.

Figure 35:
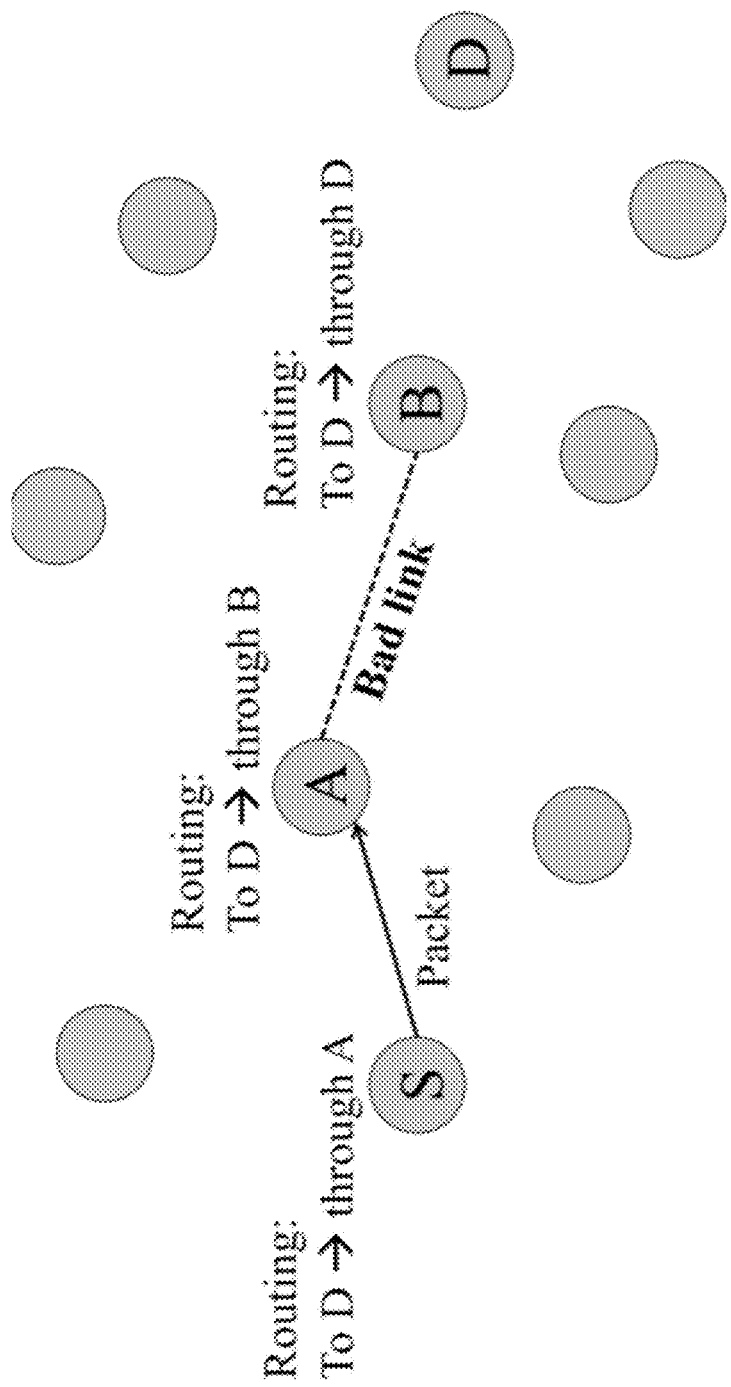
FIG. 35 shows the same routing path but with a bad link between A and B.

In FIG. 35, the wireless link between the masters A and B changes into a bad transmission state, thus introducing excessive transmission errors.

Figure 36:
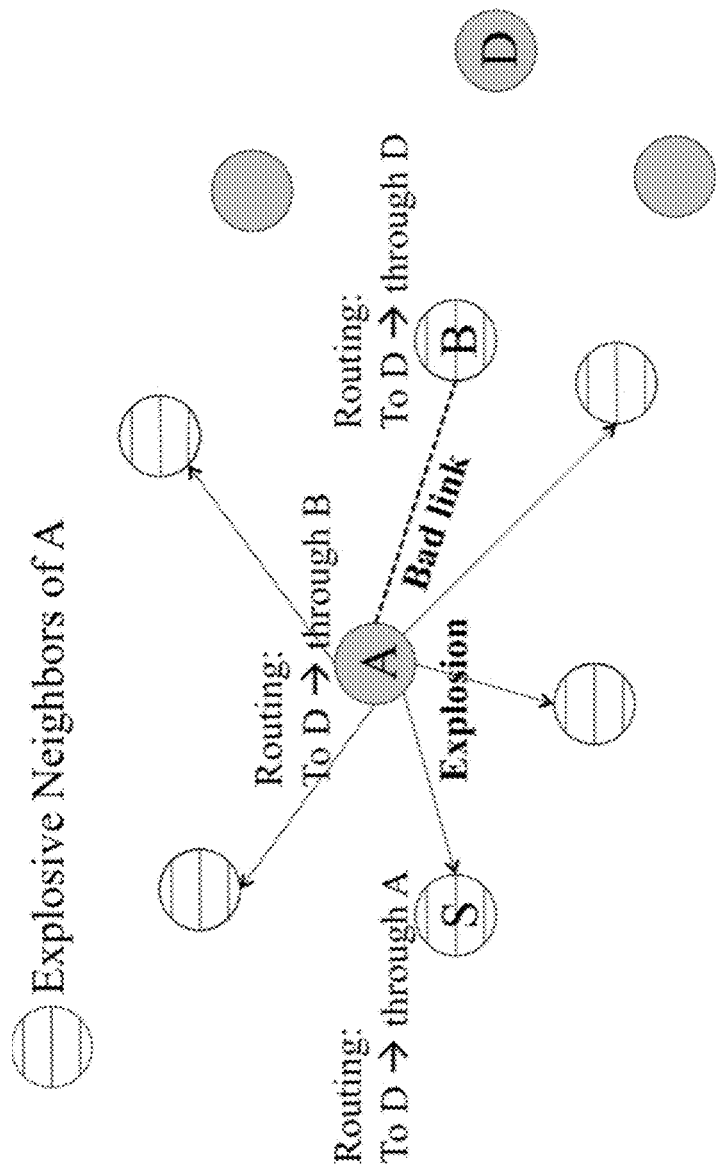
FIG. 36 shows the explosion of node A due to the bad link between A and B.

In FIG. 36, we can see how node A explodes when it wants to transmit a data packet to B since the link between A and B is bad.

Figure 37:
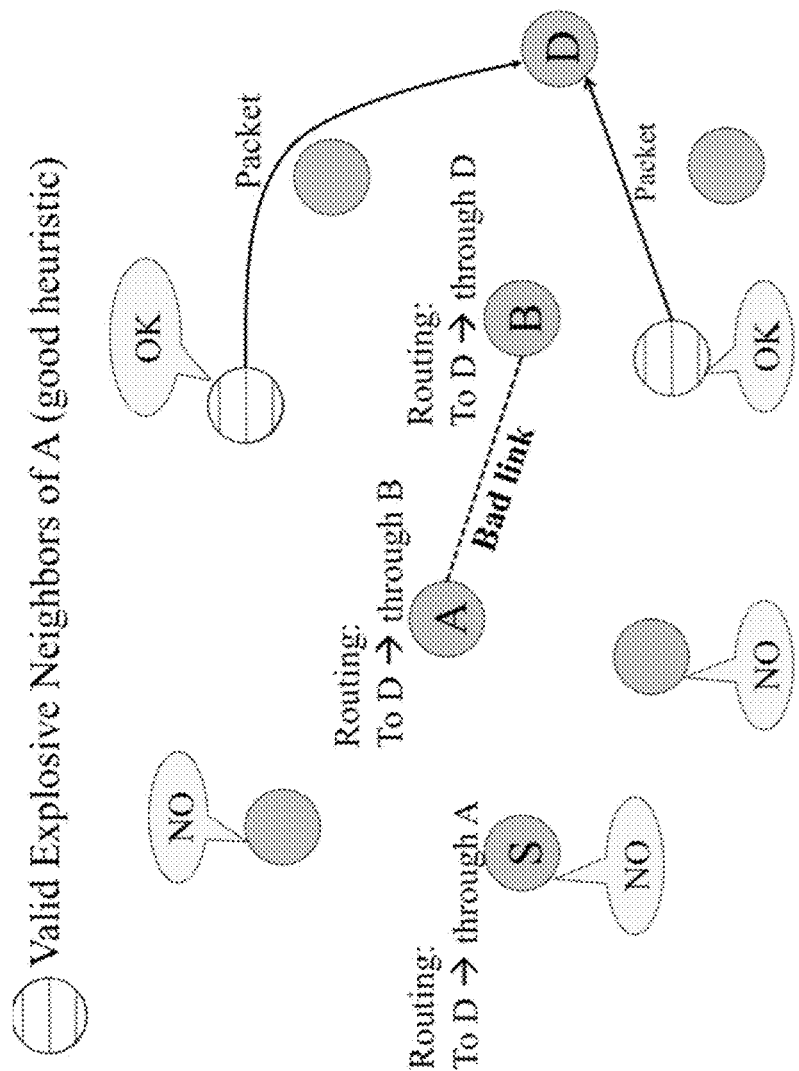
FIG. 37 shows how the explosive neighbors of A decide if to forward the data packet to D or not depending on the result of their heuristic.

In FIG. 37 we can see how explosive neighbours of A decide if to forward the data packet to D or not depending on the result of their heuristic. Explosive neighbours that after the explosion decide to forward the packet will be called Valid Explosive Neighbours.

4.4.2.2 Forwarding Information: EXplosive FOrwarding Hellos (EXFOHellos)

EXFOHello messages are signalling messages used to detect changes of the transmission conditions of links.

The frequency at which EXFOHellos are generated is different, and usually faster, than the frequency of generation of AGROHellos.

For instance, EXFOHellos, may be generated every T_EXFOHELLOS seconds (e.g., 0.1 seconds). Only masters of a RZ may send EXFOHello messages.

EXFOHello messages are one-hop hello messages, meaning that nodes that will receive the message may use the information and then may discard the message without forwarding it. In this case, since the size of EXFOHello messages may be very small and they are one-hop messages, they may not cause problems of overhead to the network.

4.4.2.3 Nexthop List

Every master of a RZ may maintain a list with the possible nexthop nodes it has. The list may contain all the nodes in its vicinity from which it receives EXFOHello messages. Each nexthop in the list may have a timeout associated.

For instance, the timeout may be initialized/updated to TOUT_NEXTHOP seconds every time an EXFOHello message is received from a nexthop, and if for a specific nexthop no EXFOHellos are received during TOUT_NEXTHOP seconds, then the nexthop may be deleted from the list.

4.4.2.4 Explosive Neighbour List

Every master of a RZ may maintain a list with the possible explosive neighbour nodes it has. The list may contain the nodes in its vicinity from which it directly receives AGROHello messages, i.e., the masters and cooperators of the RZ that are at distance 1 hop from it. Each explosive neighbour in the list may have a timeout associated.

For instance, the timeout may be initialized/updated to TOUT_EXPNEIGHBOUR seconds every time the node receives an AGROHello message from an explosive neighbour, and if for a specific explosive neighbour no AGROHellos are received during TOUT_EXPNEIGHBOUR seconds, then the explosive neighbour will be deleted from the list.

4.4.2.5 EXFOHello Format

EXFOHello messages could try to be as small as possible. For this reason, they may not have payload. In this case, they only will be identified by the upper layer protocol addressing. All the information needed (who is the sender of the EXFOHello message) is implicitly included in the header of the packet processed by the Forwarding agent.

4.4.2.6 Sending EXFOHellos

Every T_EXFOHELLOS seconds, nodes that are participating in the communication path of a data flow (i.e., the masters of the RZ) will send EXFOHello messages.

4.4.2.7 Receiving EXFOHellos

Only masters of a RZ will process EXFOHello messages. When a master receives an EXFOHello message, it may take the address of the transmitter and can check if the transmitter already exists in its nexthop list. In case it does not exist, it may add the address as a new nexthop in the nexthop list and with timeout equal to TOUT_NEXTHOP seconds. If it already exists, the node may only update the timeout of the nexthop to TOUT_NEXTHOP seconds.

4.4.2.8 When: Bad Link

For example, a master will explode when the Aggressive Routing decides to use an entry of the routing table in which the master has been receiving less than MINRATE_EXPLODE EXFOHellos per second from the nexthop of the entry (except for the initial case when the nexthop has not started to send EXFOHellos yet).

Another possibility is to explode when the master has been receiving less than MINRATE_EXPLODE EXFOHellos per second from the nexthops of all the entries of the routing table.

4.4.2.9 How: Broadcast

When a master, for one packet, decides to explode, it will send the packet in broadcast instead of in unicast. Moreover, the protocol may set a flag in the data packet indicating that this packet comes from one explosion, and also may set some additional information in the data packet, for example, the value of the Aggressive Routing heuristic for the entry of the routing table that caused the explosion, the number of explosive neighbours (or even the number of only the valid explosive neighbours depending on their heuristic) that the node that has exploded has in the moment of the explosion, the number of hops that the routing path which caused the explosion has, etc. These values may be used by the explosive neighbours that receive the broadcast packet in order to calculate the heuristic to decide if cooperate or not.

In addition, depending on the number of explosive neighbours that the node that has to explode has, it may decide sending the packet more than once (since broadcast messages are less robust than unicast messages due to the lack of the retransmission algorithm) in order to increase the robustness of the mechanism, although overhead will also be incremented (mechanisms that allow to discard duplicated packets may be implemented to mitigate this overhead).

For example, the node can send the same packet ALOTofEXPNEIGHBOURS−My#ofExplosiveNeighbours+1 times (or just 1 time if My#ofExplosiveNeighbours>ALOTofEXPNEIGHBOURS).

4.4.2.10 Who: Forwarding Heuristic

When packets are forwarded via explosive forwarding and not via traditional forwarding, all explosive neighbours that receive the packet may use a heuristic to decide whether to forward the packet to the destination or not. The heuristic may be based on properties of the topology and state of the network (e.g. heuristic of the Aggressive Routing, hop count to the destination, etc) and it must avoid creating loops or infinite explosions with the same packet.

An example of an embodiment of this heuristic is the following:

Not all explosive neighbours receiving an explosive packet will start to forward it towards the destination. In order to forward the packet (as if it was one of their packets) explosive neighbours have to:

1. To know a path to the destination
2. The path has to have fewer hops than the path that caused the explosion in the explosive node (in order to avoid loops).
3. Or the path has to have equal hops than the path that caused the explosion in the explosive node, but in this case no explosion is allowed in the first hop (in order to avoid infinite explosions).
4. And in these cases, the packet will only be forwarded with probability $P=1/N$, where N can be either the number of explosive neighbours of the explosive node in the moment of the explosion or the number of valid (in terms of heuristic) explosive neighbours of the explosive node in the moment of the explosion. In this way:

$$P(\text{someone\_cooperates}) = 1 - \left(1 - \frac{1}{N}\right)^N$$

$$P(>1\_\text{cooperates}) = \sum_{i=2}^{N} \binom{N}{i}\left(\frac{1}{N}\right)^i\left(1 - \frac{1}{N}\right)^{N-i}$$

which for example, for N=2 we have a probability of 3/4 that at least one explosive neighbour cooperates, and only 1/4 that more than one (overhead) cooperates. For N=3, we have a probability of 19/27 that at least one explosive neighbour cooperates, and 7/27 that more than one cooperates.

Alternatively, we could fix the value P=1, increasing robustness but also introducing more duplicate packets.

4.4.2.11 Loop-Free Mechanism in Explosive Forwarding

Explosive Forwarding in AGENET can guarantee loop-free explosions. One possible implementation of a loop-free mechanism is to use exactly the same loop-free mechanism of the Aggressive Routing (see section "4.4.1.4 Loop-free Mechanism in Aggressive Routing"), that is, using the source routing list of the data packets, but moreover, adding the additional check of if a node which receives a packet from an explosion appears in the source routing list of the packet, it will discard the packet.

Figure 38:
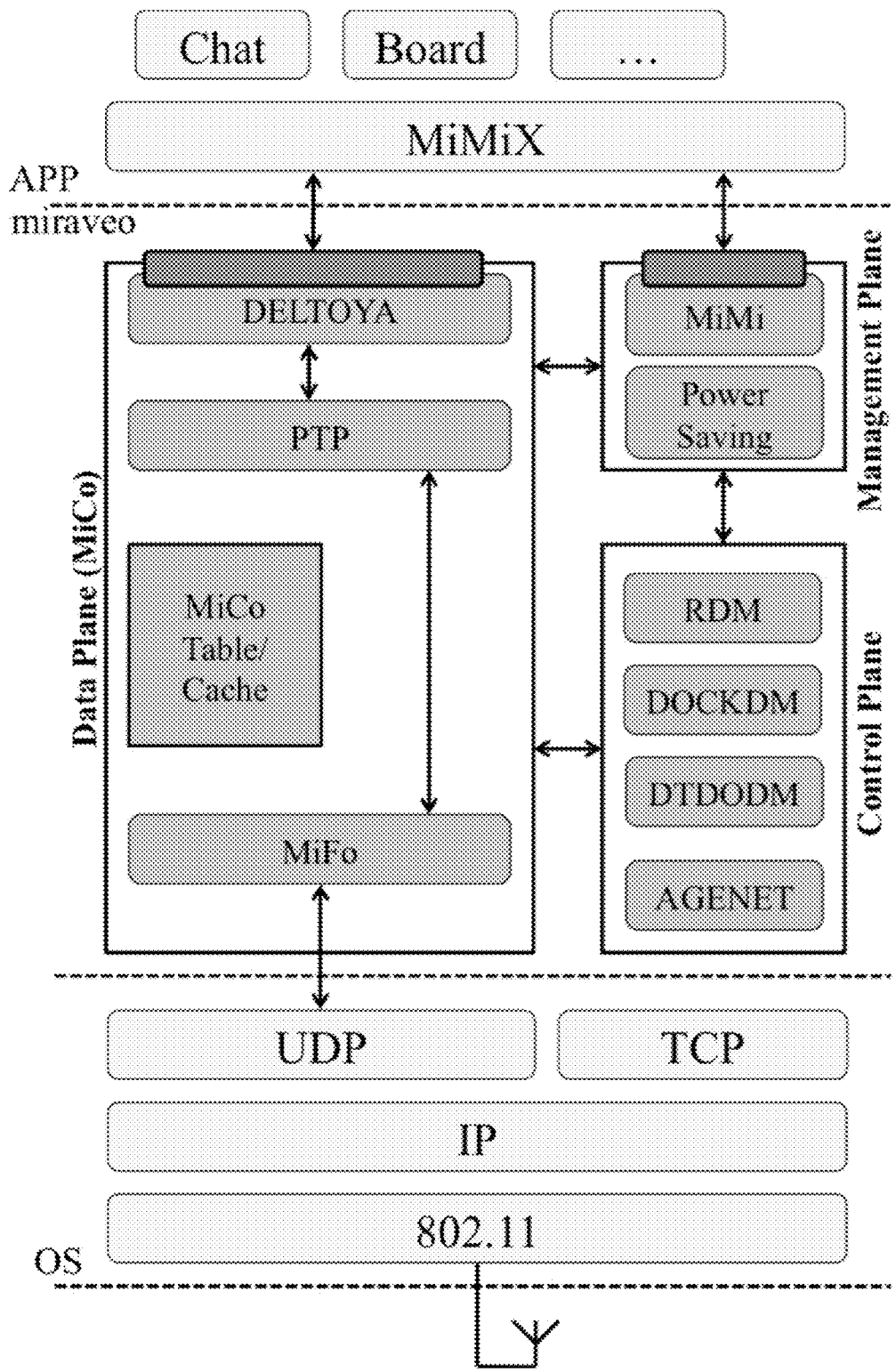
FIG. 38 shows a scheme of all the layers involved in the possible embodiment of the technology shown in the appendix.
Figure 39:
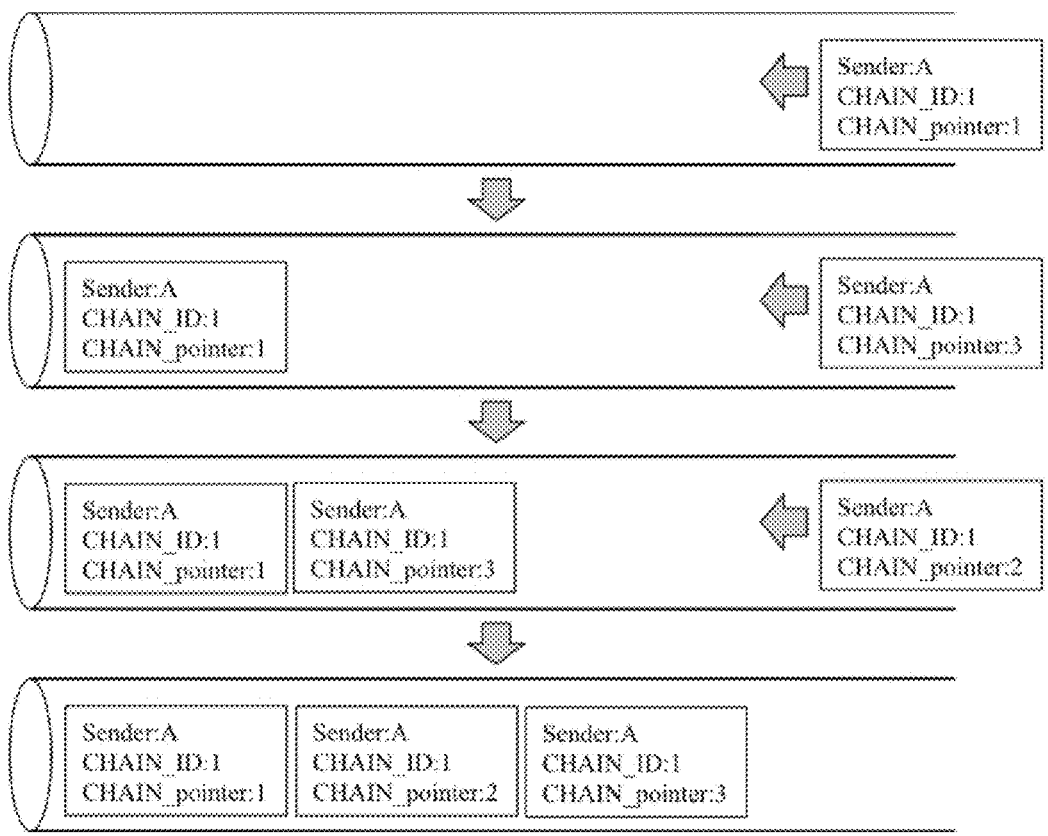
FIG. 39 shows an example of how a new DTDO has to be pushed to a DOCK.
Figure 40:
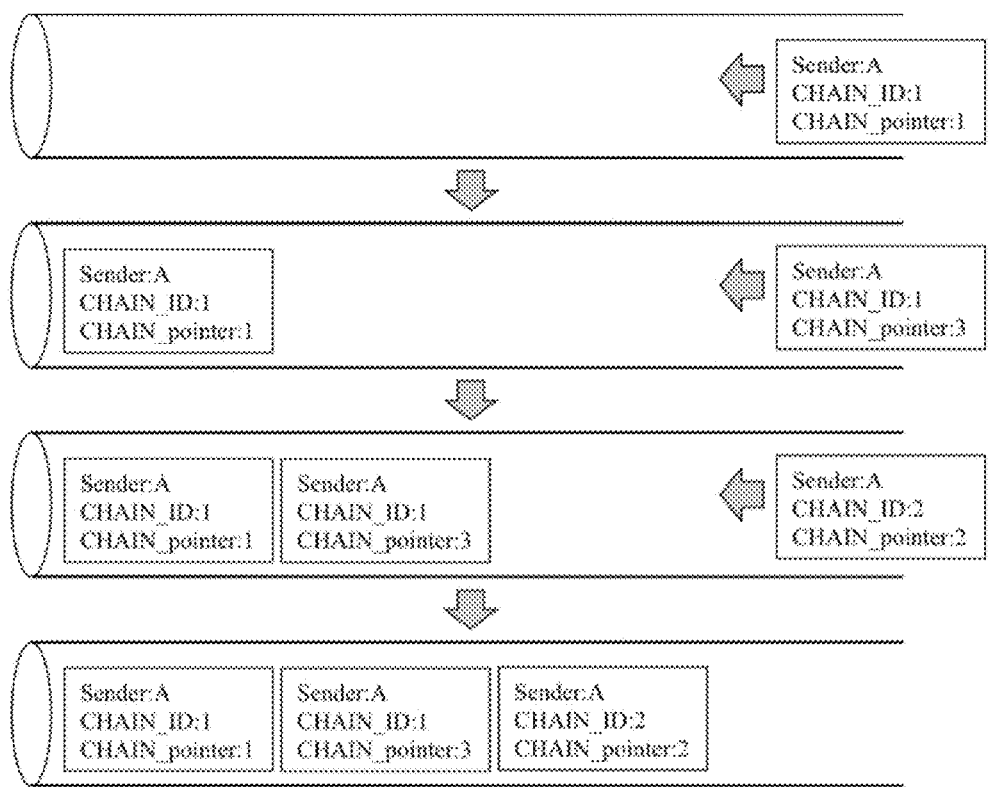
FIG. 40 shows another example of how a new DTDO has to be pushed to a DOCK.
Figure 41:
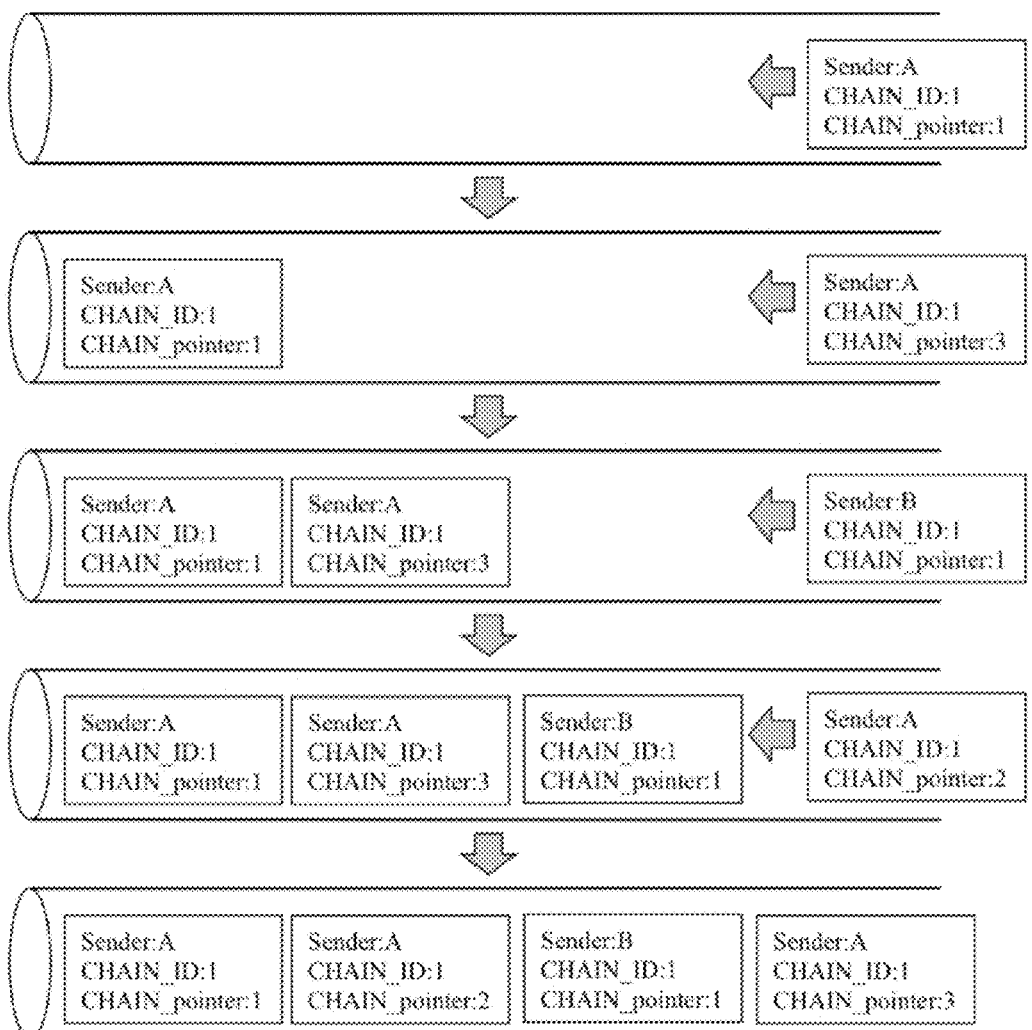
FIG. 41 shows another example of how a new DTDO has to be pushed to a DOCK.
Figure 42:
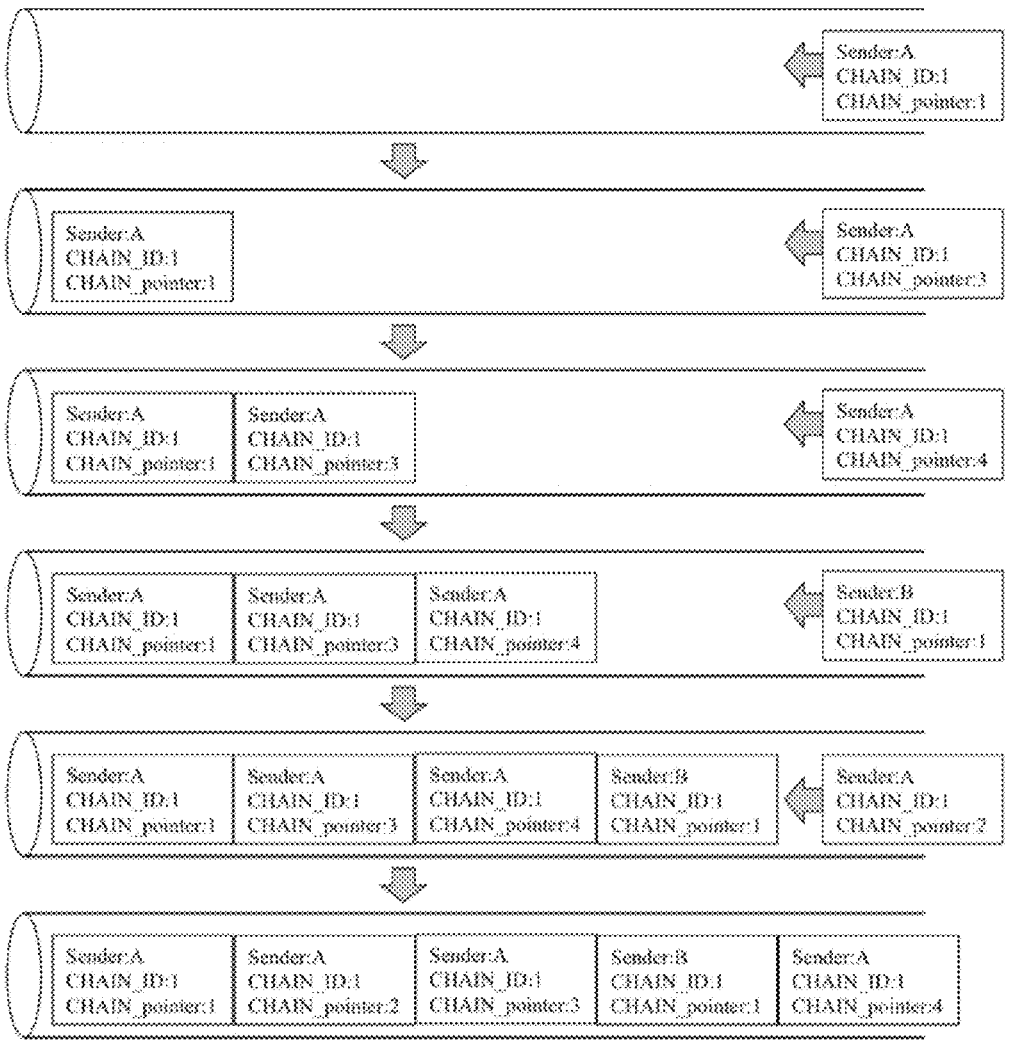
FIG. 42 shows another example of how a new DTDO has to be pushed to a DOCK.
Figure 43:
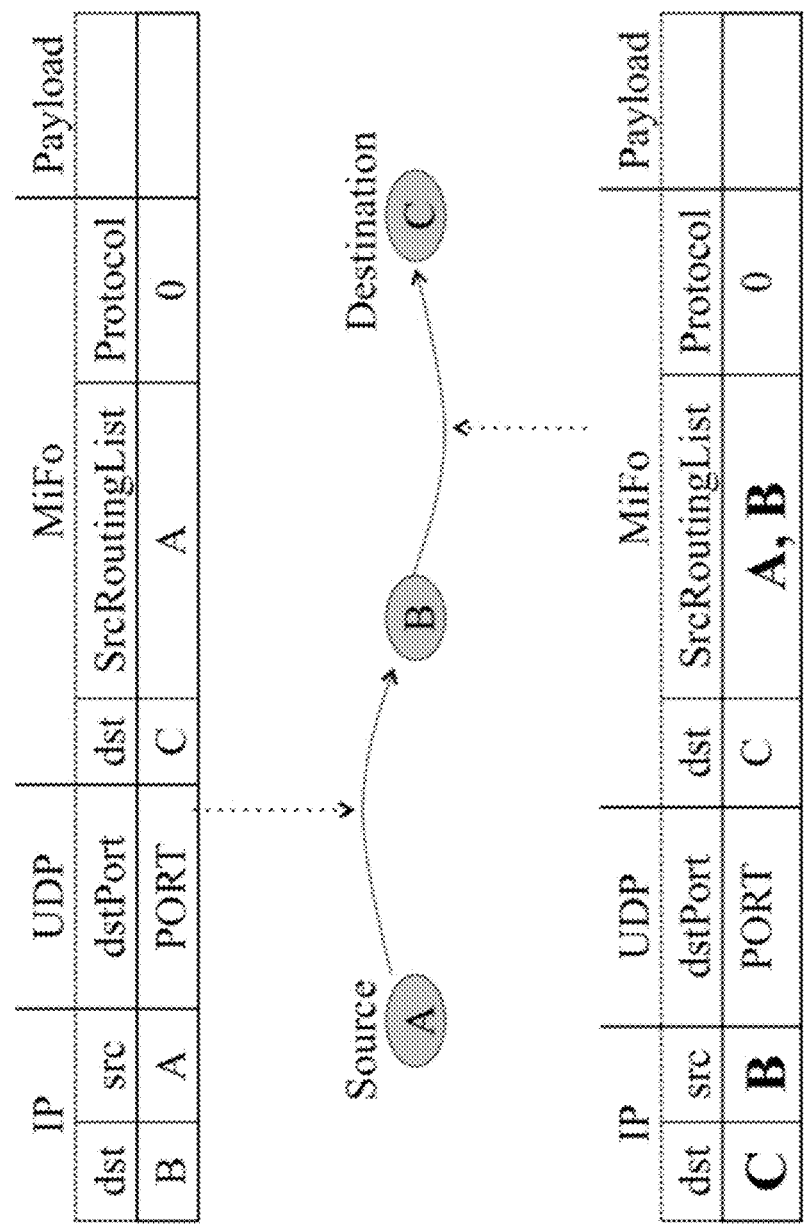
FIG. 43 shows an example of the IP header and the MiFo header v1.
Figure 44:
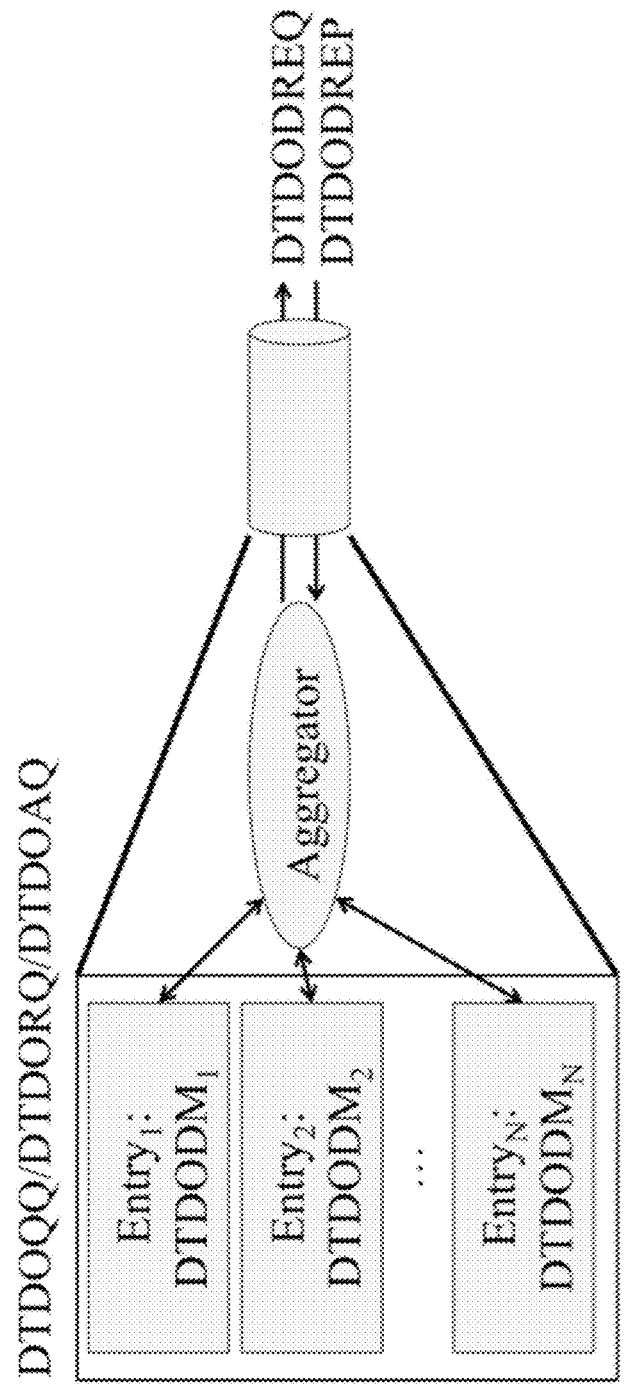
FIG. 44 shows an example of the scheme of the aggregator for DTDODMs.
Figure 45:
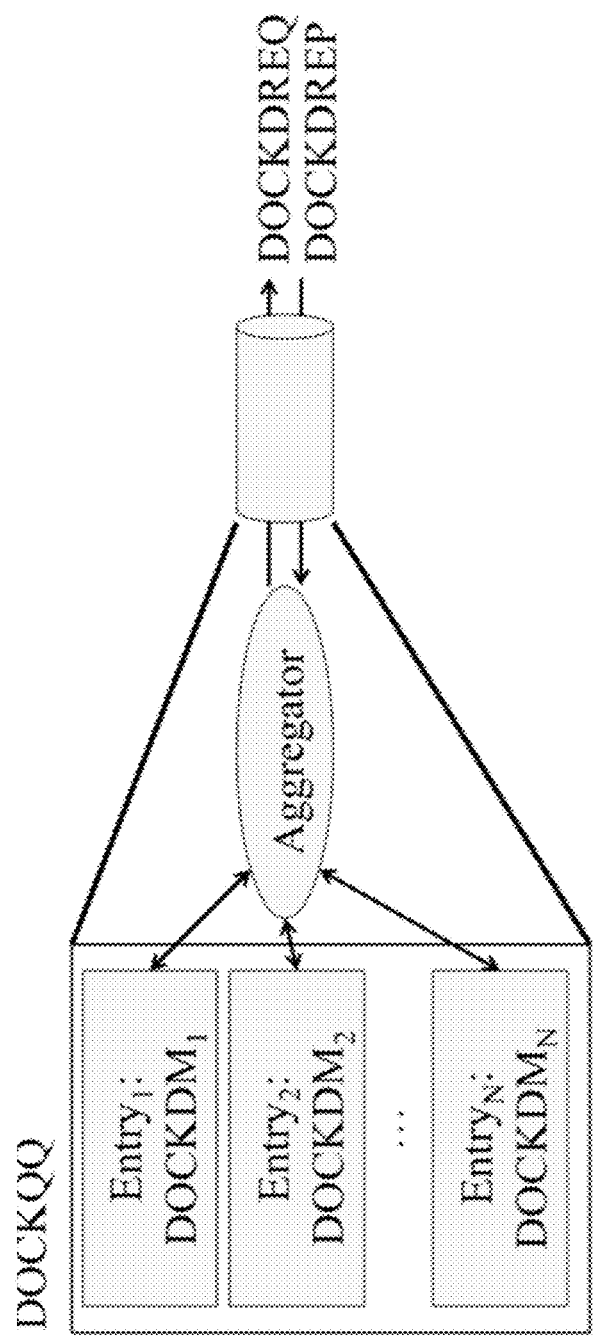
FIG. 45 shows an example of the scheme of the aggregator for DOCKDMs.
Figure 46:
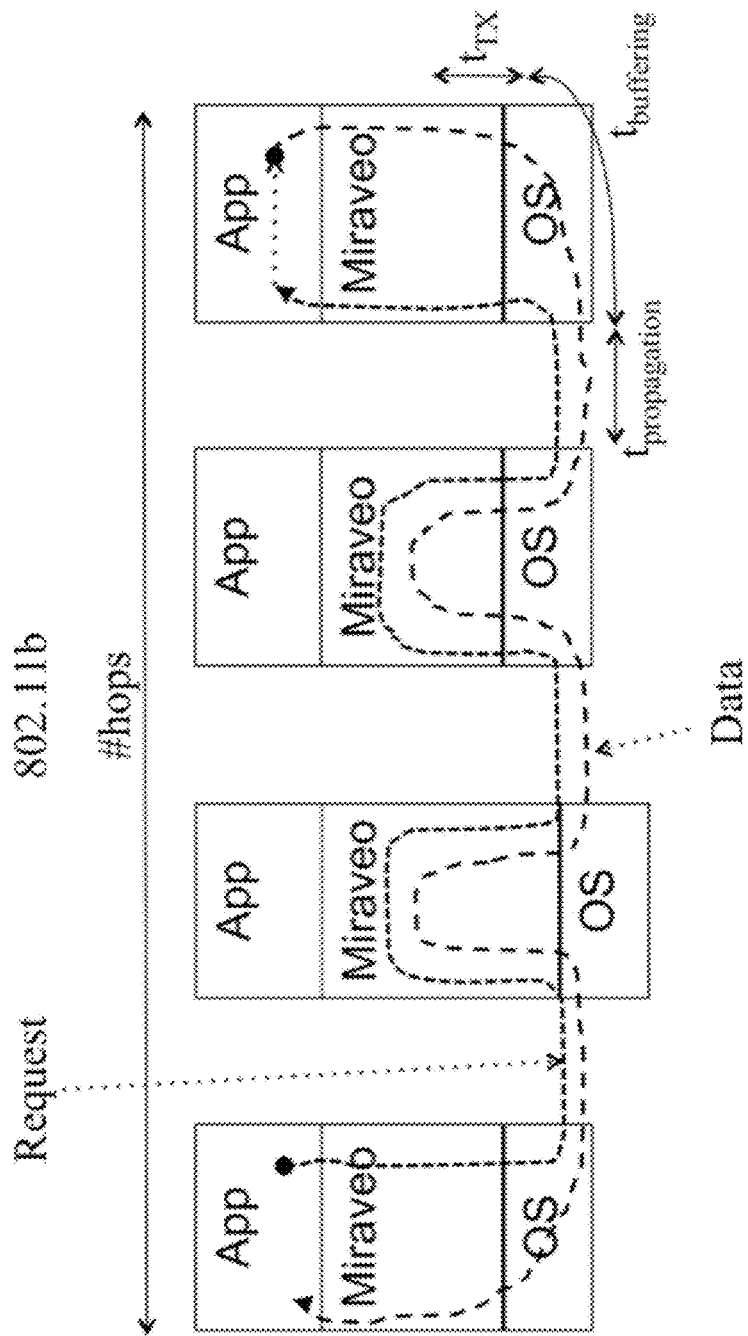
FIG. 46 shows a typical scenario of a data transmission between two nodes at distance 3 hops.
Figure 47:
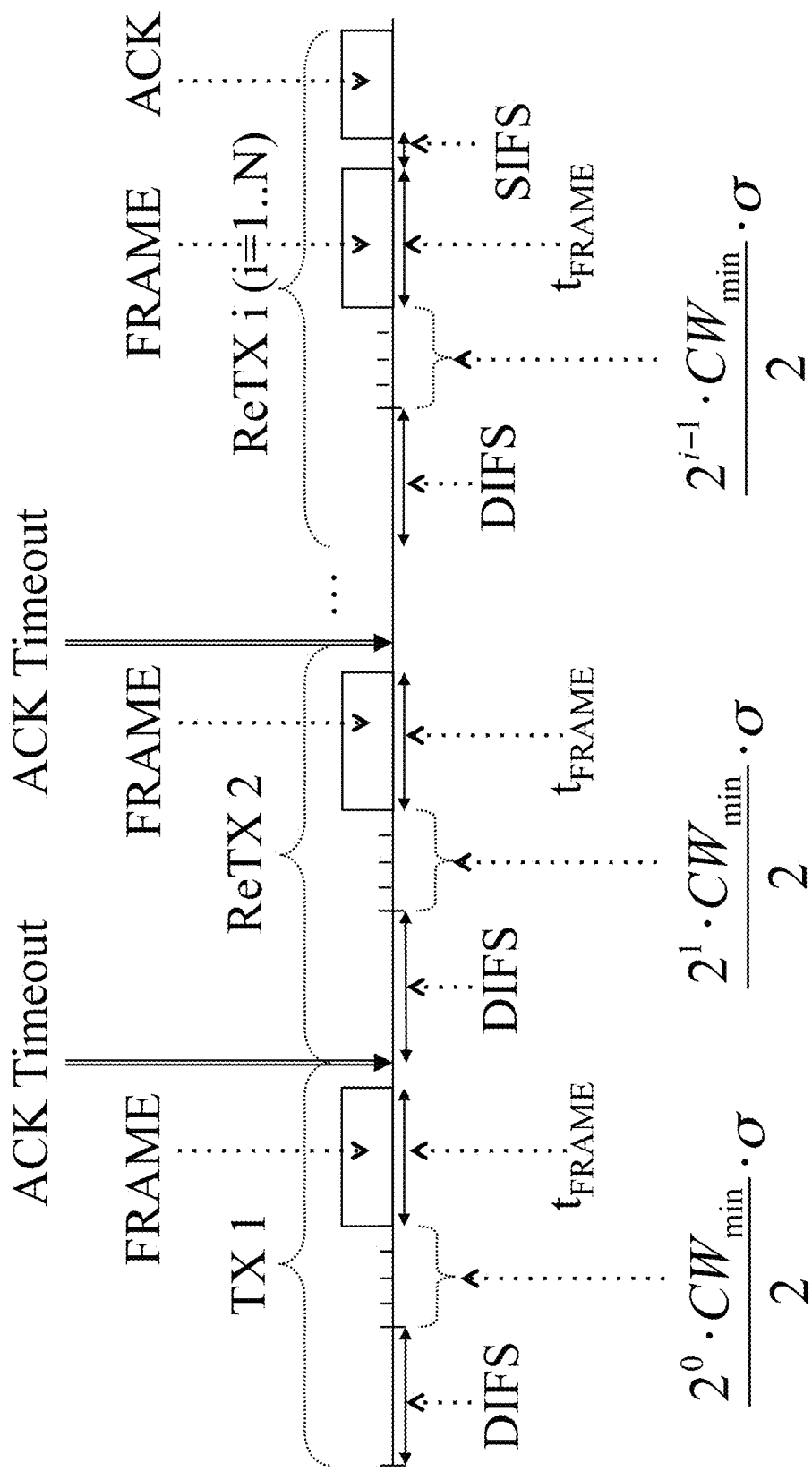
FIG. 47 shows a simplified scheme of the IEEE 802.11 retransmission algorithm.
Figure 48:
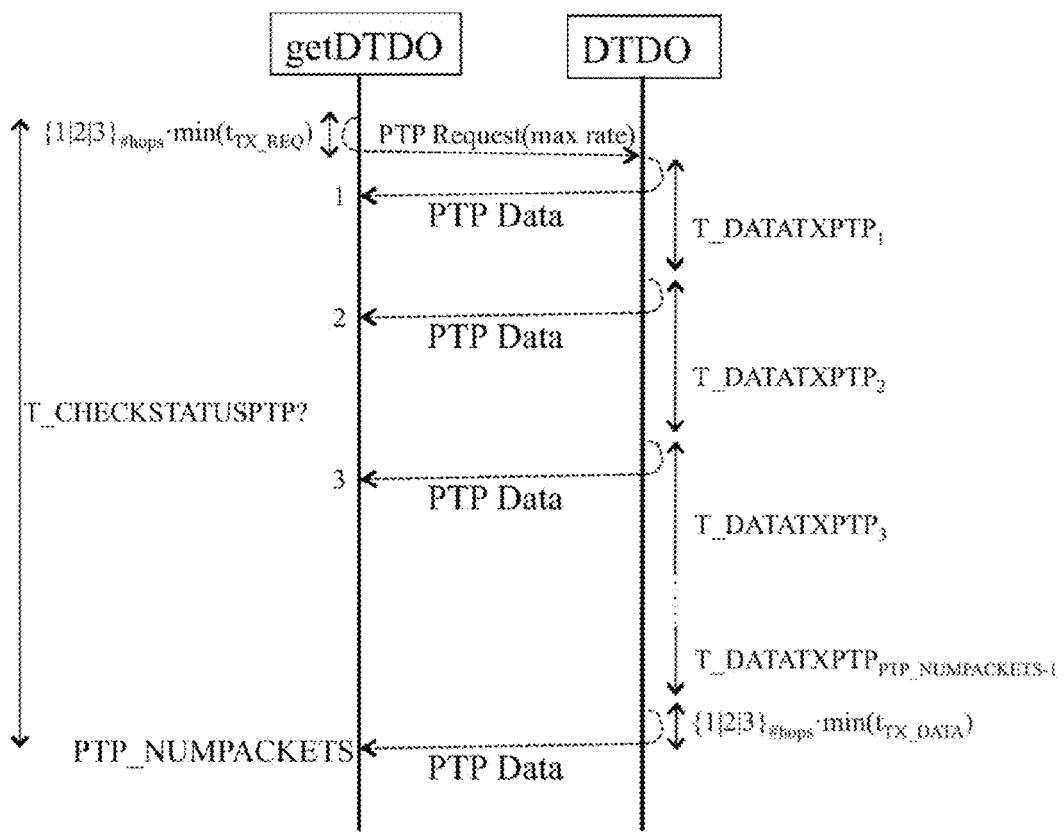
FIG. 48 shows an scheme for calculating the parameter T_CHECKSTATUSPTP.
Figure 49:
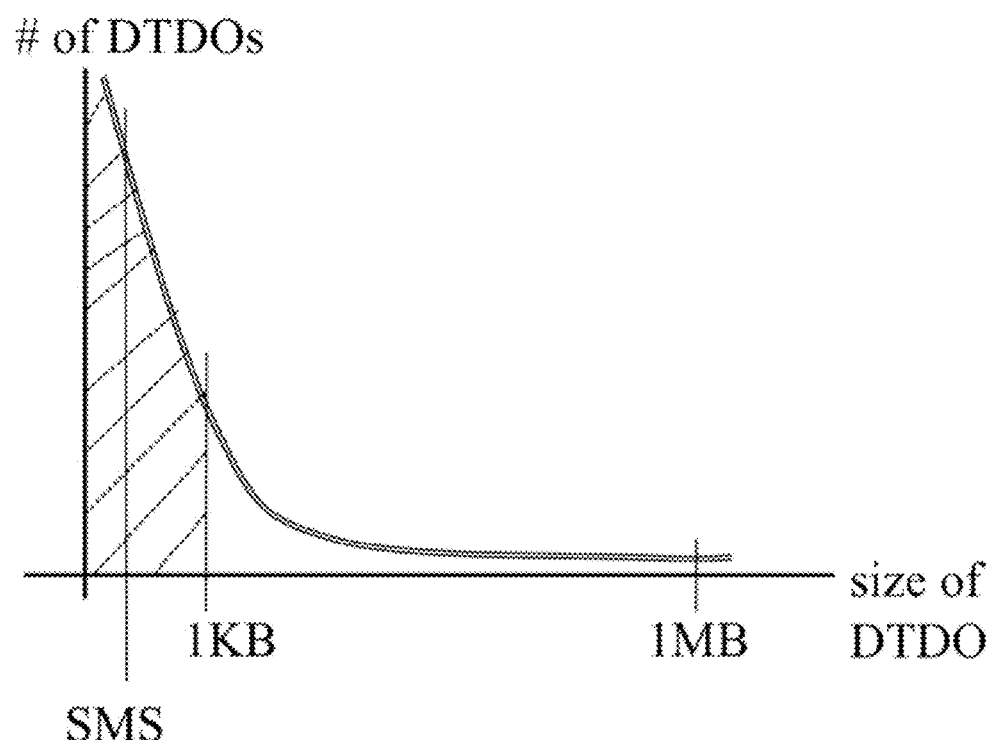
FIG. 49 shows a simplified generalization of the mean size of DTDOs.
Figure 50:
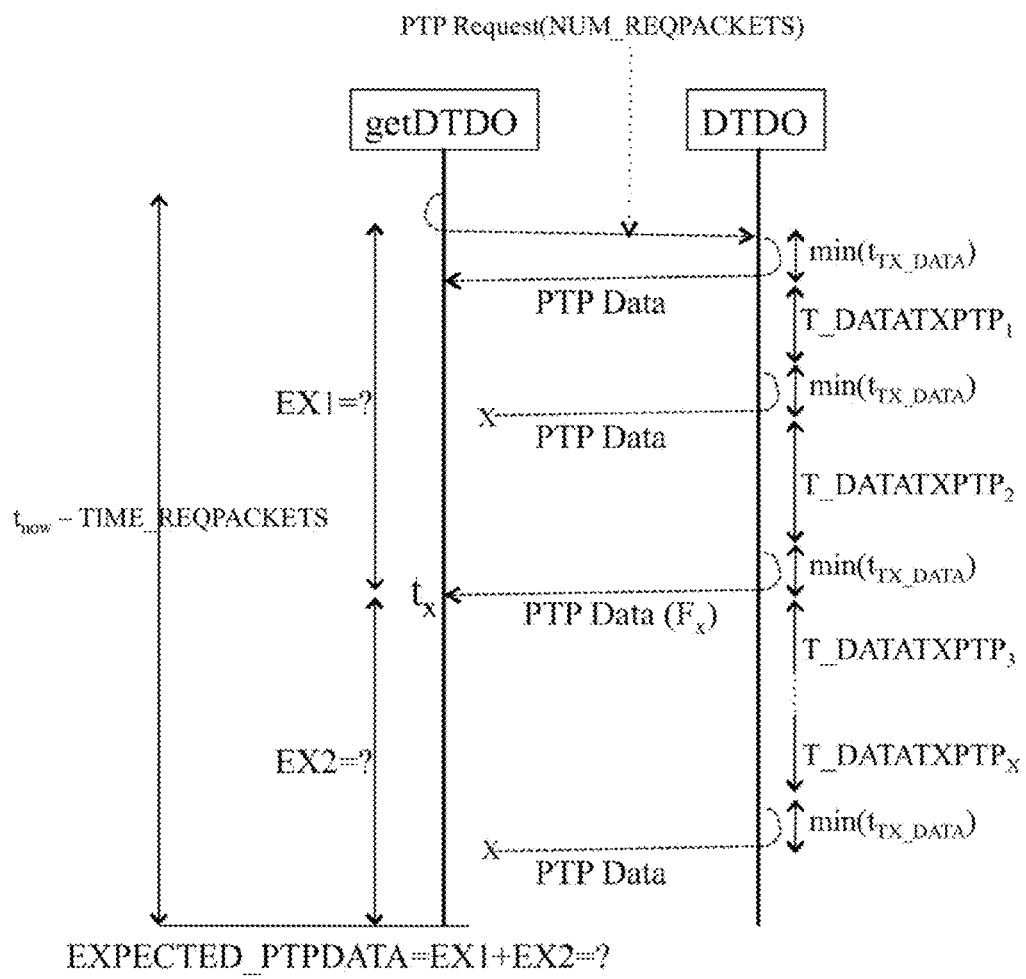
FIG. 50 shows an scheme for calculating the parameter EXPECTED_PTPDATA.

FIGS. 38-50 illustrate a program embodiment shown in the computer-program listing in the appendix. FIG. 38 shows a scheme of all the layers involved in the possible embodiment of the technology shown in the appendix. FIG. 39 shows an example of how a new DTDO has to be pushed to a DOCK. FIG. 40 shows another example of how a new DTDO has to be pushed to a DOCK. FIG. 41 shows another example of how a new DTDO has to be pushed to a DOCK. FIG. 42 shows another example of how a new DTDO has to be pushed to a DOCK. FIG. 43 shows an example of the IP header and the MiFo header v1. FIG. 44 shows an example of the scheme of the aggregator for DTDODMs. FIG. 45 shows an example of the scheme of the aggregator for DOCKDMs. FIG. 46 shows a typical scenario of a data transmission between two nodes at distance 3 hops. FIG. 47 shows a simplified scheme of the IEEE 802.11 retransmission algorithm. FIG. 48 shows an scheme for calculating the parameter T_CHECKSTATUSPTP. FIG. 49 shows a simplified generalization of the mean size of DTDOs. FIG. 50 shows an scheme for calculating the parameter EXPECTED_PTPDATA.

ALTERNATE EMBODIMENTS

Several other embodiments are contemplated by the inventors. For example the various network and configuration functions can be performed in a variety of ways and implemented in a combination of hardware, programmable devices, firmware, and software using a variety of programming languages. Many of the steps can be performed in a different order. The connections and interfaces between layers and components may also vary from the simplified diagrams shown. Executing instances of programs and other objects may operate on multiple nodes.

The invention could be modified to execute on other operating systems such as Windows, UNIX, LINUX, MAC/OS, or even PALM or other systems. Other kinds of networks and protocols could be used.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A Delay-Tolerant Object Layer Abstraction system comprising:
   a first create interface to a first application on a first node, the first create interface receiving a data object from the first application and creating from the data object a first Delay-Tolerant Distributed Object (DTDO) in a first memory on the first node;
   wherein the first memory is a solid-state memory or a magnetic memory powered by a battery on the first node;
   a second request interface to a second application on a second node, the second request interface sending a second request from the second node to the first node, the second request causing the first node to transmit the first DTDO to the second node to create a second copy of the first DTDO, the second copy stored in a second memory on the second node; and
   a third request interface to a third application on a third node, the third request interface sending a third request from the third node to the second node, the third request causing the second node to transmit the second copy of the first DTDO to the third node to create a third copy of the first DTDO, the third copy stored in a third memory on the third node;
   wherein the third memory is a solid-state memory or a magnetic memory powered by a battery on the third node;
   wherein the third node requests the second copy of the first DTDO when the first node becomes out of range of a network containing the second node and the third node,
   wherein Delay-Tolerant Distributed Objects (DTDOs) are stored on other nodes before a creating node becomes out of range of the network.

2. The Delay-Tolerant Object Layer Abstraction system of claim 1 wherein the network is a wireless network of sensors or actuators and the first node is a device belonging to the wireless network of sensors or actuators.

3. The Delay-Tolerant Object Layer Abstraction system of claim 2 further comprising:
   a first send primitive on the first node, the first send primitive sending a first send message over the wireless network of sensors or actuators to the second node, the first send message causing the second node to generate the second request from the second node to the first node, the second request causing the first node to transmit the first DTDO to the second node to create a second copy of the first DTDO, the second copy stored in the second memory on the second node, wherein the first DTDO is pushed to the second node by the first send message from the first send primitive.

4. The Delay-Tolerant Object Layer Abstraction system of claim 2 further comprising:

the third node sending a discovery request for a requested DTDO through a network card to a plurality of nodes on the wireless network of sensors or actuators, and that receives from the network card response messages from a set of the nodes having a copy of the requested DTDO;

the third node selecting a selected subset of nodes accessible by the network card from the set of nodes having a copy of the requested DTDO;

the third node sending a plurality of distributed-object requests through the network card to the selected subset of nodes and that receives the requested DTDO from the subset of nodes.

5. The Delay-Tolerant Object Layer Abstraction system of claim 4 further comprising:

the third node repeatedly sending the discovery request through the network card, over the wireless network of sensors or actuators to the plurality of nodes until a timeout occurs.

6. The Delay-Tolerant Object Layer Abstraction system of claim 4 further comprising:

the third node receiving from the network card fragments of the requested DTDO from the subset of nodes, the third node assembling the fragments in the third memory to generate a copy of the requested DTDO gathered from the subset of nodes;

wherein the subset of nodes comprises at least two nodes.

7. The Delay-Tolerant Object Layer Abstraction system of claim 6 further comprising:

a maximum retrieval time parameter specifying a maximum retrieval time that the third node waits to receive the fragments, wherein the third node aborts assembling the fragments and discards the fragments when the maximum retrieval time is exceeded.

8. The Delay-Tolerant Object Layer Abstraction system of claim 6 wherein selection criterion used by the third node selecting the selected subset of nodes from the set of nodes is selected from the group consisting of:

selecting the first node creating the DTDO;
selecting a closest node in proximity;
Quality-of-Service (QoS);
network traffic congestion of the network in a routing path;
a type of data contained in the DTDO;
selecting nodes based on battery levels; and
selecting based on routing metrics.

9. The Delay-Tolerant Object Layer Abstraction system of claim 4 further comprising:

a first time-to-live parameter specifying a time that the first DTDO expires and is removable from the first memory;

a second time-to-live parameter specifying a time that a second copy of the first DTDO expires and is removable from the second memory, wherein the second time-to-live parameter is generated from the first time-to-live parameter;

a third time-to-live parameter specifying a time that the third copy of the first DTDO expires and is removable from the third memory, wherein the third time-to-live parameter is generated from the second time-to-live parameter.

10. A computer-implemented method for retrieving fragments of a Delay-Tolerant Distributed Object (DTDO) from multiple nodes on a network comprising:

sending a plurality of requests over the network to a plurality of nodes, each request containing an identifier for a requested DTDO, the requested DTDO having a plurality of fragments stored on the plurality of nodes;

receiving a plurality of responses from a first set of the plurality of nodes, the first set comprising nodes each storing at least one fragment of the requested DTDO;

selecting a subset of nodes from the first set of nodes, the subset comprising at least two nodes;

sending a first request over the network to a first node in the subset of nodes and receiving a first fragment of the requested DTDO from the first node;

sending a second request over the network to a second node in the subset of nodes and receiving a second fragment of the requested DTDO from the second node;

assembling the first fragment and the second fragment to generate a copy of the requested DTDO, wherein the requested DTDO is assembled from fragments retrieved from at least two nodes on the network.

11. The computer-implemented method of claim 10 wherein the first node does not respond when the first node is a node that becomes out of range of the network;

wherein the second node does not respond when the second node is a node that becomes out of range of the network;

when the second request is not responded to by the second node, sending a third request over the network to a third node in the subset of nodes and receiving the second fragment of the requested DTDO from the third node;

when the first request is not responded to by the first node, sending a fourth request over the network to a fourth node in the subset of nodes and receiving the first fragment of the requested DTDO from the fourth node, wherein fragments are retrieved from alternate nodes when nodes are out of range of the network.

* * * * *